(12) United States Patent
Matsuda et al.

(10) Patent No.: US 7,224,656 B2
(45) Date of Patent: May 29, 2007

(54) DISC DETECTION DEVICE AND ASSOCIATED METHOD

(75) Inventors: Mikinori Matsuda, Kanagawa (JP); Tokio Kanada, Kanagawa (JP); Kazuhito Kurita, Kanagawa (JP); Minoru Tobita, Tokyo (JP); Akihiro Noda, Kanagawa (JP); Yoshiro Arikawa, Tokyo (JP); Shinichi Nakao, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/246,363

(22) Filed: Oct. 11, 2005

(65) Prior Publication Data

US 2006/0031859 A1 Feb. 9, 2006

Related U.S. Application Data

(62) Division of application No. 10/508,406, filed as application No. PCT/JP04/00943 on Jan. 30, 2004.

(30) Foreign Application Priority Data

Jan. 31, 2003 (JP) .............................. 2003-024567
Jan. 28, 2004 (JP) .............................. 2004-019432

(51) Int. Cl.
*G11B 7/00* (2006.01)

(52) U.S. Cl. .................. 369/53.22; 369/30.3; 720/645

(58) Field of Classification Search ................ 720/729, 720/627–629; 369/53.2–53.22
See application file for complete search history.

(56) References Cited

U.S. PATENT DOCUMENTS

| 5,745,451 A | * | 4/1998 | Mukawa et al. | 369/44.29 |
| 6,493,304 B2 | * | 12/2002 | Watanabe et al. | 369/53.22 |
| 2005/0025017 A1 | * | 2/2005 | Sun | 369/53.23 |

FOREIGN PATENT DOCUMENTS

| JP | 4-103074 | 4/1992 |
| JP | 6-259927 | 9/1994 |
| JP | 10-302438 | 11/1998 |

* cited by examiner

*Primary Examiner*—Wayne Young
*Assistant Examiner*—Nathan Danielsen
(74) *Attorney, Agent, or Firm*—Oblon, Spivak, McClelland, Maier & Neustadt, P.C.

(57) ABSTRACT

A disc drive apparatus is provided which determines a recording medium enabling type and recordability for various types of discs. The discs are housed in a cartridge and each cartridge has at least a first and second detection hole formed therein. The second detection hole (H1) is variably opened and closed by an opening/closing device, and the first detection hole (H0) is in an open state at all times. The disc drive apparatus determines the disc type using a light signal reflected from the loaded recording medium. The disc drive apparatus also determines disc determining parameters (for example, recordability of a disc) based on information received about the disc type and the open/closed state of one or more detection holes formed in the cartridge.

7 Claims, 34 Drawing Sheets

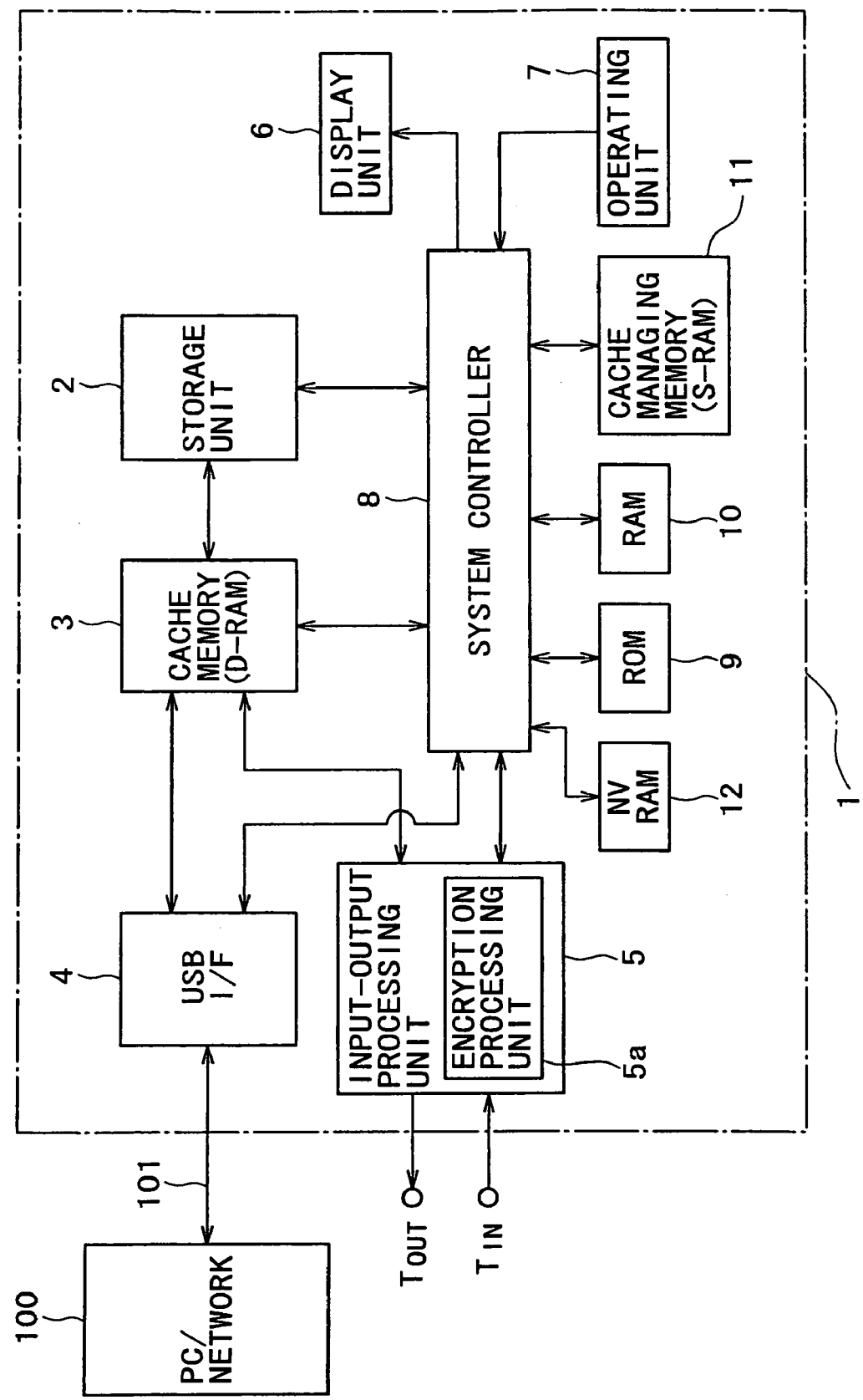

FIG. 2A

| | REPRODUCTION-ONLY MD /RECORDING AND REPRODUCING MD |
|---|---|
| TRACK PITCH | 1.6 μm |
| BIT LENGTH | 0.59 μm/bit |
| λ·NA | 780nm·0.45 |
| RECORDING SYSTEM | GROOVE RECORDING |
| ADDRESSING SYSTEM | SINGLE SPIRAL BOTH-SIDE WOBBLE |
| MODULATION SYSTEM | EFM |
| ERROR CORRECTION SYSTEM | ACIRC |
| INTERLEAVE | CONVOLUTION |
| REDUNDANCY | 46.3% |
| DETECTION SYSTEM | BIT BY BIT |
| LINEAR VELOCITY | 1.2m/s |
| DATA RATE | 133KB/s |
| TOTAL CAPACITY | 164MB (140MB) |
| MINIMUM REWRITING UNIT | 32 SECTORS + 4 LINK SECTORS |

FIG. 2B

| | HIGH-DENSITY MD TYPE A, B | HIGH-DENSITY MD TYPE C |
|---|---|---|
| TRACK PITCH | 1.5~1.6 μm | 1.25 μm |
| LINEAR DENSITY | 0.437 μm/bit | 0.16 μm/bit |
| CAPACITY | 300MB | 1GB |
| TRANSFER RATE | 4.37Mbps | 9.83Mbps |
| LINEAR VELOCITY | 2.4m/sec | 1.98m/sec |

REPRODUCTION-ONLY MD

REPRODUCTION-ONLY HIGH-DENSITY MD TYPE B

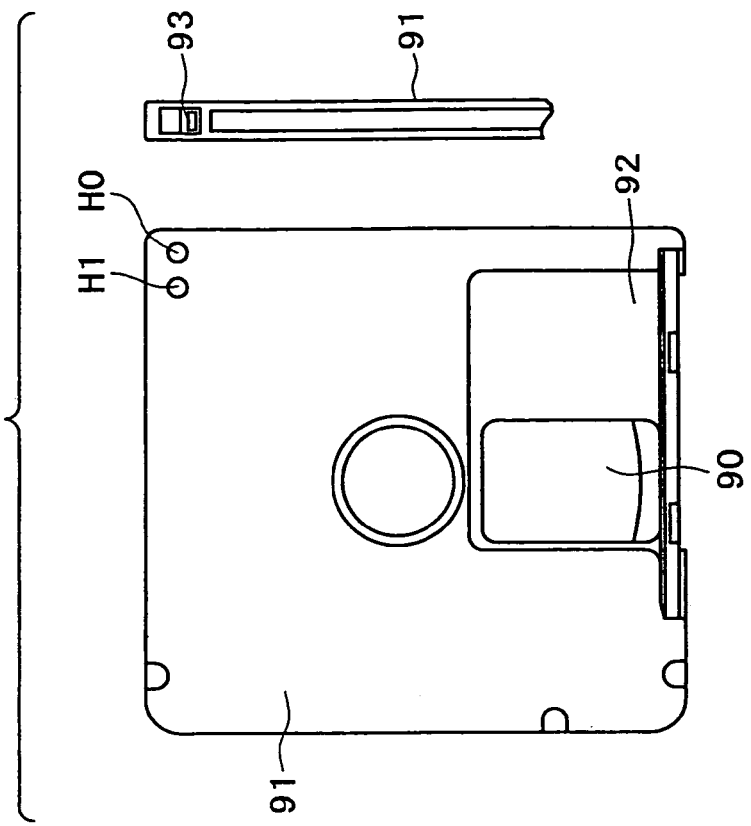
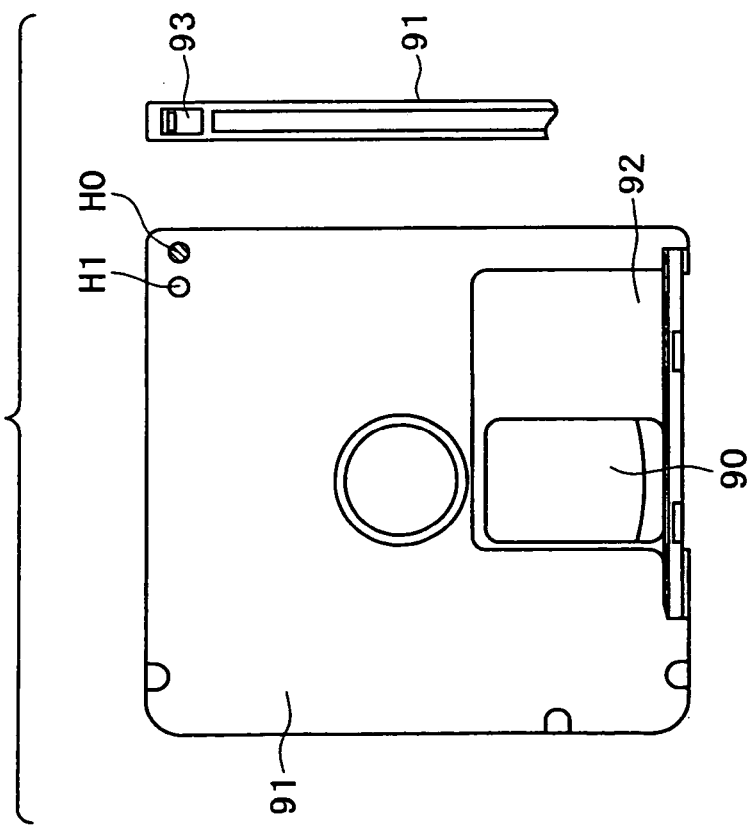

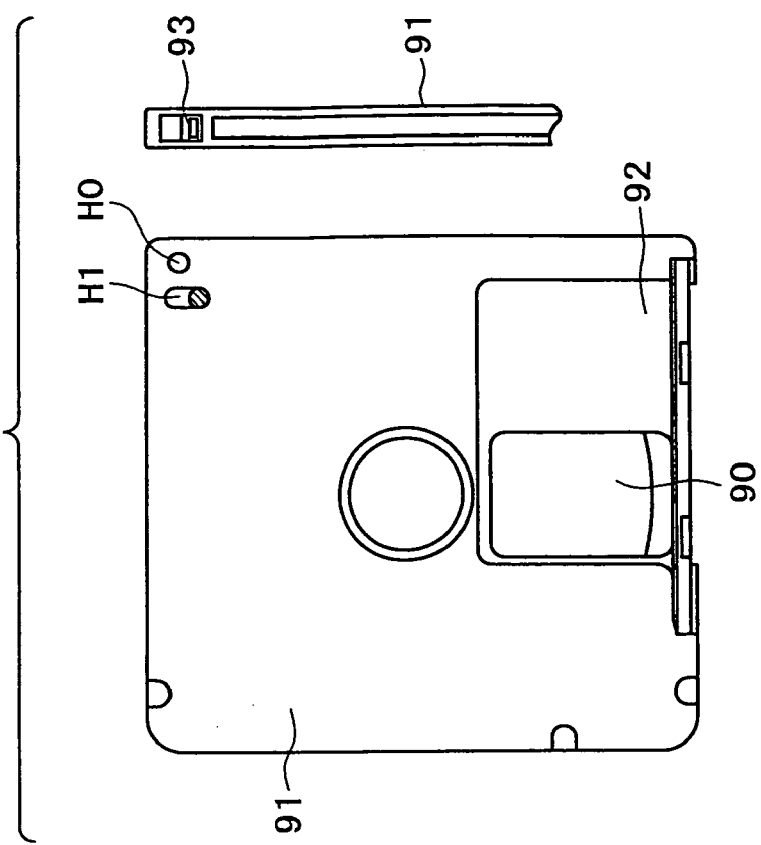
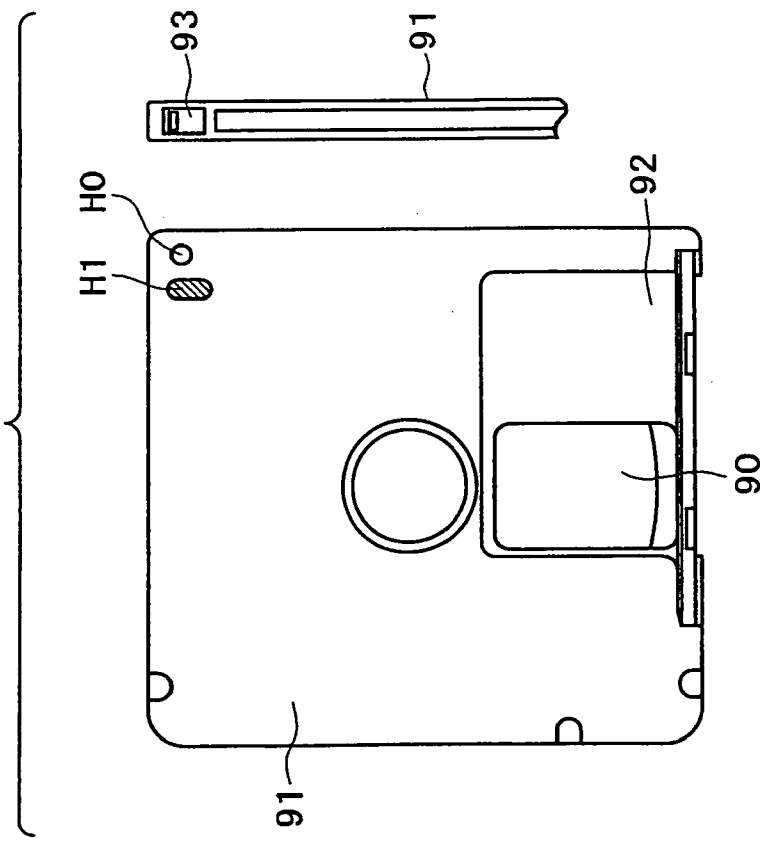

FIG. 8C
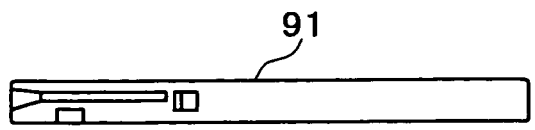
FIG. 8D    FIG. 8A    FIG. 8E
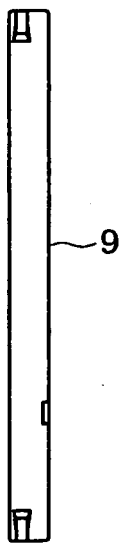 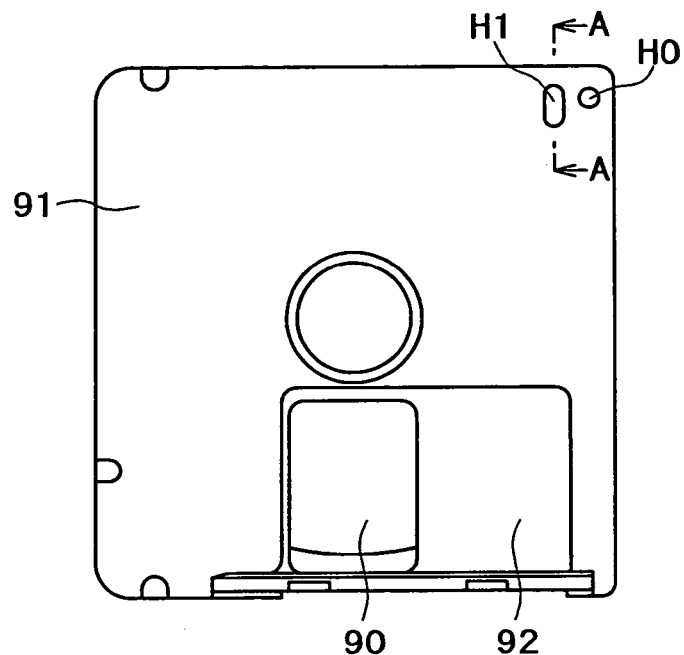 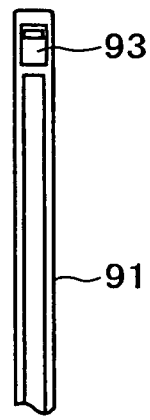
FIG. 8B
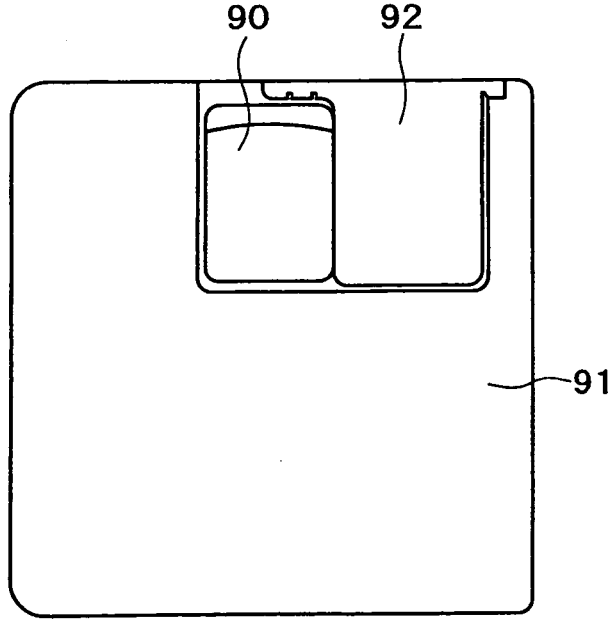

SECTION A-A

SECTION A-A

<RECORDABLE>

SECTION B-B

<NOT RECORDABLE>

SECTION D-D

SECTION C-C

HIGH-DENSITY MD TYPE B/TYPE C

RECORDING AND REPRODUCING MD/
HIGH-DENSITY MD TYPE A

REPRODUCTION-ONLY MD

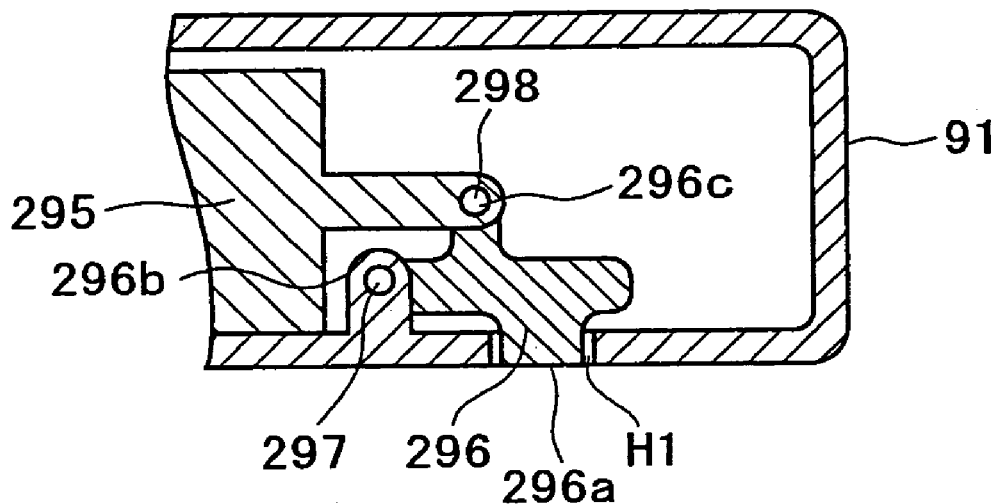
F I G. 1 2 A
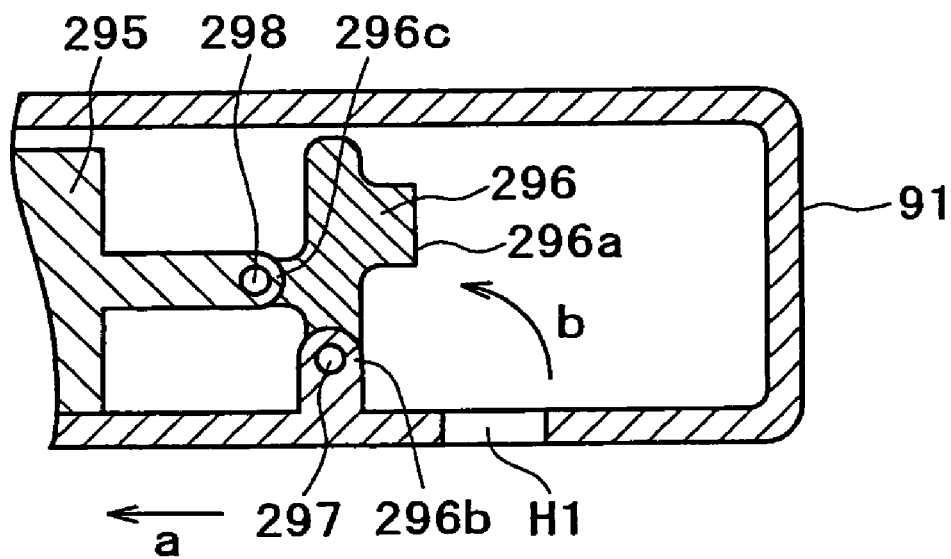
F I G. 1 2 B

FIG. 14

| Disk Type | REFLEC-TIVITY | GROOVE DEPTH (PHASE DIFFERENCE OF PULL-IN WITH RESPECT TO PUSH-PULL) | U-TOC "UMD" | P-TOC "UMD" | ADIP ECC/CRC | BCA | DETECTION HOLE H0 SW0 OOPEN/●CLOSED | DETECTION HOLE H1 SW1 OOPEN/●CLOSED | WRITING ENABLED/DISABLED |
|---|---|---|---|---|---|---|---|---|---|
| REPRODUCTION-ONLY MD | H | λ/4~λ/2 (ADVANCE) | NO U-TOC | ABSENT | subQ CRC | ABSENT | O | ● | DISABLED |
| REPRODUCTION-ONLY HIGH-DENSITY MD (TYPE B) | H | λ/4~λ/2 (ADVANCE) | ABSENT | PRESENT | subQ CRC | PRESENT "1.5" | O | O | DISABLED |
| RECORDING AND REPRODUCING MD | L | 0~λ/4 (DELAY) | ABSENT | ABSENT | ADIP CRC | ABSENT | O | O | DISABLED |
| RECORDING AND REPRODUCING MD | L | 0~λ/4 (DELAY) | ABSENT | ABSENT | ADIP CRC | ABSENT | ● | O | ENABLED |
| HIGH-DENSITY MD TYPE A | L | 0~λ/4 (DELAY) | PRESENT | ABSENT | ADIP CRC | ABSENT | O | O | DISABLED |
| HIGH-DENSITY MD TYPE A | L | 0~λ/4 (DELAY) | PRESENT | PRESENT | ADIP CRC | ABSENT | ● | O | ENABLED |
| HIGH-DENSITY MD TYPE B | L | λ/4~λ/2 (ADVANCE) | PRESENT | PRESENT | ADIP CRC | PRESENT "1.5" | O | ● | DISABLED |
| HIGH-DENSITY MD TYPE B | L | λ/4~λ/2 (ADVANCE) | PRESENT | PRESENT | ADIP CRC | PRESENT "1.5" | O | O | ENABLED |
| HIGH-DENSITY MD TYPE C | L | λ/4~λ/2 (ADVANCE) | NO U-TOC | NO P-TOC | ADIP ECC | PRESENT "3" | ● | O | DISABLED |
| HIGH-DENSITY MD TYPE C | L | λ/4~λ/2 (ADVANCE) | NO U-TOC | NO P-TOC | ADIP ECC | PRESENT "3" | ● | ● | ENABLED |
| — | | | | | | | | | DOES NOT EXIST |

Disk Type Determination Method:

| | REFLECTIVITY | GROOVE DEPTH | U-TOC | P-TOC | ADIP ECC/CRC | BCA | H0 | H1 | |
|---|---|---|---|---|---|---|---|---|---|
| <1> | △ | ◎ | | | | | | | DETERMINATION IS POSSIBLE WITH ANY OF COMBINATIONS |
| <2> | △ | | ◎ | ◎ | | | | | |
| <3> | △ | | ◎ | ◎ | ◎ | | | ◎ | |
| <4> | △ | | ◎ | ◎ | | ◎ | | ◎ | |
| <5> | ◎ | | ◎ | ◎ | | ◎ | ◎ | | |
| <6> | | | ◎ | ◎ | | | | | |

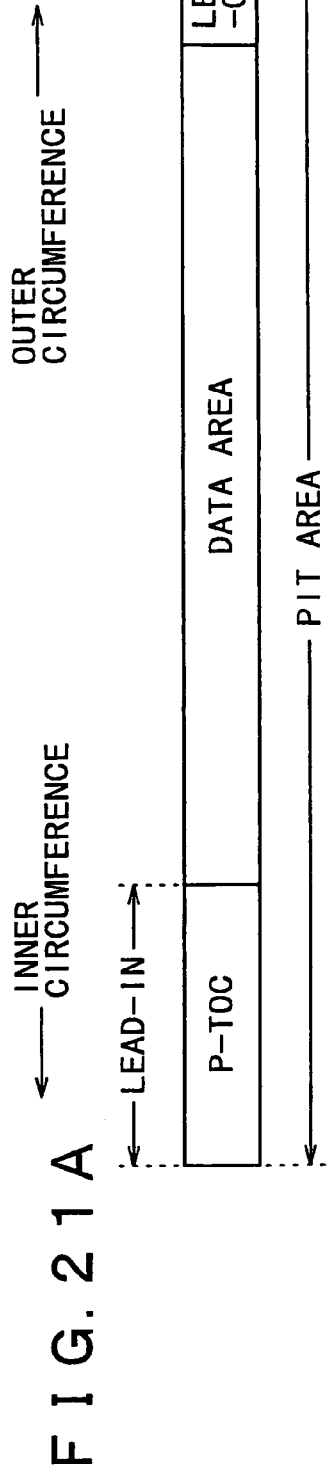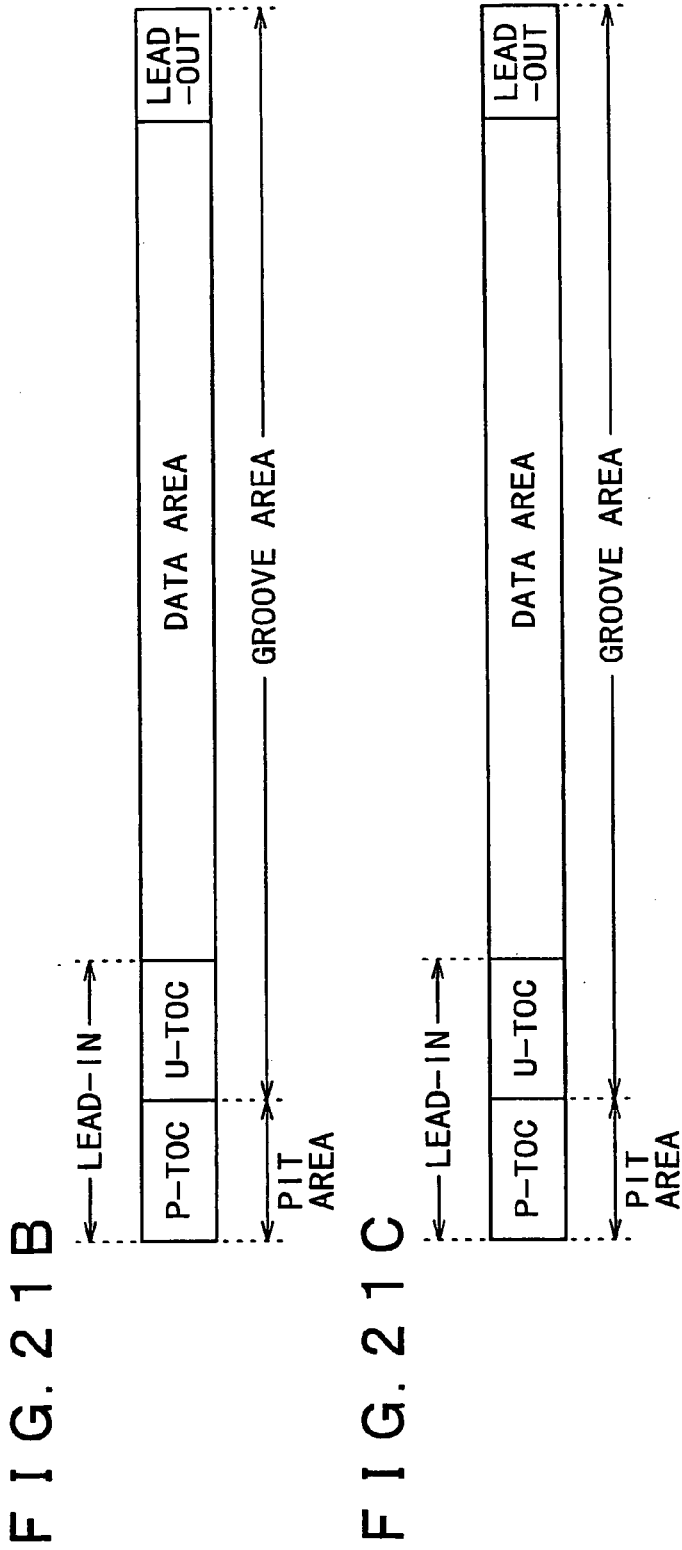
FIG. 21A  FIG. 21B  FIG. 21C

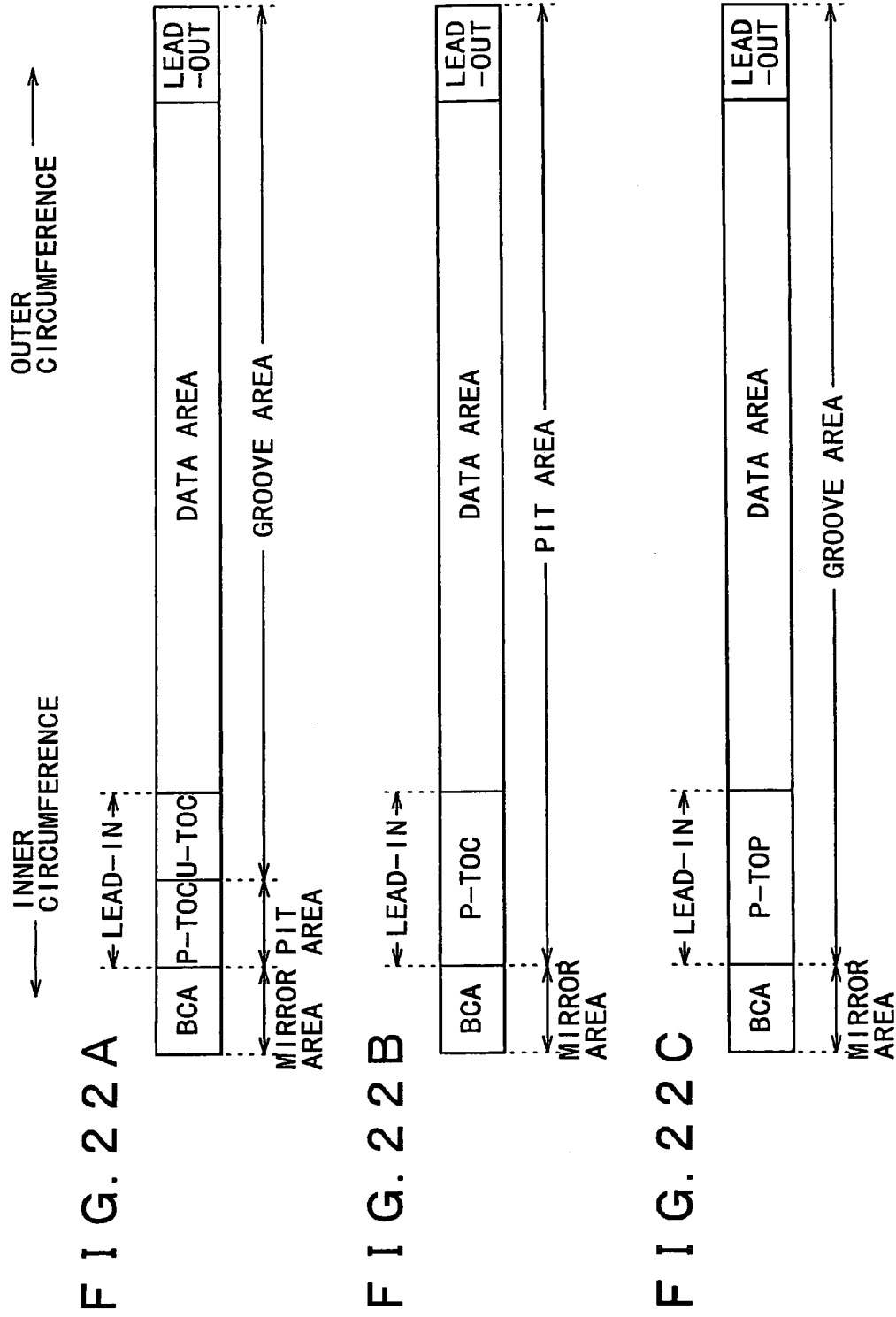

FIG. 23

| 16 BITS || 16 BITS ||  |
|---|---|---|---|---|
| MSB　　　LSB | MSB　　　LSB | MSB　　　LSB | MSB　　　LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| CLUSTER H | CLUSTER L | SECTOR | MODE | 3 |
|  |  |  |  | 4 |
|  |  |  |  | 5 |
| "M" | "I" | "N" | "I" | 6 |
| DISK TYPE | RECORDING POWER | FIRST TRACK NUMBER | LAST TRACK NUMBER | 7 |
| LEAD-OUT START ADDRESS (ROa) ||| USED SECTOR | 8 |
| POWER CALIBRATION AREA START ADDRESS (PCa) ||| RECORDING POWER | 9 |
| U-TOC START ADDRESS (USTa) ||||10 |
| RECORDABLE USER AREA START ADDRESS (RSTa) |||| 11 |
|  | P-TN01 | P-TN02 | P-TN03 | 12 |
| P-TN04 | P-TN05 | P-TN06 | P-TN07 | 13 |
| P-TN0248 | P-TN0249 | P-TN0250 | P-TN0251 | 74 |
| P-TN0252 | P-TN0253 | P-TN0254 | P-TN0255 | 75 |
|  |  |  |  | 76 |
|  |  |  |  | 77 |
| (01h) START ADDRESS ||| TRACK MODE | 78 |
| END ADDRESS ||||79 |
| (02h) START ADDRESS ||| TRACK MODE | 80 |
| END ADDRESS ||||81 |
| (03h) START ADDRESS ||| TRACK MODE | 82 |
| END ADDRESS ||||83 |
| (FCh) START ADDRESS ||| TRACK MODE | 580 |
| END ADDRESS ||||581 |
| (FDh) START ADDRESS ||| TRACK MODE | 582 |
| END ADDRESS ||||583 |
| (FEh) START ADDRESS ||| TRACK MODE | 584 |
| END ADDRESS ||||585 |
| (FFh) START ADDRESS ||| TRACK MODE | 586 |
| END ADDRESS ||||587 |

SYNC: rows 0-2
ADDRESS: row 3
SYSTEM ID: row 6
POINTER PORTION: rows 11-75
TABLE PORTION (255 PARTS TABLE): rows 78-587

FIG. 24

| | ← 16 BITS → | | ← 16 BITS → | | |
|---|---|---|---|---|---|
| | MSB     LSB | MSB     LSB | MSB     LSB | MSB     LSB | |
| SYNC { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| ADDRESS → | CLUSTER H | CLUSTER L | SECTOR (00h) | MODE (02h) | 3 |
| | | | | | 4 |
| | | | | | 5 |
| | | | | | 6 |
| | MAKER CODE | MODEL CODE | FIRST TRACK NUMBER | LAST TRACK NUMBER | 7 |
| | | | | USED SECTOR | 8 |
| | | | | | 9 |
| | | | | DISK SERIAL NUMBER | 10 |
| | DISK ID | | P-DFA | P-EMPTY | 11 |
| | P-FRA | P-TN01 | P-TN02 | P-TN03 | 12 |
| POINTER PORTION { | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | | | | | 76 |
| | | | | | 77 |
| (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| TABLE PORTION (255 PARTS TABLE) (FCh) | START ADDRESS | | | TRACK MODE | 580 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

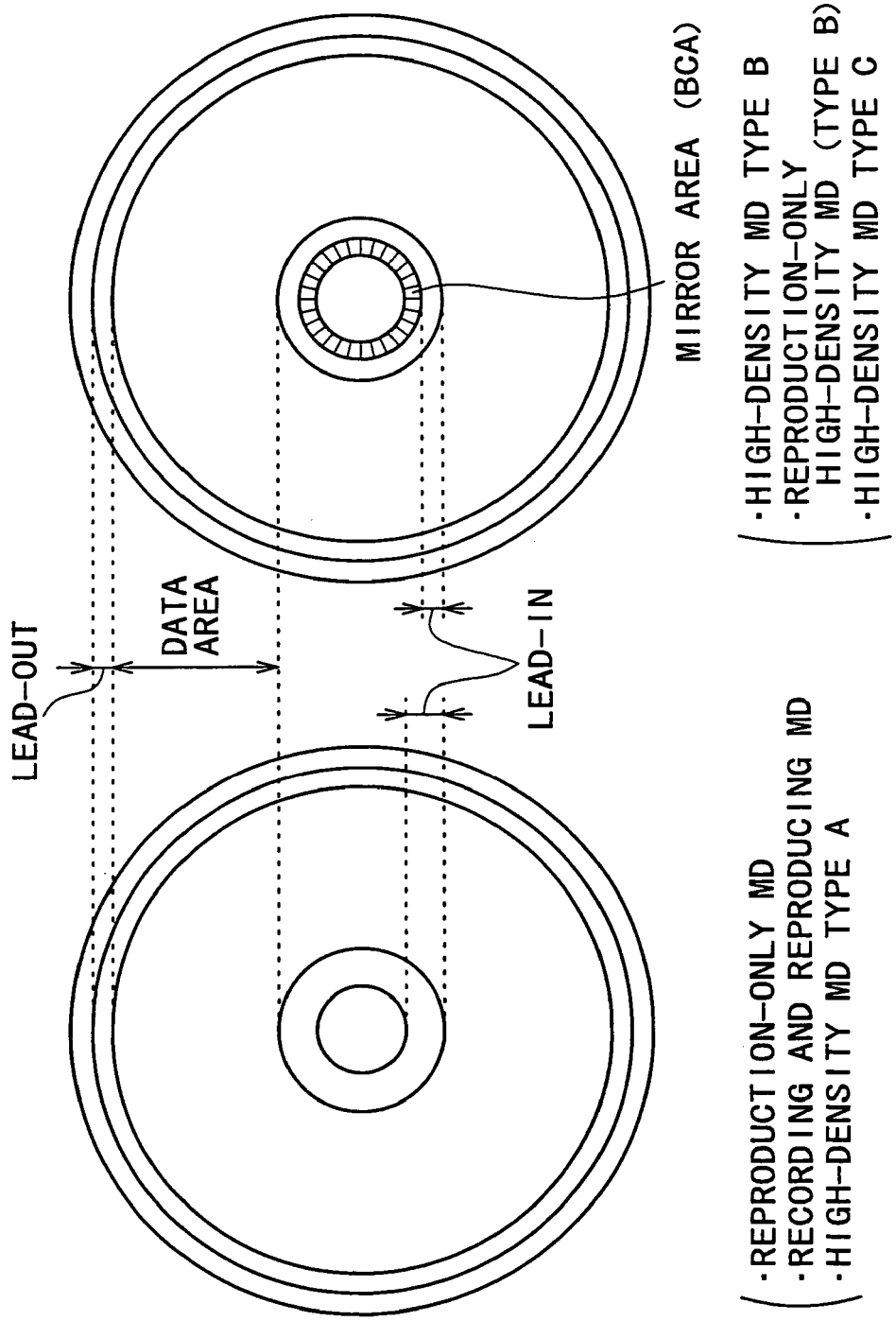

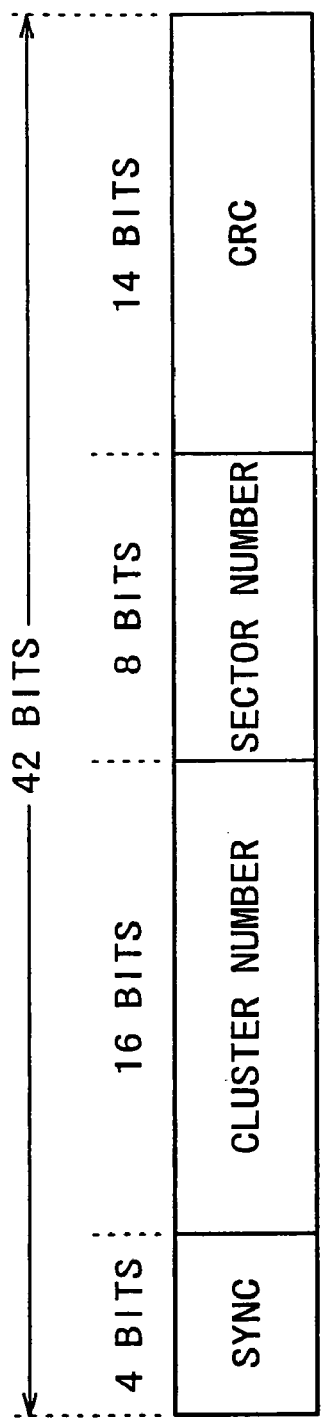
F I G. 2 6 A
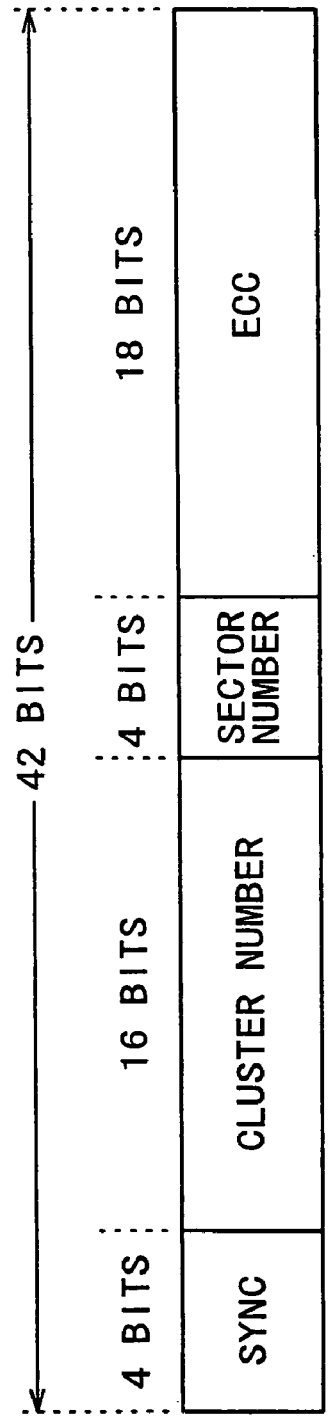
F I G. 2 6 B

FIG. 33A

○ OPEN  ● CLOSED

| DETECTION HOLE MODE | SW0 (WRITE PROTECT) | SW1 (REFLEC-TIVITY) | |
|---|---|---|---|
| MODE 0 | ○ | ○ | RECORDING AND REPRODUCING MD / HIGH-DENSITY MD TYPE A — WRITING DISABLED |
| MODE 1 | ○ | ● | REPRODUCTION-ONLY DISK |
| MODE 2 | ● | ○ | RECORDING AND REPRODUCING MD / HIGH-DENSITY MD TYPE A — WRITING ENABLED |
| MODE 3 | ● | ● | IMPOSSIBLE |

FIG. 33B

○ OPEN  ● CLOSED

| DETECTION HOLE MODE | SW0 (ALWAYS OPEN) | SW1 (WRITE PROTECT) | |
|---|---|---|---|
| MODE 0 | ○ | ○ | WRITING DISABLED |
| MODE 1 | ○ | ● | WRITING ENABLED |
| MODE 2 | ● | ○ | IMPOSSIBLE |
| MODE 3 | ● | ● | IMPOSSIBLE |

DISC DETECTION DEVICE AND ASSOCIATED METHOD

CROSS-REFERENCE TO RELATED APPLICATIONS

This application is a division and claims the benefit of priority under 35 U.S.C. §120 from U.S. application Ser. No. 10/508,406, filed Sep. 21, 2004, the entire contents of which are incorporated herein by reference, and is based upon and claims the benefit of priority under 35 U.S.C. § 119 from the prior Japanese Patent Applications No. 2003-024567 filed on Jan. 31, 2003 and No. 2004-019432 filed on Jan. 28, 2004.

TECHNICAL FIELD

The present invention relates to a recording medium in a form of a disk housed in a cartridge, a recording and reproducing apparatus, and a disk determining method.

BACKGROUND ART

Recently, various recording media have been developed, and high-density recording and the like have been increasing recording capacity. In developing a new recording medium, it is important to maintain compatibility with past recording media.

As a result of such a situation, various types of recording media coexist as recording media in one category (group).

Mini disks (MD: MINI DISC) now in widespread use will be taken as an example. Mini disks were originally developed for audio recording purposes. At that time, a reproduction-only disk on which data is all recorded by embossed pits on the disk and a recording and reproducing type disk were provided. The recording and reproducing type disk makes it possible for a user side to record music and the like by recording by a magnetic field modulation system using a magneto-optical disk.

Thereafter, a format referred to as MD-Data was developed to enable recording and reproduction of not only audio data but also data for computer use and the like. Further, a disk that handles data more widely and has achieved a significant increase in density (the disk is referred to as a "Hi-MD") has recently been developed. In addition, a new disk of new disks that are referred to as Hi-MDs has been developed.

While these disks are different disks in a category of so-called mini disks, the disks are housed in respective cartridges of substantially the same shape and size. These disks are able to be loaded into a recording and reproducing apparatus (disk drive apparatus) supporting the mini disk.

However, there are of course conventional models as disk drive apparatus supporting the mini disk, that is, models supporting only conventional types of disks. While new types of disk can be loaded into the conventional models, the conventional models may be unable to write data in a new format or cause an operation error or data destruction.

Thus, it is necessary to at least prevent problems such as an operation error and data destruction in various combinations of various types of disks and disk drive apparatus developed in different generations.

For these reasons, the disk drive apparatus side is required to infallibly determine various types of disks in the same category. Conventional disk determining techniques are disclosed in Japanese Patent Laid-open No. Hei 5-144165 and Japanese Patent Laid-open No. Hei 8-321129, for example.

Also, it is necessary to eliminate problems caused on the newly developed disks in the conventional models.

Considering support of the conventional models, a problem of managing disk writing possibility (preventing erroneous erasure) is particularly significant.

In the category of the mini disk system, for example, detection holes for indicating whether or not writing is possible are provided to a cartridge. A user can open and close the detection holes to select a state of data writing being prohibited (an erroneous erasure preventing state) and a state of writing being enabled by operating a slider provided in the cartridge.

Incidentally, writing possibility detection based on these detection holes is described in Japanese Patent Laid-open No. Hei 8-96552, Japanese Patent Laid-open No. Hei 5-36234, Japanese Patent Laid-open No. Hei 5-144165, and the like.

In order to prevent the problems, it is conceivable that the new disks not supported by the conventional models of disk drive apparatus are set non-writable as viewed from the conventional models.

However, when a detection hole is used to make the conventional models recognize that the new disks are "not writable" at all times, disk drive apparatus as new models cannot use the detection hole for writing possibility determination. It is thus necessary to provide another detection hole for writing possibility determination. This in turn causes the new disk drive apparatus a difficulty in writing possibility determination based on the detection holes of the conventional disks.

Furthermore, adding a detection hole as the new disks are developed leads to addition of detecting means on the apparatus side, which is not desirable in terms of cost. It also hinders reduction in size and thickness.

Thus, for example, management of data writing possibility becomes difficult as disk types are increased. In addition, disk drive apparatus of course needs to determine various types of disks correctly and perform proper processing.

It is accordingly an object of the present invention to enable correct disk type determination and proper writing possibility determination. The determination is performed without adding or changing a detecting device such as a switch or the like corresponding to a detection hole or the like for various types of recording media regardless of whether the disk drive apparatus is a new model or a conventional model.

DISCLOSURE OF INVENTION

According to the present invention, there is provided a recording medium as a recording disk housed in a cartridge. The recording medium includes a detection hole formed at a predetermined position on a reference plane of the cartridge; and opening and closing means for opening and closing the detection hole and, when the detection hole is in a closed state, forming a plane substantially horizontal level with the reference plane of the cartridge at the position of the detection hole.

The recording medium has at least a first detection hole and a second detection hole; and the second detection hole is opened and closed by the opening and closing means, and the first detection hole is in an open state at all times.

An external form of the recording medium is substantially similar to an external cartridge form of another recording medium having at least a first detection hole and a second detection hole at predetermined positions on a reference plane of a cartridge housing a disk, and the recording medium and the other recording medium are in a category of recording media that can be loaded into an identical apparatus; the second detection hole of the recording medium indicates that writing is prohibited when the second detection hole of the recording medium is in an open state; and the first detection hole of the other recording medium indicates that writing is prohibited when the first detection hole of the other recording medium is in an open state, and the second detection hole of the other recording medium indicates reflectivity of the disk.

The second detection hole of the recording medium is opened and closed according to operation of an operating projection disposed at a predetermined position of the cartridge, and operating directions of opening and closing of the second detection hole of the recording medium on a basis of a direction of operation of the operating projection of the recording medium are identical with operating directions of opening and closing of the first detection hole of the other recording medium on a basis of operation of an operating projection of the other recording medium.

A material thickness of the opening and closing means moved according to the operation of the operating projection is greater than a material thickness of a portion under a bottom surface of the first detection hole.

According to the present invention, there is provided a recording and reproducing apparatus for recording and reproducing a recording medium as one type of disk among a plurality of types of disks, the disk being housed in a cartridge of a predetermined form. The recording and reproducing apparatus includes at least one hole detection means for detecting an open state and a closed state of a plurality of detection holes disposed at predetermined positions of the cartridge; type determining means for irradiating the recording medium loaded in the recording and reproducing apparatus with a light signal, and determining the type of the disk housed in the cartridge loaded in the recording and reproducing apparatus on a basis of reflected light from the disk; and hole type determining means for determining hole types of the detection holes disposed at the predetermined positions of the cartridge on a basis of a result of determination by the type determining means.

At least one of the determined hole types indicates prohibition of writing to the disk.

A first detection hole is defined at a first predetermined position of the cartridge, and a second detection hole is defined at a second predetermined position of the cartridge; an open state of the second detection hole of a recording medium housing a first type of disk represents a state of writing to the disk being prohibited; an open state of the first detection hole of a recording medium housing a second type of disk represents a state of writing to the disk being prohibited, and the second detection hole of the recording medium housing the second type of disk represents reflectivity of the disk; and which of the open states of the detection holes indicating prohibition of disk writing is determined on the basis of the result of determination by the type determining means.

On a basis of a signal detected from light reflected from the disk, the type determining means determines the type of the disk by at least one of detection of reflectivity of the disk, detection of a phase difference of the signal, detection of managing information of the recording medium, detection of an address structure of the recording medium, and detection of a specific area of the recording medium.

The type determining means determines the type of the disk on a basis of detection results of the detection of the reflectivity, the detection of the phase difference, the detection of the managing information, and the detection of the structure.

The type determining means determines the type of the disk on a basis of detection results of the detection of the reflectivity, the detection of the managing information, and the detection of the structure.

The type determining means determines the type of the disk on a basis of detection results of the detection of the managing information and the detection of the specific area and a result of detection by the hole detection means.

According to the present invention, there is provided a recording and reproducing method for recording and reproducing a recording medium as one type of disk among a plurality of types of disks, the disk being housed in a cartridge of a predetermined form. The recording and reproducing method includes a hole detection step for detecting an open state and a closed state of a plurality of detection holes disposed at predetermined positions of the cartridge; a type determining step for irradiating the recording medium loaded in the recording and reproducing apparatus with a light signal, and determining the type of the disk housed in the cartridge loaded in the recording and reproducing apparatus on a basis of reflected light from the disk; and a hole type determining step for determining hole types of the detection holes disposed at the predetermined positions of the cartridge on a basis of a result of determination of the type of the disk.

The determined hole types indicate whether or not writing to the disk is possible.

A disposition of a first detection hole at a first predetermined position of the cartridge is defined, and a disposition of a second detection hole at a second predetermined position of the cartridge is defined; an open state of the first detection hole of a first type of disk represents prohibition of writing to the disk; and an open state of the second detection hole of a second type of disk represents prohibition of writing to the disk, and the first detection hole of the second type of disk represents reflectivity of the disk.

BRIEF DESCRIPTION OF THE DRAWINGS

FIG. 1 is a block diagram showing an example of configuration of a recording and reproducing apparatus according to an embodiment of the present invention.

FIGS. 2A and 2B are diagrams of assistance in explaining formats of disks according to the embodiment.

FIGS. 6A and 6B are diagrams of assistance in explaining detection holes of a recording and reproducing MD and a high-density MD type A.

FIGS. 7A and 7B are diagrams of assistance in explaining detection holes of a high-density MD type B/type C according to the embodiment.

FIGS. 8A, 8B, 8C, 8D, and 8E are diagrams of assistance in explaining a cartridge of the high-density MD type B/type C according to the embodiment.

FIGS. 12A and 12B are diagrams of assistance in explaining a modification of the mechanism for opening and closing the detection hole of the high-density MD type B/type C according to the embodiment.

FIG. 14 is a diagram of assistance in explaining combinations of elements for disk type determination according to the embodiment and determination methods.

FIGS. 21A, 21B, and 21C are diagrams of assistance in explaining area structures of a reproduction-only MD, a recording and reproducing MD, and a high-density MD type A.

FIGS. 22A, 22B, and 22C are diagrams of assistance in explaining area structures of a high-density MD type B, a reproduction-only high-density MD, and a high-density MD type C.

FIG. 23 is a diagram of assistance in explaining a P-TOC of an MD.

FIG. 24 is a diagram of assistance in explaining a U-TOC of an MD.

FIGS. 25A and 25B are diagrams of assistance in explaining area structures of MD disks.

FIGS. 26A and 26B are diagrams of assistance in explaining address structures of different types of MDs.

FIGS. 33A and 33B are diagrams of assistance in explaining detection hole modes according to the embodiment.

BEST MODE FOR CARRYING OUT THE INVENTION

Figure 3:
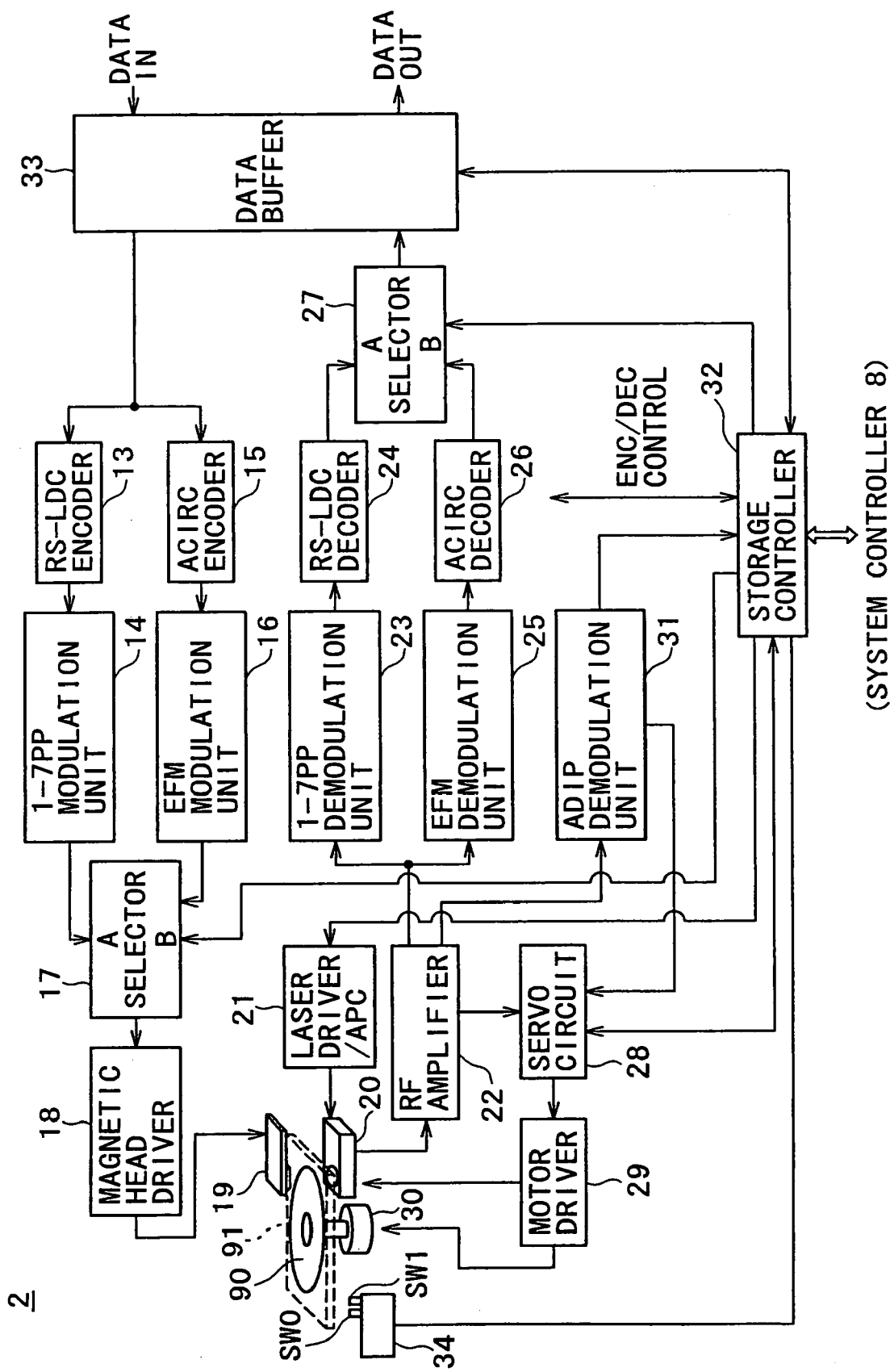
FIG. 3 is a block diagram of a storage unit of the recording and reproducing apparatus according to the embodiment.

Preferred embodiments of the present invention will hereinafter be described by taking as an example recording media in a category of a mini disk system and a disk drive apparatus. Description will be made in the following order.

1. Configuration of recording and reproducing apparatus (disk drive apparatus)
  2. Disk types
  3. Configuration of storage unit
  4. Cartridge detection holes
  5. Determining disk type
  6. Writing possibility determination processing 1. Configuration of Recording and Reproducing Apparatus (Disk Drive Apparatus)

A disk drive apparatus as an embodiment is a recording and reproducing apparatus for a mini disk (MD) system disk, or a magneto-optical disk on which data is recorded by a magnetic field modulation system. However, the recording and reproducing apparatus is compatible with not only music mini-disks, which have already been spread, but also high-density disks that enable higher density recording and are usable for storage of video data and various other data for computer use.

Configuration of the recording and reproducing apparatus according to the present embodiment will be described with reference to FIG. 1.

In FIG. 1, the recording and reproducing apparatus 1 according to the present embodiment is shown as an apparatus capable of data communication with an external apparatus as a personal computer (or a network) 100, for example.

For example, the recording and reproducing apparatus 1 can function as an external storage device for the personal computer 100 by being connected to the personal computer 100 by a transmission line 101 such as a USB cable or the like. Further, by being connected to a network via the personal computer 100 or a function enabling direct connection to the network, for example, the recording and reproducing apparatus 1 can download music and various data. The recording and reproducing apparatus 1 stores the music and various data on a disk (MD) loaded in a storage unit 2.

On the other hand, even when the recording and reproducing apparatus 1 is not connected to the personal computer 100 or the like, the recording and reproducing apparatus 1 functions as an AV (Audio Video) apparatus, for example. The recording and reproducing apparatus 1 can record audio data and video data (AV data) inputted from another AV apparatus or the like onto a disk. Further, The apparatus 1 can reproduce and output musical data and the like recorded on the disk.

Thus, the recording and reproducing apparatus 1 according to the present embodiment can be used as a general-purpose data storage apparatus by being connected to the personal computer 100 or the like. The apparatus 1 can also be used singly as an AV-ready recording and reproducing apparatus.

The recording and reproducing apparatus 1 includes the storage unit 2, a cache memory 3, a USB interface 4, an input-output processing unit 5, a display unit 6, an operating unit 7, a system controller 8, a ROM 9, a RAM 10, a cache managing memory 11, and an NV-RAM 12.

The storage unit 2 performs recording/reproduction on a disk loaded therein. So-called mini disk system disks used in the present embodiment and configuration of the storage unit 2 compatible with the disks will be described later.

The cache memory 3 buffers data to be recorded onto the disk by the storage unit 2 or data read from the disk by the storage unit 2. The cache memory 3 is formed by a D-RAM 2, for example.

Writing/reading of data into the cache memory is controlled by a task started by the system controller (CPU) 8.

The USB interface 4 performs processing for data transmission when connected to the personal computer 100 by the transmission line 101 as a USB cable, for example.

The input-output processing unit 5 performs processing for inputting and outputting data to be recorded and reproduced when the recording and reproducing apparatus 1 functions singly as an audio apparatus, for example.

The system controller 8 controls the whole of the recording and reproducing apparatus 1 and controls communication with the personal computer 100 connected to the recording and reproducing apparatus 1.

The ROM 9 stores an operating program for the system controller 8, fixed parameters, and the like.

The RAM 10 is used as a work area of the system controller 8, and as an area for storing various necessary information.

The RAM 10 for example stores various managing information and special information read from the disk by the storage unit 2. For example, the RAM 10 stores P-TOC data, U-TOC data, play list data, FAT data, a unique ID, a hash value, and the like. The P-TOC data and the U-TOC data are information for managing music tracks or the like recorded on a mini disk. A high-density disk conforming to a mini disk system that can be supported by the recording and reproducing apparatus 1 according to the present embodiment has a FAT file system constructed thereon in addition to a managing form referred to as P-TOC, U-TOC, or P-TOP. A play list is information for managing addresses and the like of musical data or the like obtained by an ATRAC system or the like on the high-density disk. The play list is recorded as one file on the FAT system. When the high-density disk is loaded, the FAT and play list information is also read. The unique ID, the hash value, and the like are information used for encoding/decoding and authentication processing in data transmission between the recording and reproducing apparatus 1 and the personal computer 100 or the like.

The cache managing memory 11 is formed by an S-RAM, for example, and stores information for managing a state of the cache memory 3. The system controller 8 controls data cache processing while referring to the cache managing memory 11. The information of the cache managing memory 11 will be described later.

The NV-RAM 12 (NonVolatile RAM) 12 is used as an area for storing data not to be lost even while power is off.

The display unit 6 displays various information to be presented to a user under control of the system controller 8. For example, the display unit 6 displays a state of operation, a mode state, information of a name of data such as a musical piece or the like, a track number, time information, and other information.

The operating unit 7 has operating keys, a jog dial, and the like formed thereon as various operating elements for user operation. The user specifies a required operation for recording, reproduction, or data communication by operating the operating unit 7. The system controller 8 performs predetermined control processing on the basis of operating information inputted through the operating unit 7.

Control effected by the system controller 8 when the personal computer 100 or the like is connected is for example as follows.

The system controller 8 can perform communication with the personal computer 100 connected via the USB interface 4. The controller 8 receives a command such as a request to write, read, or the like and transmits status information and other necessary information, for example.

In response to loading of a disk into the storage unit 2, for example, the system controller 8 instructs the storage unit 2 to read managing information and the like from the disk, captures the information via the cache memory 3, and then stores the information in the RAM 10.

The system controller 8 can grasp a track recording state of the disk by reading managing information of P-TOC, U-TOC, or P-TOP.

By a unique ID and a hash value, the system controller 8 can perform disk authentication and other processing or transmit these values to the personal computer 100 for processing.

When there is a request to read certain data from the personal computer 100, the system controller 8 makes the storage unit 2 read the data. However, in a case where the requested data is already stored in the cache memory 3, the reading of the data by the storage unit 2 is not required. This case represents a so-called cache hit.

Then the system controller 8 effects control to read the data written in the cache memory 3 and transmit the data to the personal computer 100 via the USB interface 4.

When there is a request to write certain data from the personal computer 100, the system controller 8 stores the data transmitted thereto in the cache memory 3. Then, the system controller 8 makes the storage unit 2 record the data stored in the cache memory 3 onto a disk.

Incidentally, data is recorded onto the disk with a cluster unit as a minimum unit. A cluster is 32 FAT sectors, for example.

If an amount of data requested by the personal computer 100 or the like to be recorded is a few sectors, for example, which is less than one cluster, processing referred to as blocking is performed. Specifically, the system controller 8 first makes the storage unit 2 read a cluster including corresponding FAT sectors. The read cluster data is written to the cache memory 3.

The system controller 8 then supplies FAT sector data (recording data) from the personal computer 100 to the cache memory 3 via the USB interface 4, to rewrite data of the corresponding FAT sectors in the stored cluster data.

The system controller 8 then transfers the cluster data, which is stored in the cache memory 3 in a state of the necessary FAT sectors being rewritten, to the storage unit 2 as recording data. The storage unit 2 writes the data in the cluster unit to the disk.

The description above has been made of control for data recording and reproduction involving transmission from and to the personal computer 100, for example. Data transfer at times of recording and reproducing audio data of a mini disk system and the like is performed via the input-output processing unit 5, for example.

The input-output processing unit 5 includes an analog audio signal input unit such as a line input circuit/microphone input circuit or the like, an A/D converter, and a digital audio data input unit as an input system, for example. The input-output processing unit 5 also includes an ATRAC compression encoder/decoder. The ATRAC compression encoder/decoder is a circuit for compressing/decompressing audio data by the ATRAC system. Incidentally, the recording and reproducing apparatus according to the present embodiment may of course be configured to be able to record and reproduce compressed audio data in different formats of MP3 and the like, for example. In this case, it suffices for the recording and reproducing apparatus to have an encoder/decoder supporting these formats of the compressed audio data.

Though not specifically limited in the present embodiment, recordable and reproducible formats for video data may include for example MPEG4 and the like. Then, it suffices for the input-output processing unit 5 to have an encoder/decoder supporting such formats.

The input-output processing unit 5 further includes a digital audio data output unit, a D/A converter, and an analog audio signal output unit such as a line output circuit/headphone output circuit or the like as an output system.

The input-output processing unit 5 in this case further includes an encryption processing unit 5a. The encryption processing unit 5a encrypts AV data to be recorded onto the disk by a predetermined algorithm, for example. The encryption processing unit 5a also performs decoding processing for decryption as required when AV data read from the disk is encrypted.

Audio data is recorded onto the disk as processing via the input-output processing unit 5 in a case where digital audio data (or an analog audio signal) is inputted as an input TIN to the input-output processing unit 5, for example. The inputted linear PCM digital audio data or linear PCM audio data obtained by converting the inputted analog audio signal by the A/D converter is subjected to ATRAC compression encoding and then stored in the cache memory 3. The data is read from the cache memory 3 in predetermined timing (a data unit corresponding to an ADIP cluster) to be transferred to the storage unit 2. The storage unit 2 modulates the compressed data transferred thereto by a predetermined modulation system and then records the data onto the disk.

When audio data of the mini disk system is reproduced from the disk, the storage unit 2 demodulates the reproduced data into ATRAC compressed data and transfers the ATRAC compressed data to the cache memory 3. The ATRAC compressed data is then read from the cache memory 3 and transferred to the input-output processing unit 5. The input-output processing unit 5 performs ATRAC compression decoding of the compressed audio data supplied thereto into linear PCM audio data and then outputs the linear PCM audio data from the digital audio data output unit. Alternatively, the input-output processing unit 5 converts the compressed audio data by the D/A converter into an analog audio signal for line output/headphone output.

It is to be noted that the configuration of the recording and reproducing apparatus 1 in FIG. 1 is an example; the input-output processing unit 5, for example, may have an input-output processing system supporting not only audio data but also video data.

Further, instead of USB, another external interface such as IEEE1394 or the like may be used for connection with the personal computer 100.

2. Disk Types

Disks used as recording media in the recording and reproducing apparatus 1 according to the present embodiment are disks of the mini disk system. Specifically, the recording and reproducing apparatus 1 supports not only conventional mini disks for music but also high-density disks capable of recording various data for computer use.

Description will first be made of various types of mini disks belonging to the category of the mini disk system and being loaded into the recording and reproducing apparatus 1 in this example.

For distinction, terms "reproduction-only MD," "recording and reproducing MD," "high-density MD type A," "high-density MD type B," "reproduction-only high-density MD," and "high-density MD type C" are used as names for the various types of mini disks. These names are for description in the present specification only. The various types of disks are as follows.

The reproduction-only MD refers to a reproduction-only MD for audio purposes called generally as a premastered disk. All data is recorded by embossed pits.

The recording and reproducing MD refers to an MD formed as a magneto-optical disk, allows data recording and reproduction by a magnetic field modulation system, and is used for audio purposes.

The reproduction-only MD and the recording and reproducing MD are so-called first-generation MDs and have now spread widely as audio MDs.

Incidentally, an MD-DATA is developed for general data recording uses as an extension of audio uses after the first-generation MDs. In the present specification, the MD-DATA will be treated as belonging to the recording and reproducing MD or the reproduction-only MD.

Thereafter, next-generation MDs with increased density in conformity to the MD system were developed. They will be referred to as high-density MDs. The high-density MDs as described herein are disks referred to also as "Hi-MDs" capable of being used widely for data storage purposes. The high-density MDs have achieved a recording capacity more than twice that of the first-generation MDs.

The high-density MDs have been developed into a few types now. These types will be referred to as the "high-density MD type A," the "high-density MD type B," and the "high-density MD type C" as mentioned above. They correspond to recording media according to the embodiment of the present invention.

The high-density MD type A is a disk referred to as a "Hi-MD1."

The high-density MD type B is a disk referred to as a "Hi-MD1.5."

The high-density MD type C is a disk referred to as a "Hi-MD3."

In the high-density MD type B (Hi-MD1.5), a reproduction-only type using embossed pits has been devised. This type will be referred to as a "reproduction-only high-density MD" so as to be distinguished from the high-density MD type B.

It is to be noted that the high-density MD type B/type C corresponds to a recording medium according to the embodiment of the present invention.

FIGS. 2A and 2B show a comparison between specifications of the first-generation MDs defining the reproduction-only MD, the recording and reproducing MD, and the MD-DATA and specifications of the high-density MDs defining the high-density MD type A, the high-density MD type B, the reproduction-only high-density MD, and the high-density MD type C.

As shown in FIG. 2A, as a format for the first-generation MDs and the MD-DATA, a track pitch is 1.6 μm, and a bit length is 0.59 μm/bit. A laser wavelength λ=780 nm, and a numerical aperture NA of an objective lens=0.45.

The recording and reproducing MD employs a groove recording system as a recording system thereof. That is, the recording and reproducing MD uses a groove formed on a disk surface as a track for recording and reproduction.

As an addressing system, the recording and reproducing MD employs a system in which a groove (track) is formed by a single spiral, and a wobbled groove having a wobble formed as address information on both sides of the groove is used.

Incidentally, in the present specification, an absolute address recorded by wobbling is also referred to as an ADIP (Address in Pregroove).

On the reproduction-only MD, no groove is formed, a track is formed by an embossed pit string, and addresses are recorded together with data.

These first-generation MDs use an EFM (8-14 conversion) system as a recording data modulation system. The first-generation MDs use ACIRC (Advanced Cross Interleave Reed-Solomon Code) as an error correction system and use a convolution type data interleave. A data redundancy is 46.3%.

A data detection system is a bit-by-bit system. As a disk driving system, CLV (Constant Linear Verocity) is used. A CLV linear velocity is 1.2 m/s.

A standard data rate at times of recording and reproduction is 133 kB/s. A recording capacity is 164 MB (140 MB for the MD-DATA).

A data unit of a cluster is a minimum data rewriting unit. The cluster includes 36 sectors formed by 32 main sectors and four link sectors.

For the high-density MDs, on the other hand, two specifications currently exist: a specification for the high-density MD type A and type B (including the reproduction-only high-density MD), and a specification for the high-density MD type C having an even higher density.

First, in the case of the high-density MD type A/type B, a track pitch is 1.5 to 1.6 μm, a linear density is 0.437 μm/bit, and a recording capacity is increased to 300 MB. A transfer rate at a standard speed is 4.37 Mbps, and a linear velocity is 2.4 m/sec.

In the case of the high-density MD type C, a track pitch is 1.25 μm, a linear density is 0.16 μm/bit, and a recording capacity is increased to 1 GB. A transfer rate at a standard speed is 9.83 Mbps, and a linear velocity is 1.98 m/sec.

Incidentally, though not shown in FIG. 2B, an RLL (1, 7) PP system (RLL; Run Length Limited, and PP: Parity preserve/Prohibit rmtr [repeated minimum transition runlength]), which is considered suitable for high-density recording, is used as a recording data modulation system of the high-density MDs, and an RS-LDC (Reed Solomon-Long Distance Code) system with BIS (Burst Indicator Subcode), which has a higher correction capability, is used as an error correction system. A data interleave of a block completion type is used. A data redundancy is 20.50%.

A data detection system is a Viterbi decoding system using partial response PR (1, 2, 1) ML.

Incidentally, the RLL (1-7) modulation and the RS-LDC error correction system are techniques disclosed in for example Japanese Patent Laid-open No. Hei 11-346154, International Publication WO 00/07300, and the like.

A disk driving system is CLV (Constant Linear Verocity) or ZCAV (Zone Constant Angular Verocity).

3. Configuration of Storage Unit

The storage unit 2 shown in FIG. 1 is a disk drive unit that can support the first-generation MDs and the high-density MDs as general-purpose data recording media as described above.

An example of configuration of the storage unit 2 is shown in FIG. 3.

A disk 90 shown in the figure represents the above-described various disks. The disk 90 is housed in a cartridge 91.

The disk 90 loaded in the storage unit 2 is driven for rotation by the CLV system by a spindle motor 30.

An optical head 20 irradiates the disk 90 with laser light at a time of recording/reproduction.

The optical head 20 produces a laser output at a high level to heat a recording track to the Curie temperature at a time of recording. The optical head 20 produces a laser output at a relatively low level to detect data from reflected light by magnetic Kerr effect at a time of reproduction. For this, though not shown in detail, the optical head 20 includes an optical system and a photodetector for detecting reflected light. The optical system includes a laser diode, a polarization beam splitter, an objective lens, and the like as laser output means. The objective lens included in the optical head 20 is held so as to be displaceable in a direction of a radius of the disk and a direction to move toward and away from the disk by a biaxial mechanism, for example.

A magnetic head 19 is disposed at a position opposite to the optical head 20 with the disk 90 interposed between the magnetic head 19 and the optical head 20. The magnetic head 19 applies a magnetic field modulated by recording data to the disk 90.

Further, though not shown, a sled motor and a sled mechanism are provided to move the whole of the optical head 20 and the magnetic head 19 in the direction of the radius of the disk.

In addition to a recording and reproducing head system including the optical head 20 and the magnetic head 19 and a disk rotation driving system including the spindle motor 30, the storage unit 2 includes a recording processing system, a reproduction processing system, a servo system, and the like.

The recording processing system includes: a part for performing modulation by a first modulation system (EFM modulation and ACIRC encode) at a time of recording a first-generation MD; and a part for performing modulation by a second modulation system (RLL (1-7) PP modulation and RS-LDC encode) at a time of recording a high-density MD.

The reproduction processing system includes: a part for performing demodulation (EFM demodulation and ACIRC decode) for the first modulation system at a time of reproducing a first-generation MD (and U-TOC of a high-density MD); and a part for performing demodulation (RLL (1-7) demodulation based on data detection using partial response PR (1, 2, 1) and Viterbi decoding, and RS-LDC decode) for the second modulation system at a time of reproducing a high-density MD.

Information detected as reflected light resulting from laser irradiation of the disk 90 by the optical head 20 (photocurrent obtained by detecting laser reflected light by the photodetector) is supplied to an RF amplifier 22.

The RF amplifier 22 subjects the detected information inputted thereto to current-voltage conversion, amplification, matrix operation, and the like. The RF amplifier 22 extracts a reproduced RF signal as reproduced information, a tracking error signal TE, a focus error signal FE, groove information (ADIP information recorded by track wobbling on the disk 90), and the like.

At the time of reproducing a first-generation MD, the reproduced RF signal obtained by the RF amplifier 22 is processed by an EFM demodulation unit 25 and an ACIRC decoder 26.

Specifically, the reproduced RF signal is binarized into an EFM signal string and then subjected to EFM demodulation by the EFM demodulation unit 25. The reproduced RF signal is further subjected to error correction and deinterleave processing by the ACIRC decoder 26. Thus, at this point, the reproduced RF signal is converted into a state of ATRAC compressed data.

At the time of reproducing a first-generation MD, a selector 27 selects a B contact side, so that the demodulated ATRAC compressed data is outputted as reproduced data from the disk 90. That is, the compressed data is outputted from the storage unit 2 via a data buffer 33 and then supplied to the cache memory 3 in FIG. 1.

At the time of reproducing a high-density MD, on the other hand, the reproduced RF signal obtained by the RF amplifier 22 is processed by an RLL (1-7) PP demodulation unit 23 and an RS-LDC decoder 24.

Specifically, the RLL (1-7) PP demodulation unit 23 obtains from the reproduced RF signal reproduced data as an RLL (1-7) code string by data detection using PR (1, 2, 1) and Viterbi decoding. Then, the RLL (1-7) PP demodulation unit 23 subjects the RLL (1-7) code string to RLL (1-7) demodulation. The result is further subjected to error correction and deinterleave processing by the RS-LDC decoder 24.

At the time of reproducing a high-density MD, the selector 27 selects an A contact side, so that the demodulated data is outputted as reproduced data from the disk 90. That is, the demodulated data is outputted from the storage unit 2 via the data buffer 33 and then supplied to the cache memory 3 in FIG. 1.

The tracking error signal TE and the focus error signal FE outputted from the RF amplifier 22 are supplied to a servo circuit 28. The groove information is supplied to an ADIP demodulation unit 31.

The ADIP demodulation unit 31 band-limits the groove information by a band-pass filter to extract a wobble component and thereafter performs FM demodulation and biphase demodulation to extract an ADIP address.

The extracted ADIP address as absolute address information on the disk is supplied to a storage controller (CPU) 31. The storage controller 32 performs required control processing on the basis of the ADIP address.

The groove information is also supplied to the servo circuit 28 for spindle servo control.

The servo circuit 28 generates a spindle error signal for CLV servo control on the basis of an error signal obtained by integrating a phase error between the groove information and a reproduction clock (PLL system clock at the time of decoding), for example.

The servo circuit 28 also generates various servo control signals (a tracking control signal, a focus control signal, a sled control signal, a spindle control signal, and the like) on the basis of the spindle error signal, the tracking error signal TE and the focus error signal FE supplied from the RF amplifier 22 as described above, or a track jump command, an access command, and the like from the storage controller 32. The servo circuit 28 outputs the various servo control signals to a motor driver 29. That is, the servo circuit 28 performs necessary processing such as phase compensation processing, gain processing, target value setting processing, and the like in response to the servo error signals and the commands and then generates the various servo control signals.

The motor driver 29 generates required servo drive signals on the basis of the servo control signals supplied from the servo circuit 28. The servo drive signals in this case are a biaxial drive signal (two signals for a focus direction and a tracking direction) for driving the biaxial mechanism, a sled motor drive signal for driving the sled mechanism, and a spindle motor drive signal for driving the spindle motor 30.

With such servo drive signals, focus control and tracking control for the disk 90 and CLV control on the spindle motor 30 are performed.

In operation of recording on the disk 90, data is supplied from the cache memory 3 to the data buffer 33.

At the time of recording onto a first-generation MD, a selector 17 is connected to a B contact, so that an ACIRC encoder 15 and an EFM modulation unit 16 function.

In this case, compressed data from an audio processing unit not shown in the figure is interleaved and provided with error correcting code by the ACIRC encoder 15 and thereafter subjected to EFM modulation by the EFM modulation unit 16.

Then, the EFM modulated data is supplied to a magnetic head driver 18 via the selector 17, and a magnetic head 19 applies a magnetic field to the disk 90 on the basis of the EFM modulated data, whereby data recording is performed.

At the time of recording onto a high-density MD, the selector 17 is connected to an A contact, so that an RS-LDC encoder 13 and an RLL (1-7) PP modulation unit 14 function.

In this case, high-density data from the cache memory 3 is interleaved and provided with error correcting code by an RS-LDC system by the RS-LDC encoder 13 and thereafter subjected to RLL (1-7) modulation by the RLL (1-7) PP modulation unit 14.

Then, recording data as an RLL (1-7) code string is supplied to the magnetic head driver 18 via the selector 17, and the magnetic head 19 applies a magnetic field to the disk 90 on the basis of the modulated data, whereby data recording is performed.

A laser driver/APC 21 makes a laser diode perform laser light emission operation at the time of reproduction and at the time of recording as described above and also performs so-called APC (Automatic Lazer Power Control) operation.

Specifically, though not shown, a detector for monitoring laser power is provided within the optical head 20. A monitoring signal is fed back to the laser driver/APC 21. The laser driver/APC 21 compares current laser power obtained as the monitoring signal with set laser power and reflects an error between the current laser power and the set laser power in a laser driving signal. As a result, the laser driver/APC 21 effects control to stabilize the laser power outputted from the laser diode at a set value.

Incidentally, for the laser power, the storage controller 32 sets values of reproducing laser power and recording laser power in a register within the laser driver/APC 21.

The operations described above (access, various servo, data writing, data reading, and data transfer operations) are performed under control of the storage controller 32 based on instructions from the system controller 8.

As will be described later, the cartridge 91 housing the disk 90 as a mini disk has detection holes formed thereon to indicate whether or not writing is possible and disk reflectivity. The detection hole for indicating whether or not writing is possible, in particular, can be opened and closed by user operation.

The storage unit 2 has a detection hole determination unit 34 for detecting states (open/closed or presence/absence) of the detection holes of such a cartridge 91.

The detection hole determination unit 34 has switches SW0 and SW1 formed at positions to be opposed to the detection holes in the cartridge 91 when the disk is loaded. The switches are pressed (turned on) when the detection holes are closed (or not present).

The on/off states of the switches SW0 and SW1 are supplied to the storage controller 32, whereby the storage controller 32 can determine the states of the detection holes.

Incidentally, while the storage controller 32 is provided within the storage unit 2 in this configuration example, an example in which the system controller 8 directly controls the parts within the storage unit 2 may be a configured.

4. Cartridge Detection Holes

Description will be made of the detection holes provided to the cartridge 91 of the various types of disks as described above. FIGS. 4 to 7B show a bottom surface and a side surface of cartridges of the various types of disks.

In the case of the disks in the category of MD as shown in FIGS. 4 to 7B, the disks 90 are housed in a flat cartridge 91 and are rotatable within the cartridge 91. The cartridge 91 has a slide type shutter 92. As shown in each of the figures, the disk 90 inside is exposed by opening the shutter 92. Incidentally, the shutter 92 is normally closed to shield the disk 90. When the disk is loaded into the disk drive apparatus, the shutter 92 is slid open by a mechanism within the deck.

Figure 4:
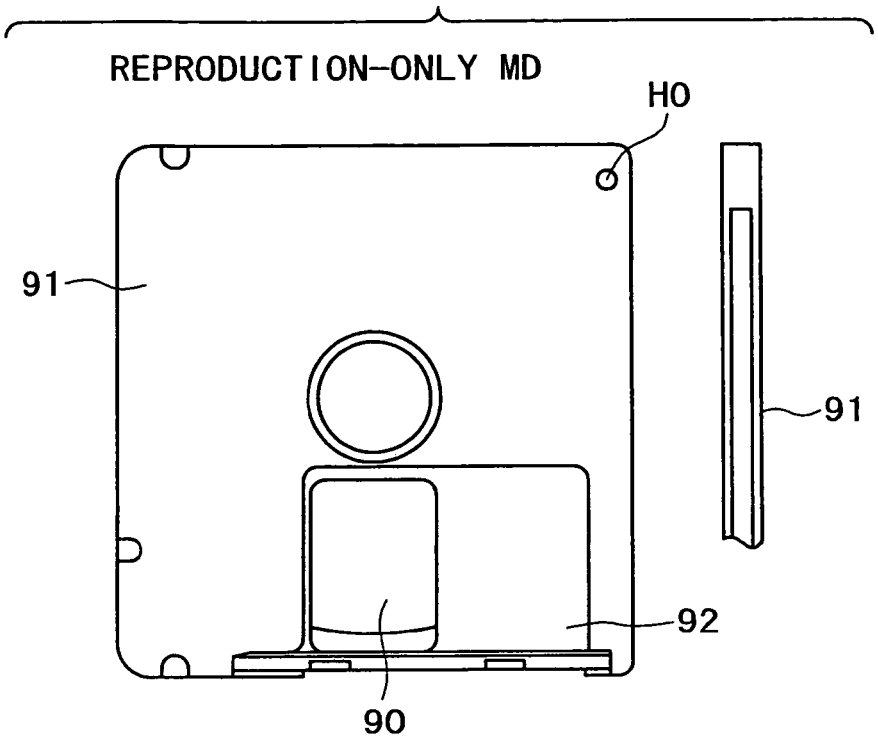
FIG. 4 is a diagram of assistance in explaining a detection hole of a reproduction-only MD.

FIG. 4 shows a reproduction-only MD. In the case of the reproduction-only MD, a detection hole H0 is formed at a predetermined position shown in FIG. 4 on a bottom surface side of a cartridge 91.

The position of the detection hole H0 is to determine whether or not writing is possible. Presence of the detection hole H0 (an open state of the detection hole H0) indicates that writing is impossible (writing is disabled).

In the case of the reproduction-only MD, since writing is naturally disabled, only a single hole as the detection hole H0 is formed, and no mechanism for opening and closing the hole is provided. Thus, a slider for opening and closing the hole is not provided on a side surface or the like of the cartridge 91.

FIGS. 6A and 6B show cartridges 91 of a recording and reproducing MD and a high-density MD type A.

In this case, detection holes H0 and H1 are provided. As in the reproduction-only MD, the detection hole H0 is provided to set whether or not writing is possible. In this case, a slider 93 is provided. The detection hole H0 can assume a closed state as shown in FIG. 6A and an open state as shown in FIG. 6B according to a position of the slider 93. That is, a user can open or close the detection hole H0 as shown in FIG. 6A or 6B by operating the slider 93 and thereby set writing enabled/disabled.

The open state of the detection hole H0 means that writing is impossible, and the closed state of the detection hole H0 means that writing is possible. Since the open state of the detection hole H0 indicates that writing is impossible, the detection hole H0 has the same meanings as in the case of the reproduction-only MD.

The second detection hole H1 in FIGS. 6A and 6B indicates reflectivity of the disk 90. The recording and reproducing MD and the high-density MD type A are magneto-optical disks and are thus different from the reproduction-only MD, which is an optical disk having embossed pits formed thereon. Magneto-optical disks have a very low reflectivity as compared with optical disks. For example, whereas optical disks have a reflectivity of about 70%, magneto-optical disks have a reflectivity of about 15 to 30%. Therefore, the disk drive apparatus (storage unit 2) needs to change internal signal processing settings (for example RF gain and the like) according to whether the disk is an optical disk or a magneto-optical disk. The detection hole H1 is provided for determination of this.

Presence (open state) of the detection hole H1 indicates the low reflectivity. Of course, in this case, the detection hole H1 is not opened or closed by the slider 93. That is, a fixed hole is formed as the detection hole H1.

In the case of the reproduction-only MD, on the other hand, absence of the detection hole H1 indicates the high reflectivity.

As shown in FIG. 4 and FIGS. 6A and 6B, in the first-generation MDs and the high-density MD type A, the position and presence or absence of the detection hole H0 are set to indicate whether or not writing is possible, and the position and presence or absence of the detection hole H1 are set to indicate reflectivity.

On the other hand, in the high-density MD type C and type B (and the reproduction-only high-density MD) according to the present embodiment, the detection hole H0 is in an open state at all times, and the detection hole H1 is used to set whether or not writing is possible.

FIGS. 7A and 7B show a cartridge 91 of the high-density MD type B/type C. As shown in FIGS. 7A and 7B, detection holes H0 and H1 are provided. Incidentally, while the detection hole H1 is a long hole, this is a mere example; as will be described later, the hole may be of a circular shape as in FIGS. 6A and 6B.

The detection hole H1 can be changed to a closed state in FIG. 7A and an open state in FIG. 7B by a slider 93.

In the case of the high-density MD type B/type C, the closed state in FIG. 7A of the detection hole H1 indicates that writing is possible, and the open state in FIG. 7B of the detection hole H1 indicates that writing is impossible.

On the other hand, the detection hole H0 is maintained in the open state regardless of a position of the slider 93.

Figure 5:
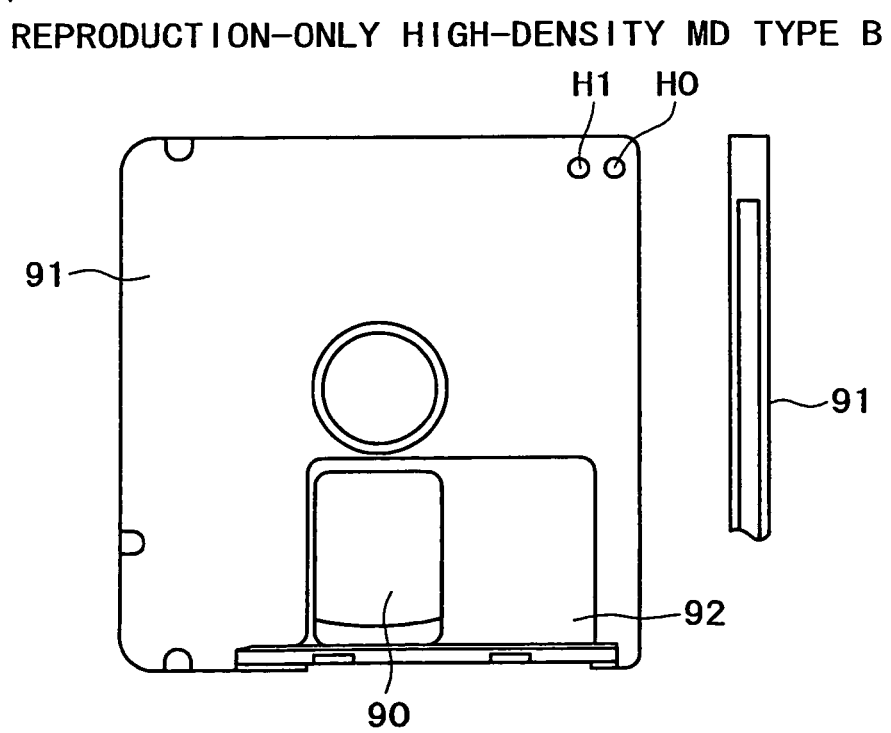
FIG. 5 is a diagram of assistance in explaining detection holes of a reproduction-only high-density MD.

FIG. 5 shows a cartridge 91 of the reproduction-only high-density MD as an embossed pit disk in the high-density MD type B. In this case, both of detection holes H0 and H1 are always formed as a fixed hole in an open state. As in the case of the high-density MD type B/type C in FIGS. 7A and 7B, the fixed detection hole H0 is in the open state at all times.

The reproduction-only high-density MD in FIG. 5 has the detection hole H1 as a fixed hole, because the reproduction-only high-density MD is not a writable disk. That is, the open state of the detection hole H1 in FIGS. 7A and 7B indicates that writing is impossible. In the case of the reproduction-only high-density MD in FIG. 5, the fixed detection hole H1 is formed into the "open state" to indicate that writing is impossible (writing is disabled).

Comparing FIG. 4 and FIG. 5, which both show reproduction-only optical disks, presence (open state) of the detection hole H0 in the reproduction-only MD of FIG. 4 indicates that "writing is impossible (writing is disabled)," while presence (open state) of the detection hole H1 in the reproduction-only high-density MD of FIG. 5 indicates that "writing is impossible (writing is disabled)."

The fixed detection hole H0 is thus formed in the high-density MD type B/type C of FIGS. 7A and 7B and the reproduction-only high-density MD of FIG. 5. The hole H0 provides a function that makes a conventional disk drive apparatus (conventional model) supporting only first-generation MDs recognize that the high-density MD type B/type C and the reproduction-only high-density MD are "not writable." Conventional models recognize the open state at the position of the detection hole H0 as indicating that "writing is impossible."

Since the detection hole H0 is fixed in the open state, the detection hole H0 in the high-density MD type B/type C cannot be used for writing possibility setting. Therefore, the detection hole H1 is used for writing possibility setting.

When meanings of the detection holes H0 and H1 differ between the case of the reproduction-only MD, the recording and reproducing MD, and the high-density MD type A and the case of the high-density MD type B/type C and the reproduction-only high-density MD, the disk drive apparatus according to the present embodiment capable of writing data to the high-density MD type B/type C cannot determine whether or not writing is possible simply on the basis of the states of the detection holes. Accordingly, as will be described later in detail, the disk drive apparatus (storage unit 2) in this example into which these various kinds of MDs are loaded detects a disk type and then determines meanings of the detection holes H0 and H1 according to the type.

Incidentally, the same situation occurs to a conventional model when the high-density MD type B/type C and the reproduction-only high-density MD are loaded therein. However, the conventional model is not desired to perform operation of recording on these types of disks. Accordingly, the detection hole H0 in these types of disks is in the open state at all times to solve the problem. Thus, the conventional model recognizes that "writing is impossible".

The conventional model is not desired to perform the operation of recording on these types of disks because of the following.

The conventional model inherently cannot perform recording on these types of disks particularly because of data format, physical properties, and the like. Therefore, when the conventional model accidentally performs recording on these types of disks, operation errors, data destruction, and the like may occur. Some operation errors may confuse the user, of course.

In addition, these types of disks have adopted encryption and authentication methods for protecting copyright of data. The conventional model does not support these methods.

For these reasons, the conventional model is required to determine that the high-density MD type B/type C and the reproduction-only high-density MD are simply "unrecordable."

Structure of detection holes H0 and H1 in a disk according to the present embodiment will be described in detail with reference to FIGS. 8A to 11D. In this case, the disk according to the present embodiment corresponds to the high-density MD type B/type C.

FIGS. 8A, 8B, 8C, 8D, and 8E are a bottom view, a plan view, a rear view, a left side view, and a right side view of the disk according to this example. As described above with reference to FIGS. 7A and 7B, the detection holes H0 and H1 are formed at predetermined positions on a bottom surface side of a cartridge, as shown in FIG. 8A.

As shown in FIG. 8E, a slider 93 is formed in a side of the cartridge. By operating the slider 93, it is possible to open and close only the detection hole H1.

Figure 9A:
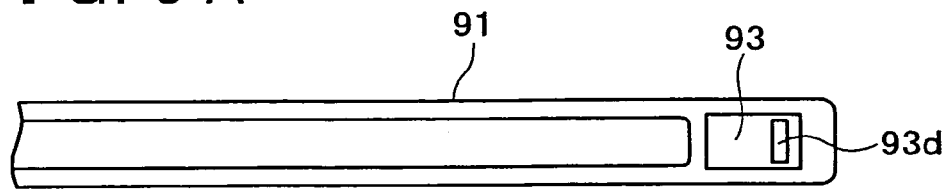
FIGS. 9A, 9B, 9C, and 9D are diagrams of assistance in explaining a mechanism for opening and closing the detection hole of the high-density MD type B/type C according to the embodiment.
Figure 9B:
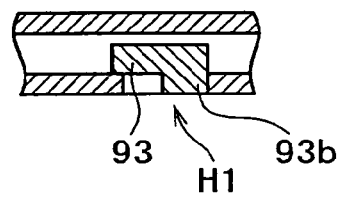
Figure 9C:
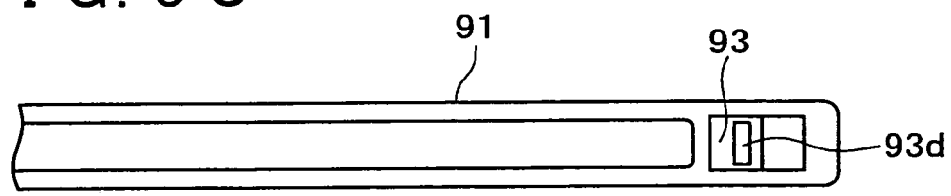
Figure 9D:
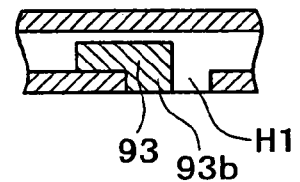

FIGS. 9A, 9B, 9C, and 9D show the side of the cartridge and an A—A section in FIG. 8A. FIGS. 9A and 9B show the closed state of the detection hole H1. FIGS. 9C and 9D show the open state of the detection hole H1.

Figure 10A:
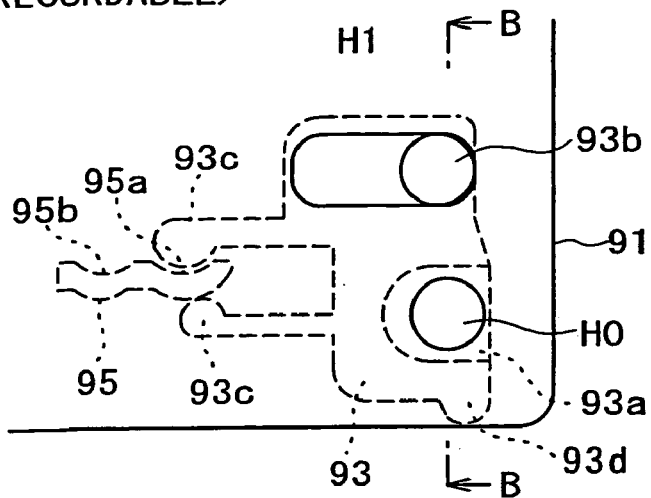
FIGS. 10A, 10B, 10C, 10D, and 10E are diagrams of assistance in explaining a mechanism for opening and closing the detection hole of the high-density MD type B/type C according to the embodiment.
Figure 10B:
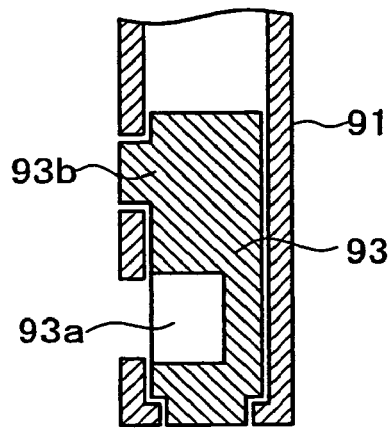

FIG. 10A is an enlarged view of a part of the detection holes H0 and H1 as viewed from the bottom surface side of the cartridge 91 when the detection hole H1 is in the closed state. FIG. 10B shows a B—B section at that time.

Figure 10C:
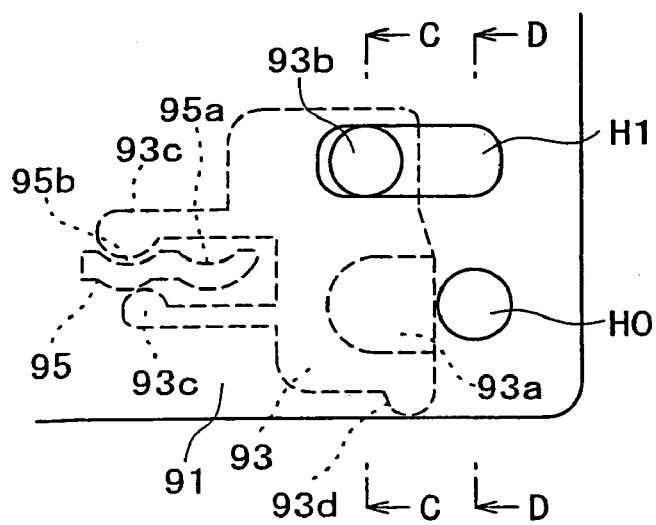
Figure 10D:
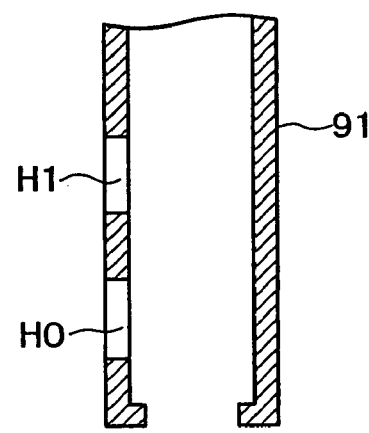
Figure 10E:
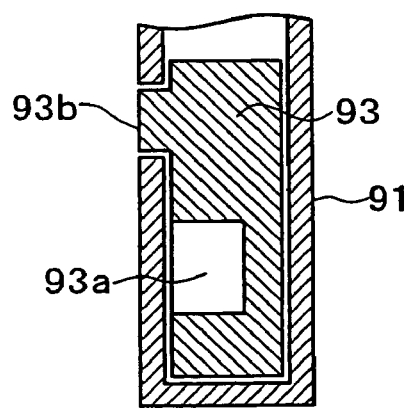

FIG. 10C is an enlarged view of a part of the detection holes H0 and H1 as viewed from the bottom surface side of the cartridge 91 when the detection hole H1 is in the open state. FIGS. 10D and 10E show a D—D section and a C—C section at that time.

As is understood from the figures, the slider 93 includes: a depression part 93a depressed in a direction of thickness of the cartridge at the position corresponding to the detection hole H0; a projection part 93b projecting in the direction of thickness of the cartridge at the position corresponding to the detection hole H1; an engaging part 93c for maintaining slide positions as the open state and the closed state; and an operating projection 93d for slide operation by the user.

The operating projection 93d enables the user to slide the slider 93 as shown in FIGS. 9A and 9C.

The slider 93 at the position in FIG. 9A maintains its positional state by engaging the engaging part 93c with a first curved part 95a of a wave-shaped rib 95 formed within the cartridge, as shown in FIG. 10A.

The slider 93 at the position in FIG. 9C maintains its positional state by engaging the engaging part 93c with a second curved part 95b of the wave-shaped rib 95, as shown in FIG. 10C.

As is understood from FIGS. 10A, 10B, 10C, and 10E, the depression part 93a at the position corresponding to the detection hole H0 in the slider 93 is depressed to a degree in the direction of thickness in an area wider than hole size of the detection hole H0.

Thus, as is understood from FIGS. 10A and 10C, the detection hole H0 is not closed regardless of the position of the slider 93. The detection hole H0 is therefore in the open state at all times.

As is understood from FIGS. 10A, 10B, 10C, and 10E, the projection part 93b at the position corresponding to the detection hole H1 in the slider 93 has such a size and a shape as to be fitted into the long detection hole H1. As shown in FIGS. 10A and 10C, the projection part 93b is situated within the long hole regardless of the slide position.

Incidentally, the detection hole H1 is a long hole in this example so as to allow the projection part 93b to move within the detection hole H1 at a time of sliding. As the detection hole H1, at least a circular hole at the position defined in the category of MD suffices. For example, it suffices to form a hole at a position of a right half of the long detection hole H1 in FIG. 10A. That is, the detection hole H1 does not need to be a long hole. The case will be described later as modifications.

A state of the right half of the long hole being closed by the projection part 93b as in FIG. 10A is the closed state of the detection hole H1, and a state of the projection part 93b not being situated at the right half of the long hole as in FIG. 10C is the open state of the detection hole H1.

As shown in FIGS. 9B and 9D, an upper surface of the projection part 93b of the slider 93 forms a surface substantially horizontal level with the bottom surface of the cartridge 91.

Thus, the slider 93 is formed as an opening and closing mechanism that maintains the detection hole H0 in the open state at all times and opens and closes the detection hole H1. Further, when the detection hole H1 is in the closed state, a plane of the slider 93, that is, a surface thereof to be brought into contact with the detection switch (switch SW1 in FIG. 3) of the disk drive apparatus is made substantially horizontal level with the plane of the cartridge 91 (of substantially the same height as the plane of the cartridge 91 in the direction of thickness) by the projection part 93b.

The reasons that the detection hole H0 is in the open state at all times have been described above. The detection hole H0 in the first-generation MDs and the like is used to determine whether or not writing is possible, and hence the detection hole H0 is used to make conventional models recognize that the disk according to this example is not writable.

The detection hole H1 can be opened and closed by the user to be used for writing possibility setting.

Utilizing for writing possibility setting the detection hole H1 originally used to detect reflectivity in the recording and reproducing MD and the like eliminates the need for providing the disk according to this example with a new third detection hole specially for writing possibility setting.

This means that a switch corresponding to the detection hole does not need to be added to the compatible disk drive apparatus. The apparatus has the advantage of reducing size, thickness, or cost.

When the detection hole H1 is in the closed state, the projection part 93b forms a surface substantially horizontal level with the plane of the cartridge for the following reasons.

As described above, the positions of the detection holes H0 and H1 are defined respectively as identical positions in the various kinds of disks. On the disk drive apparatus side, the switch SW0 corresponding to the detection hole H0 and the switch SW1 corresponding to the detection hole H1 are formed in the detection hole determination unit 34 in FIG. 3. The switches SW0 and SW1 are the same as in a disk drive apparatus as a conventional model.

Figure 11A:
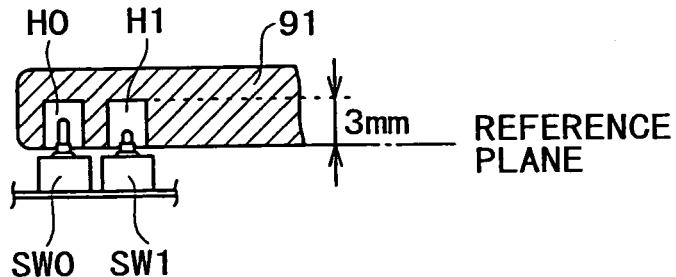
FIGS. 11A, 11B, 11C, and 11D are diagrams of assistance in explaining a relation between a closed state of the detection hole of the high-density MD type B/type C according to the embodiment and a cartridge plane.
Figure 11B:
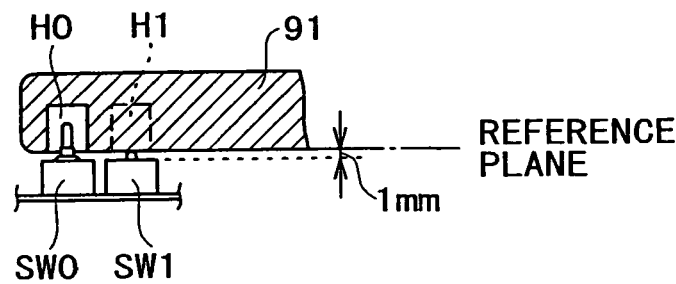
Figure 11C:
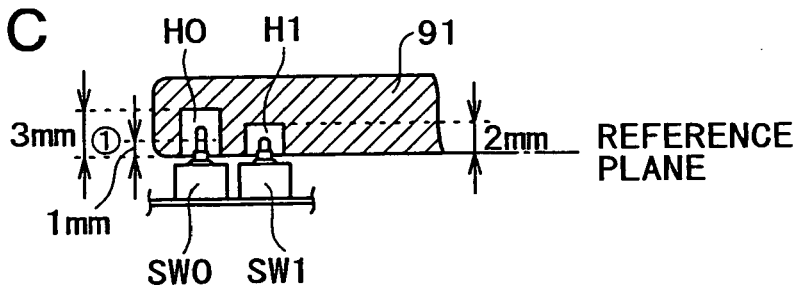
Figure 11D:
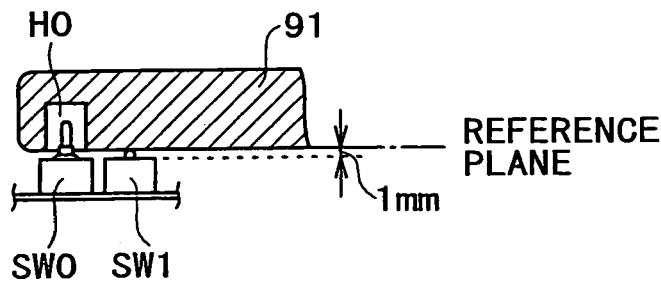

FIG. 11C shows states of detection holes H0 and H1 in a recording and reproducing MD (and high-density MD type A) and states of the corresponding switches SW0 and SW1, and FIG. 11D shows states of detection holes H0 and H1 in a reproduction-only MD and states of the corresponding switches SW0 and SW1.

The recording and reproducing MD in FIG. 11C is provided with detection holes H0 and H1. The detection hole H0 is about 3 mm deep in the direction of thickness of the cartridge. The detection hole H0 is opened and closed by a slider 93. When the detection hole H0 is in the closed state, a part of the slider is about 1 mm deep from the bottom surface (reference plane) of the cartridge 91 as indicated by a broken line ①. The 1 mm corresponds to thickness of the cartridge 91. In the case of the recording and reproducing MD, the slider 93 does not have a projection part 93b as in the above-described disk according to this example. Therefore, the detection hole H0 is "closed" by the slider at a position 1 mm deep.

The switch SW0 in contact with the part of the slider at the position 1 mm deep as viewed from the reference plane is judged to be turned on and thus indicate that the detection hole H0 is in the closed state. On the other hand, as shown in the figure, the switch SW0 not in contact with the part of the slider at the position 1 mm deep from the reference plane is judged to be turned off and thus indicate that the detection hole H0 is in the open state.

The switch SW0 is designed for an on/off stroke (stroke for detecting the open and closed states) range extending from the position about 1 mm deep from the reference plane to a position less than 3 mm deep (a little more than 2 mm deep).

The other detection hole H1 of the recording and reproducing MD is for example about 2 mm deep from the reference plane as shown in the figure. This is because of consideration for the reproduction-only MD in FIG. 11D, and the detection hole H1 is in an open state at all times.

As shown in FIG. 11D, the reproduction-only MD does not have a detection hole H1 formed therein. As described above, the detection hole H1 in the recording and reproducing MD is provided to indicate different reflectivity from that of the reproduction-only MD that does not have such a detection hole H1. Therefore, the switch SW1 needs to judge a state of absence of the detection hole H1 to be the closed state. Thus, the switch SW1 in contact with the bottom surface (reference plane) of the cartridge 91 (state of FIG. 11D) is judged to be turned on and thus indicate that the detection hole H1 is in the closed state. On the other hand, the switch SW1 not in contact with the reference plane as in FIG. 11C is judged to be turned off and thus indicate that the detection hole H1 is in the open state.

Thus, the switch SW1 is designed for an on/off stroke (stroke for detecting the open and closed states) range extending from the reference plane to a position less than 2 mm deep (a little more than 1 mm deep) from the reference plane.

That is, the conventional disk drive apparatus compatible with mini disks is designed such that the switches SW0 and SW1 have the same stroke, but the switch SW0 projects longer in the direction of thickness of the cartridge when the switches SW0 and SW1 are both in the off state.

Consideration will now be given to a case where the detection hole H1 is used for writing possibility setting and is opened and closed by a slider 93 as in the disk according to this example.

Supposing that the slider 93 does not have a projection part 93b as in the recording and reproducing MD, for example, when the detection hole H1 is in the closed state, the switch SW1 is in contact with the slider at a position 1 mm deep from the reference plane.

However, this state represents a substantially intermediate position in the stroke range of the switch SW1 of the conventional model. Considering various manufacturing errors, it is disadvantageous in clear on/off determination when the disk according to this example is loaded into the conventional model.

It is not disadvantageous in on/off determination when the switch SW1 corresponding to the detection hole H1 in the disk drive apparatus in this example (for example the storage unit 2 in FIG. 3) compatible with the disk according to this example (high-density MD type B/type C) is designed with a stroke range extending from a position 1 mm deep from the reference plane to a position less than 3 mm deep, as with the switch SW0. However, when a reproduction-only MD is loaded into the disk drive apparatus in this example, the switch SW1 is pressed against the bottom surface (reference plane) of the cartridge 91 because the reproduction-only MD does not have a detection hole H1. In this state, the switch SW1 is pressed in the on direction beyond the stroke range in the design, which can damage the switch SW1.

In order to prevent this, the stroke needs to be extended to a range covering the reference plane and the position less than 3 mm deep from the reference plane. That is, the switch SW1 of the same structure as in the conventional model cannot be employed.

Accordingly, in this example, the slider 93 is provided with the projection part 93b, and when the detection hole H1 is in the closed state, the plane of the projection part 93b is substantially horizontal level with the reference plane, as described above. Specifically, FIGS. 11A and 11B show the open state and the closed state of the detection hole H1 in the disk according to this example. The detection hole H1 is judged to be in the closed state when the switch SW1 is in contact with the position substantially horizontal level with the reference plane (that is, the projection part 93b) and is thus in an on state, as shown in FIG. 11B. The detection hole H1 is judged to be in the open state when the switch SW1 is not in contact with the reference plane and is thus in an off state, as shown in FIG. 11A.

That is, the following advantages are provided by setting the detection hole H1 in the closed state with the projection part 93b substantially horizontal level with the reference plane.

First, the detection hole H1 used for detection of reflectivity in the recording and reproducing MD and the like forms a substantially identical plane with the reference plane when the slider 93 closes the detection hole H1. The detection hole H1 is opened to such a position as to enable the switch SW1 to detect the open state fully when the detection hole H1 is opened by the slider 93, whereby the switch SW1 compatible with the disk according to this example can be realized without changing the stroke of the conventional switch SW1. That is, the disk drive apparatus supporting the disk according to this example can use switches SW0 and SW1 of the same structure as in the conventional model. This is advantageous in terms of manufacturing cost and ease of design.

In addition, the use in the disk drive apparatus according to this example of the same switches SW0 and SW1 as in the conventional model prevents problems of above-mentioned possibility of damage and the like when the reproduction-only MD is loaded into the disk drive apparatus according to this example. This is because the switch SW1 has a stroke originally set supposing absence of the detection hole H1.

Further, the unnecessary of changing (lengthening) the stroke of the switch SW1 is advantageous in reducing size and thickness of the apparatus.

In the above example, the detection hole H1 is made long so that the projection part 93b of the slider 93 does not obstruct slide movement. However, the detection hole H1 can be made circular. Modifications of the opening and closing mechanism for this are shown in FIGS. 12A and 12B and FIGS. 13A and 13B. A detection hole H1 shown in section in each of FIGS. 12A and 12B and FIGS. 13A and 13B is a circular hole provided in a cartridge 91.

FIGS. 12A and 12B show an example of an opening and closing mechanism formed by a slider 295 and a rotating lid 296. The slider 295 is slid to states shown in FIGS. 12A and 12B by operation of the user.

An axis part 296b of the rotating lid 296 is journaled to be rotatable by a bearing part 297 within the cartridge 91. Another axis part 296c of the rotating lid is journaled by a bearing part 298 provided to the slider 295.

In the state of FIG. 12A, a circular projecting part 296a formed on the rotating lid 296 is inserted into the detection hole H1, whereby the detection hole H1 is closed by a surface substantially horizontal level with the bottom surface of the cartridge 91.

Then, when the slider 295 is slid in a direction of an arrow a as in FIG. 12B, the axis part 296c is pulled, and thereby the rotating lid 296 is rotated on the axis part 296b in a direction of an arrow b, whereby the projecting part 296a is detached from the detection hole H1 to form an open state.

Figure 13A:
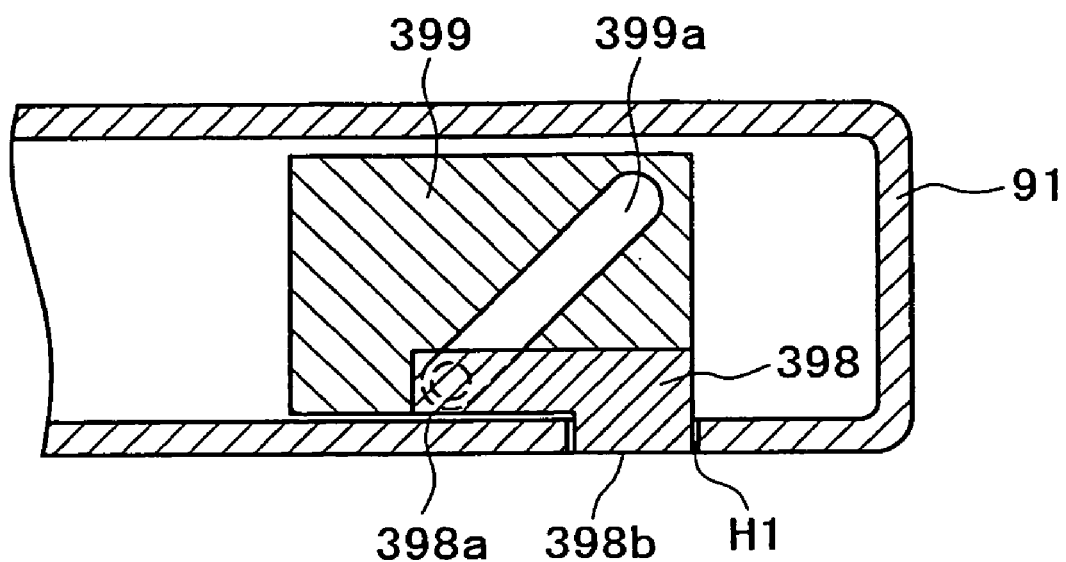
FIGS. 13A and 13B are diagrams of assistance in explaining a modification of the mechanism for opening and closing the detection hole of the high-density MD type B/type C according to the embodiment.
Figure 13B:
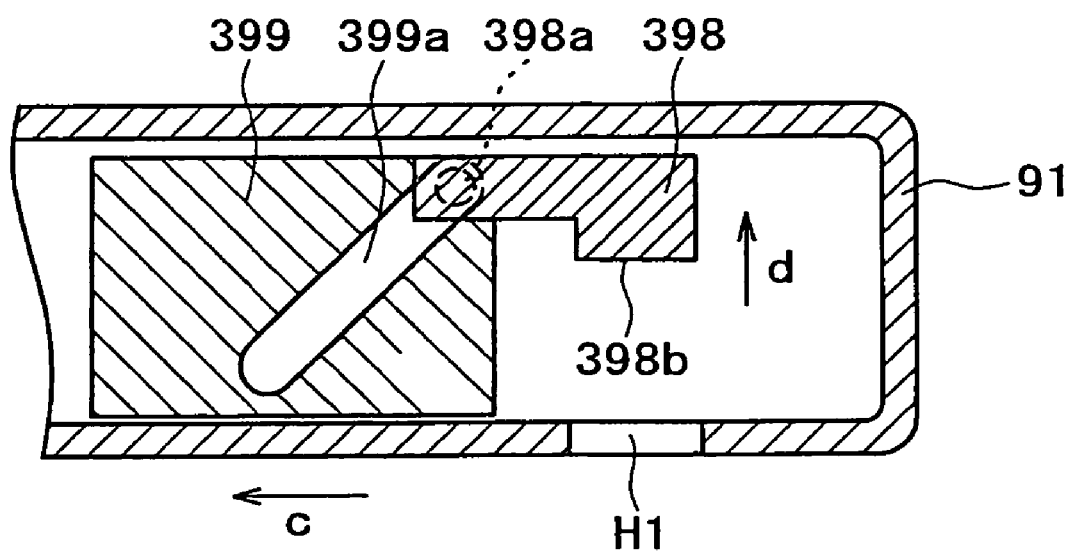

FIGS. 13A and 13B show an example of an opening and closing mechanism formed by a slider 399 and an ascending and descending lid 398. The slider 399 is slid to states shown in FIGS. 13A and 13B by operation of the user.

A camshaft 398a of the ascending and descending lid 398 is fitted in a cam groove 399a provided to the slider 399.

In the state of FIG. 13A, a circular projecting part 398b formed on the ascending and descending lid 398 is inserted into the detection hole H1, whereby the detection hole H1 is closed by a surface substantially horizontal level with the bottom surface of the cartridge 91.

Then, when the slider 399 is slid in a direction of an arrow c as in FIG. 13B, the camshaft 398a of the ascending and descending lid 398 slides within the cam groove 399a, and accordingly the ascending and descending lid 398 moves in a direction of an arrow d. Thereby the projecting part 398b is detached from the detection hole H1 to form an open state.

With such opening and closing mechanisms, for example, the detection hole H1 does not need to be a long hole and can be of the same circular shape as the detection hole H0. The circular detection hole H1 has an advantage in that an area from which dust and the like enter the cartridge 91 is reduced as compared with a long hole.

5. Determining Disk Type

As described above, meanings of the detection holes H0 and H1 of the cartridge 91 differ depending on the disk type. Thus, the disk drive apparatus in this example needs to determine the disk type to interpret states of the detection holes H0 and H1 when the disk 90 is loaded. Besides, it is of course essential for recording and reproducing processing to determine the disk type.

Methods (determining elements) for disk type determination will be described below, and thereafter concrete examples of type determination processing using combinations of the various determining elements will be described.

FIG. 14 shows relations between the various determining elements and disk types.

In this case, listed as determining elements using reflected light information obtained by the optical head 20 are disk reflectivity, phase difference due to groove depth, U-TOC contents, P-TOC contents, ADIP address structure, and BCA (Burst Cutting Area).

Incidentally, FIG. 14 also shows states of the detection holes H0 and H1 as elements for determining whether or not writing is possible rather than elements for disk type determination and shows whether writing is enabled/disabled on the basis of the states of the detection holes H0 and H1. This is because these are used for disk type determination in some cases.

As will be described later in more detail, the disk drive apparatus (storage unit 2) in this example detects a disk type from a part of disk reflectivity, phase difference due to groove depth, U-TOC contents, P-TOC contents, ADIP address structure, and BCA, or the states of the detection holes H0 and H1 in addition thereto. The disk drive apparatus also determines whether or not writing is possible using both the open/closed states of the detection holes H0 and H1 and the determined disk type.

Disk type determination methods <1> to <6> are shown in a lower part of FIG. 14, where combinations of determining elements used in the individual determining methods are represented by ⊙. Processing of the individual disk type determination methods <1> to <6> will be described later.

Description will first be made of the determining elements of disk reflectivity, phase difference due to groove depth, U-TOC contents, P-TOC contents, ADIP address structure, and BCA.

\<Disk Reflectivity\>

As described above, the reflectivity of optical disks having embossed pits formed thereon is high at about 70%, whereas the reflectivity of magneto-optical disks performing magnetic field recording is low at about 15 to 30%. Thus, as shown in FIG. 14, the reproduction-only MD and the reproduction-only high-density MD have the high reflectivity (H), and the recording and reproducing MD and the high-density MD type A/type B/type C have the low reflectivity (L). That is, by determining the reflectivity, it is possible to determine whether the disk is a reproduction-only MD or a reproduction-only high-density MD, or another type, that is, one of a recording and reproducing MD and a high-density MD type A/type B/type C.

Figure 15A:
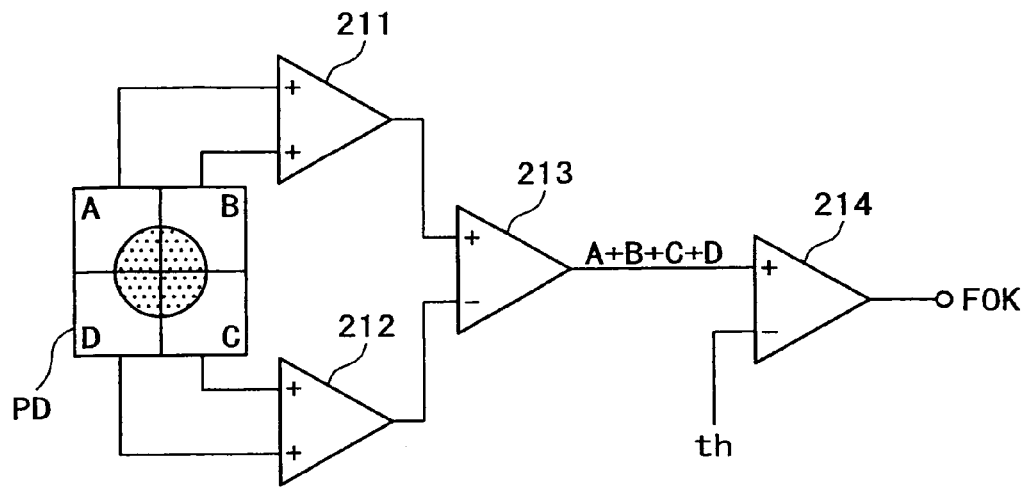
FIGS. 15A, 15B, and 15C are diagrams of assistance in explaining a determination based on reflectivity according to the embodiment.

The reflectivity can be detected by a circuit as shown in FIG. 15A. FIG. 15A shows a photodetector PD having four divided light receiving surfaces A, B, C, and D. This photodetector PD is one of a plurality of photodetectors PD disposed within the optical head 20.

Adders 211, 212, and 213 and a comparator 214 in FIG. 15A can be formed within the RF amplifier 22, for example.

The adder 211 adds together photoelectrically converted signals from the light receiving surfaces A and B of the photodetector PD.

The adder 212 adds together photoelectrically converted signals from the light receiving surfaces C and D of the photodetector PD.

The adder 213 adds together outputs of the adders 211 and 212. Thus, a sum signal from the light receiving surfaces A, B, C, and D, that is, a reflected light amount signal is obtained from the adder 213.

The comparator 214 compares the sum signal with a reference value th, and then outputs a result of the comparison as an FOK signal. This FOK signal indicates a focus pull-in range at a time of focus search.

Consideration will now be given to focus search in which the objective lens within the optical head 20 is forcefully moved in a direction toward and away from the disk 90 to perform focus servo pull-in.

As is already known, a focus error signal FE of an astigmatic system, for example, is a signal (A+C)−(B+D) from the four-divided-part detector as shown in FIG. 15A, for example. Such a focus error signal FE forms an S-shaped curve around a focusing point. A zero-crossing point in a linear region of the S-shaped curve is a focus point. Focus servo control is performed as control for pull-in to the zero-crossing point of the S-shaped curve.

A positional range of the objective lens (positional range in the direction toward and away from the disk) in which the S-shaped curve appears is extremely narrow as compared with a moving stroke range of the objective lens. Thus, for first pull-in to turn on the focus servo, the objective lens is moved forcefully to find a range where the S-shaped curve is obtained. This is focus search.

Figure 15B:
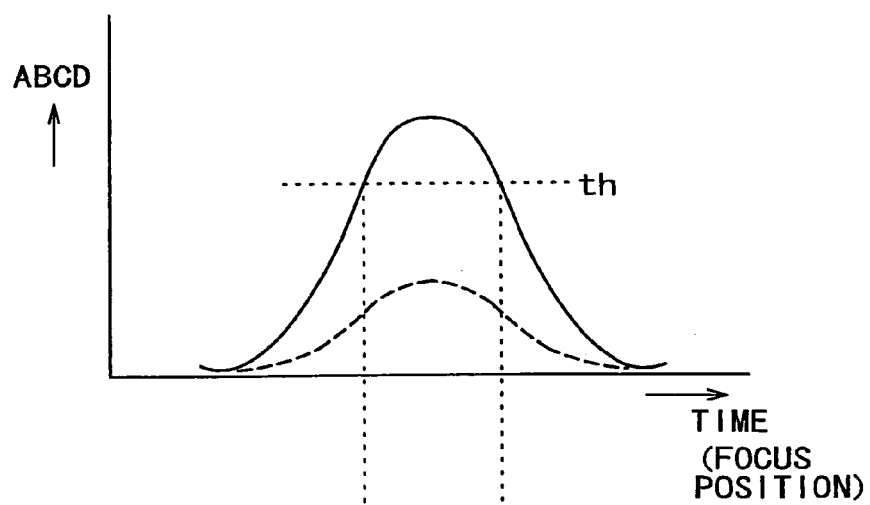
Figure 15C:

In this case, the above-mentioned sum signal has amplitude as shown in FIG. 15B in a focus pull-in range. The FOK signal in FIG. 15C obtained by comparing the amplitude with a predetermined reference value th indicates a range where an S-shaped curve appears as a focus error signal FE not shown in the figure.

Since the amount of reflected light obtained by the photodetector PD of course differs between the case of a disk with a high reflectivity and the case of a disk with a low reflectivity, various settings at the times of focus search, data reproduction, and the like are changed. For example, if a gain for a reflected light signal from a disk with a low reflectivity is not increased, a satisfactory signal cannot be obtained.

Utilizing this fact, when whether the disk is a high reflectivity disk or a low reflectivity disk is not known, that is, when reflectivity detection for disk type determination is to be performed, it suffices to perform focus search operation with a setting corresponding to high reflectivity disks (for example a low gain setting).

When the disk is a high reflectivity disk, focus search with the setting corresponding to high reflectivity disks provides a curve such as a solid line in FIG. 15B as a sum signal at a certain point. That is, the FOK signal becomes "H" at a certain point.

On the other hand, when the disk is a low reflectivity disk, only a low-level curve such as a broken line in FIG. 15 is obtained as a sum signal. That is, the FOK signal is not detected within a period of focus search.

Thus, whether the loaded disk is a high reflectivity disk or a low reflectivity disk can be detected by performing focus search operation with the setting corresponding to high reflectivity disks and determining whether the FOK signal is obtained during the focus search operation.

\<Phase Difference Due to Groove Depth\>

A phase difference between a push-pull signal and a pull-in signal (sum signal) obtained as reflected light information occurs depending on depth of a groove (pit) formed on the disk.

Considering a phase difference of the pull-in signal with respect to the push-pull signal as shown in FIG. 14, the reproduction-only MD, the reproduction-only high-density MD, and the high-density MD type C cause a phase advance of $\lambda/4$ to $\lambda/2$ ($\lambda$: wavelength), while the recording and reproducing MD and the high-density MD type A/type B cause a phase delay of 0 to $\lambda/4$.

Thus, by determining the phase difference, it is possible to determine whether the disk is one of a recording and reproducing MD, a reproduction-only high-density MD, and a high-density MD type C, or one of a recording and reproducing MD and a high-density MD type A/type B.

Figure 16:
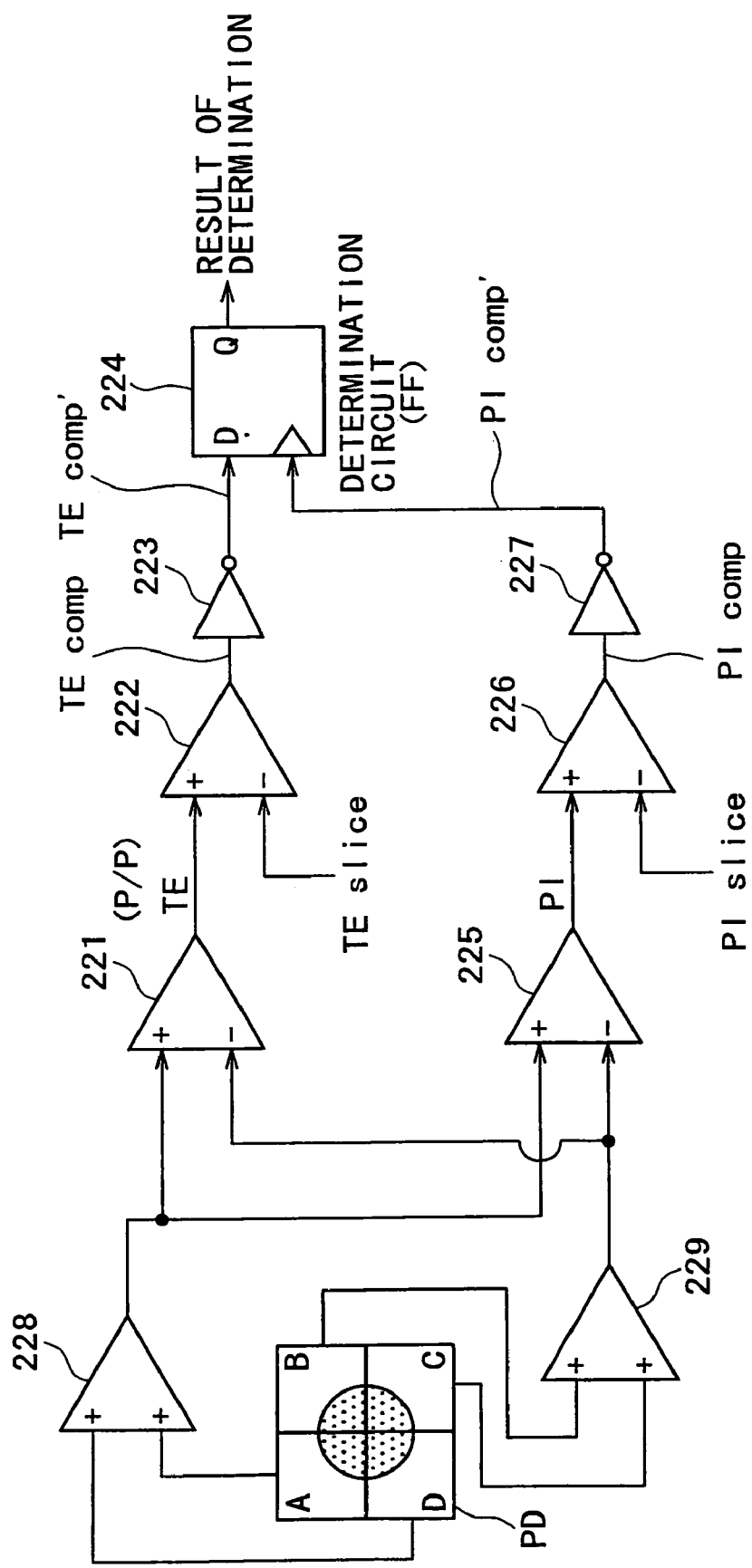
FIG. 16 is a diagram of assistance in explaining a configuration for a determination based on phase difference according to the embodiment.

A configuration of FIG. 16, for example, suffices for phase difference determination. Individual parts shown in the figure may be distributed in the optical head 20, the RF amplifier 22, the storage controller 32, and the like.

When phase difference is determined with this configuration, the objective lens is moved from the inner circumference of the disk to the outer circumference of the disk with the focus servo for the objective lens within the optical head 20 turned on and a tracking servo turned off.

Regarding photoelectrically converted signals detected by detecting surfaces A, B, C, and D of a photodetector PD within the optical head 20 as shown in FIG. 16, first the signals from the detecting surfaces A and D are added together by an adder 228 and the signals from the detecting surfaces B and C are added together by an adder 229. Then, outputs of the adders 228 and 229 are each supplied to a tracking error signal operation unit 221 and a pull-in signal operation unit 225.

The tracking error signal operation unit 221 calculates a push-pull signal P/P=(A+D)−(B+C) obtained by subtracting the signals of the light receiving surface B+C from the signals of the light receiving surface A+D as a tracking error signal TE. The operation unit 221 supplies the tracking error signal TE to a comparator 222 as binarizing means.

The pull-in signal operation unit 225 supplies a total light amount signal (sum signal) obtained by adding together the signals from the light receiving surfaces A, B, C, and D as a pull-in signal PI to a comparator 226 as binarizing means.

The comparator 222 binarizes the tracking error signal TE by comparing the tracking error signal TE with a slice level TE slice and then supplies binarized data TE comp to an inverter 223. The inverter 223 inverts the binarized data TE comp and supplies the inverted binarized data to a data input terminal D of a D flip-flop determination circuit 224.

The comparator 226 binarizes the push-pull signal PI by comparing the push-pull PI with a slice level PI slice and supplies binarized data PI comp to an inverter 227. The inverter 227 inverts the binarized data PI comp and supplies the inverted binarized data to a clock input terminal of the D flip-flop determination circuit 224.

The D flip-flop determination circuit 224 latches the inverted binarized data TE comp' from the comparator 222 in synchronism with a rising edge of the inverted binarized data PI comp' from the comparator 226. That is, the D flip-flop determination circuit 224 generates a result of determination of a disk type by detecting a phase difference between the PI signal and the TE signal and outputs the result. The D flip-flop determination circuit 224 is disposed within the storage controller 32, for example. The storage controller 32 determines the phase difference on the basis of the result of determination by the D flip-flop determination circuit 224.

Figure 17:
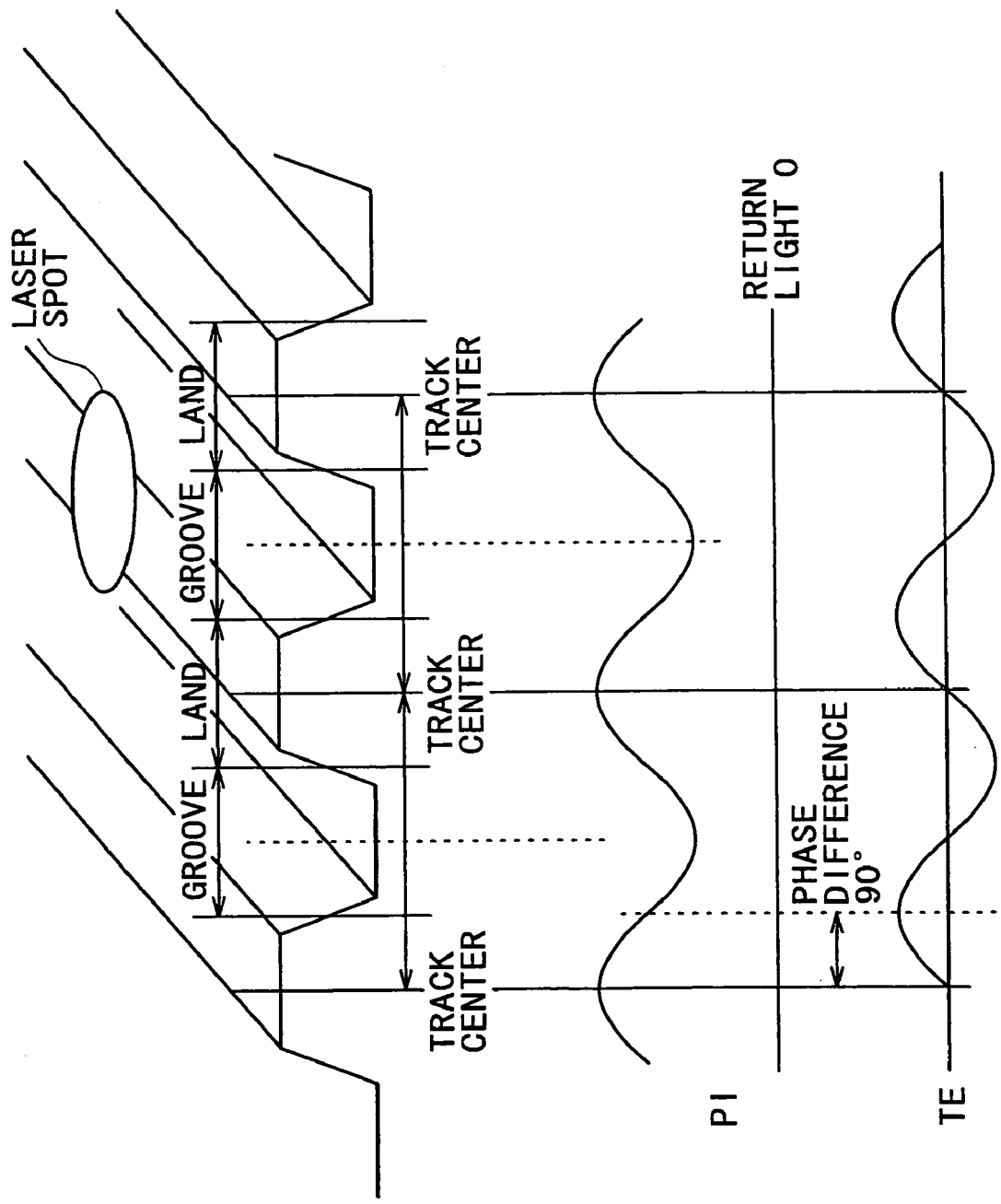
FIG. 17 is a diagram of assistance in explaining a relation between disk groove depth and phase difference.
Figure 18:
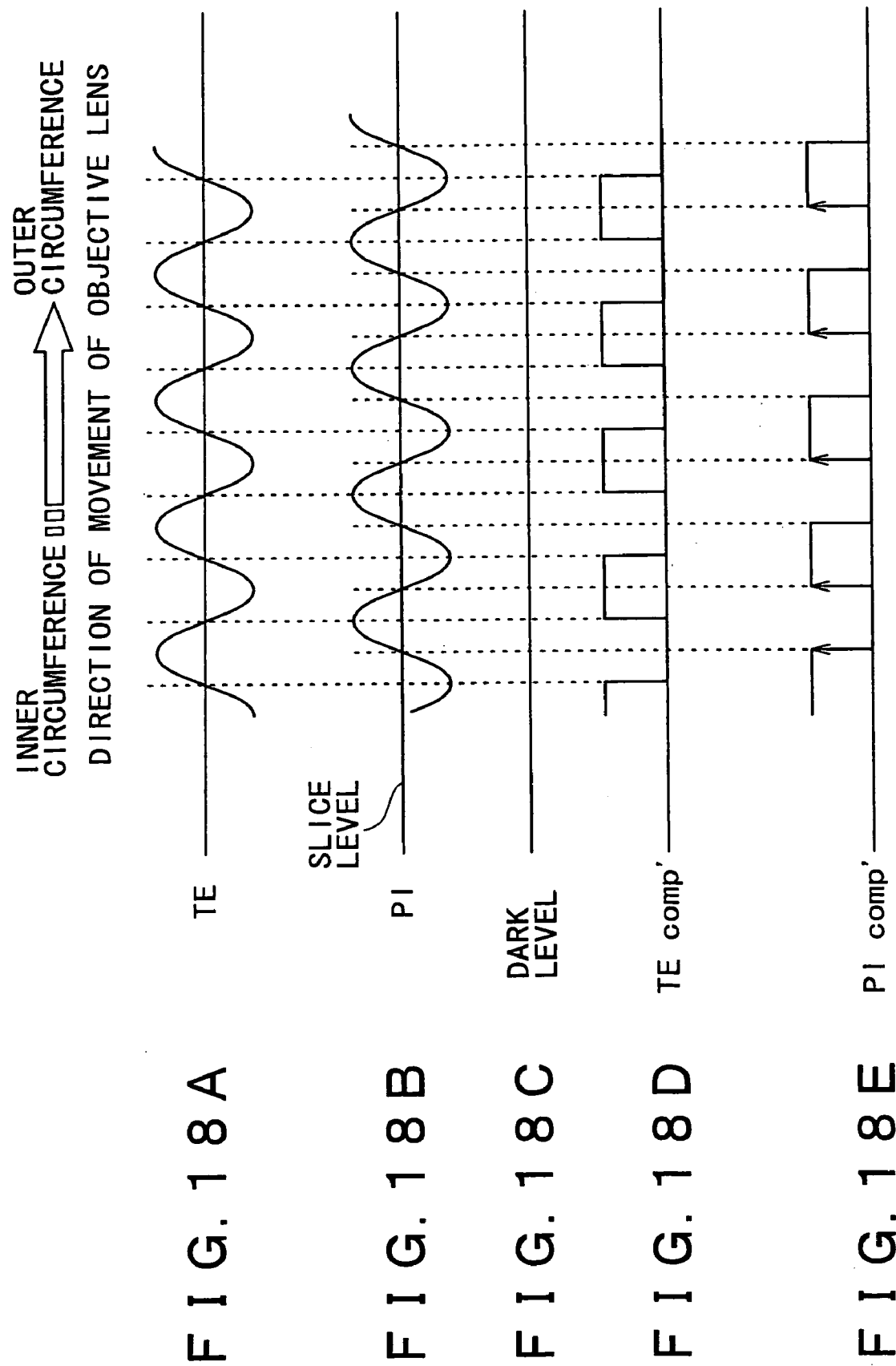
FIGS. 18A, 18B, 18C, 18D, and 18E are diagrams of assistance in explaining signals in the determination based on phase difference.
Figure 19:
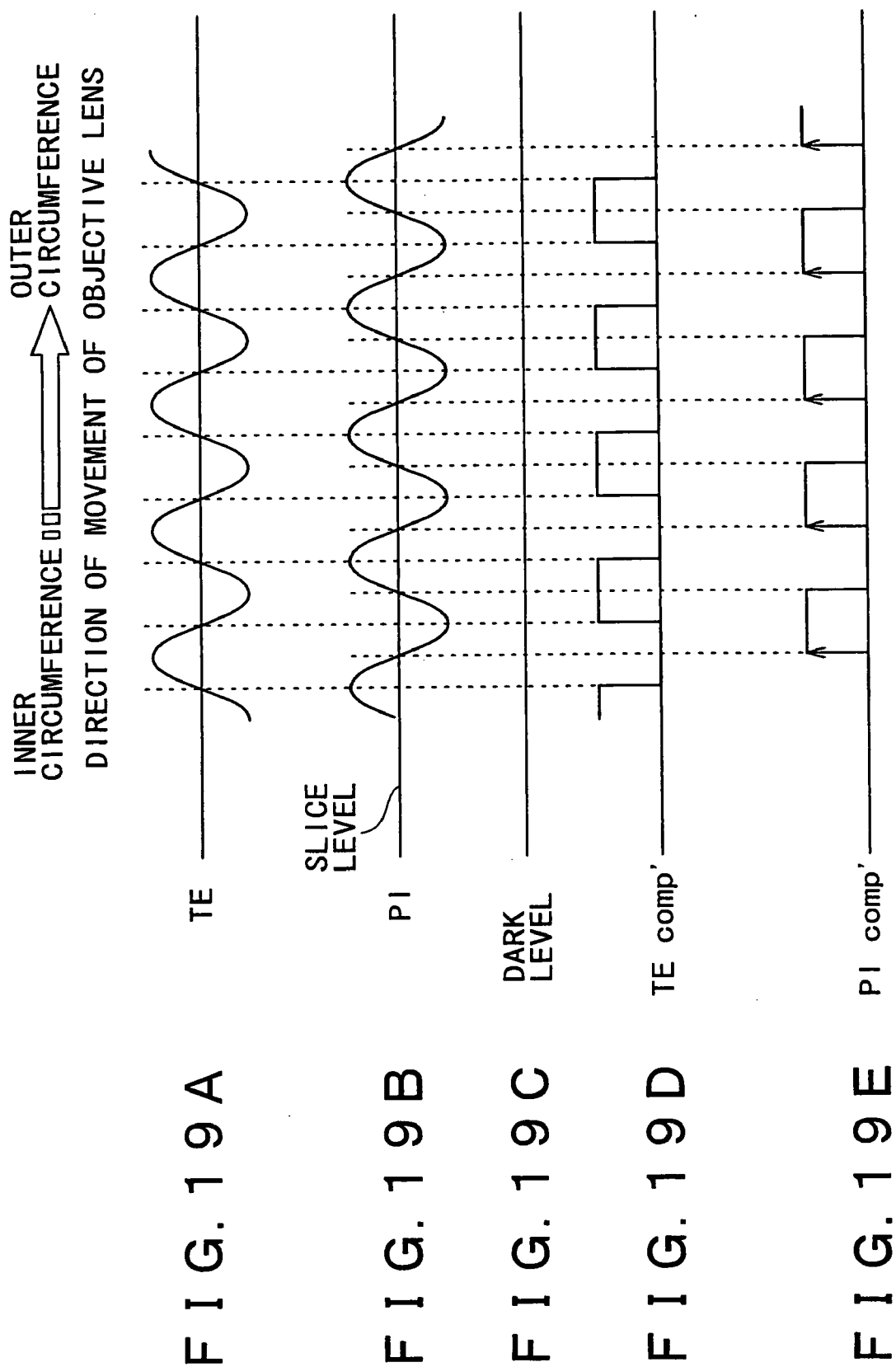
FIGS. 19A, 19B, 19C, 19D, and 19E are diagrams of assistance in explaining signals in the determination based on phase difference.

FIG. 17 shows movement of a spot SP at a section of an MD and reproduced waveforms of a PI signal and a TE signal corresponding to the movement of the spot SP. FIG. 17 shows a case where the TE signal is delayed 90 degrees with respect to the PI signal, that is, the phase difference is 90 degrees.

FIGS. 18A, 18B, 18C, 18D, and 18E show waveforms detected by parts of FIG. 16 when the disk 90 is a recording and reproducing MD or a high-density MD type A/type B. The D flip-flop determination circuit 224 latches inverted binarized data TE comp' in synchronism with a rising edge of inverted binarized data PI comp', and thereby outputs an H.

FIGS. 19A, 19B, 19C, 19D, and 19E show waveforms detected by parts of FIG. 16 when the disk 90 is a reproduction-only MD, a reproduction-only high-density MD, or a high-density MD type C.

In this case, the D flip-flop determination circuit 224 latches inverted binarized data TE comp' in synchronism with a rising edge of inverted binarized data PI comp', and thereby outputs an L.

The phase of the pull-in signal PI (FIG. 19B) with respect to the tracking error signal TE (push-pull signal P/P) in the high-density MD type C as a disk having a groove is inverted in polarity as compared with the case (FIG. 18B) of the other groove disks, that is, the recording and reproducing MD or the high-density MD type A/type B, because the high-density MD type C has a greater groove depth of 160 to 180 nm.

Figure 20:
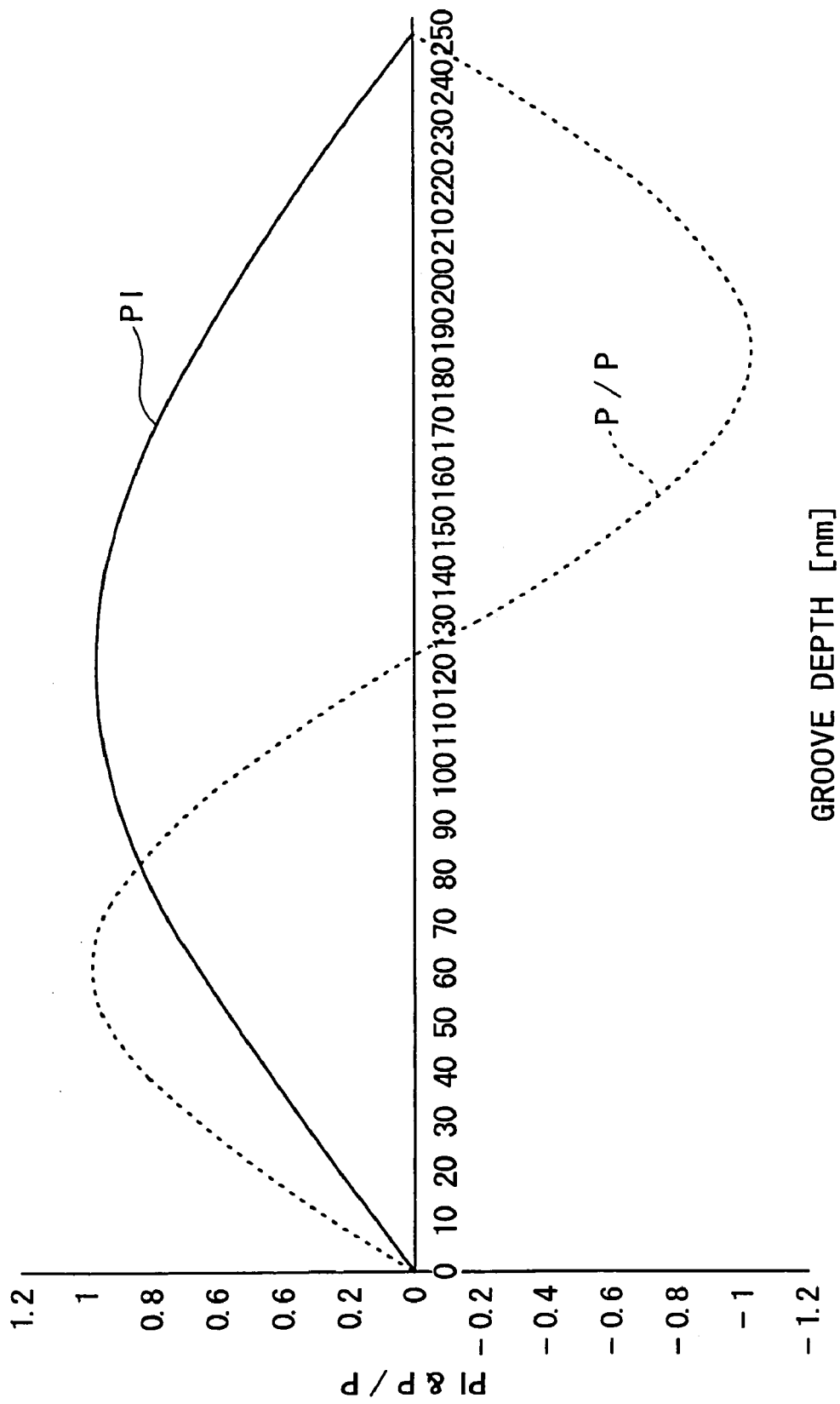
FIG. 20 is a diagram of assistance in explaining a relation between disk groove depth and a PI and push-pull signals.

As shown in FIG. 20, amplitude of the tracking error signal (push-pull signal P/P) is changed from + to − at a groove depth of 125 nm. From a laser wavelength of 780 nm and an index of disk refraction of 1.57, the depth d at which this polarity inversion occurs is determined by (780/4)/1.57.

As is understood from the above description, an "H" or an "L" as a latch output of the D flip-flop determination circuit 224 is a result of detection of phase difference.

Specifically, in the case of the configuration of FIG. 16, when the latch output of the D flip-flop determination circuit 224 is an "H" as in FIGS. 18A to 18E, the loaded disk 90 causes a phase delay of 0 to λ/4 as a phase difference of a pull-in signal PI with respect to a push-pull signal P/P, and it can therefore be determined that the disk 90 is either a recording and reproducing MD or a high-density MD type A/type B. On the other hand, when the latch output of the D flip-flop determination circuit 224 is an "L," the loaded disk 90 causes a phase advance of λ/4 to λ/2 as a phase difference of a pull-in signal PI with respect to a push-pull signal P/P, and it can therefore be determined that the disk 90 is one of a reproduction-only MD, a reproduction-only high-density MD, and a high-density MD type C.

Incidentally, in such phase difference detection, since the disk has eccentricity in practice, the spot SP repeatedly moves to the inner circumference side of the disk and to the outer circumference side of the disk in a state in which the tracking servo is not turned on. Thus, since a traveling direction needs to be fixed, the objective lens or the whole of the optical block (optical head) needs to be moved from the inner circumference to the outer circumference, for example, at a constant speed exceeding an amount of movement caused by the eccentricity.

In addition, in such phase difference detection, it is ensured that the optical head 20 is situated in a groove area (to be described later) of the disk in advance. Since the reproduction-only MD and the reproduction-only high-density MD do not have a groove area, phase difference detection after identifying a groove area makes it possible to determine whether the disk is a recording and reproducing MD, a high-density MD type A/type B, or a high-density MD type C.

<P-TOC/U-TOC>

It is known that a mini disk system has managing information referred to as P-TOC and U-TOC recorded at a position on the inner circumference side of a disk.

Contents of the managing information include disk type information, and therefore the contents of the managing information referred to as P-TOC and U-TOC can be used for disk type determination.

Prior to description of a disk determination method based on the managing information, area structures of various disks will first be described.

FIG. 21A shows an area in a form of a band in a direction of a radius of a disk from an inner circumference side to an outer circumference side of the disk as an area structure of the reproduction-only MD.

As shown in FIG. 21A, an innermost circumference side of the disk is a lead-in area, in which P-TOC is recorded. A data area is formed following the P-TOC. The data area has audio data recorded therein in advance in track (musical piece) units. Addresses of recorded tracks, positions of the areas, and the like are managed by the P-TOC. An outermost circumference side of the disk is a lead-out area.

In the case of the recording and reproducing MD, all the areas are pit areas, where data is recorded by embossed pits.

FIG. 21B shows an area structure of the recording and reproducing MD.

In this case, P-TOC and U-TOC are recorded in a lead-in area on an inner circumference side. In a data area, audio tracks can be recorded and reproduced by a user side.

In the case of the recording and reproducing MD, only the P-TOC area on an inner circumference side of the lead-in area is a pit area with embossed pits, and the U-TOC area, the data area, and a lead-out area are groove areas, where recording and reproduction is enabled by magneto-optical recording.

Tracks recorded in the data area are managed by the U-TOC, and contents of the U-TOC are rewritten in response to recording, erasure, and editing in the data area. The P-TOC manages basic area positions and the like.

FIG. 21C shows an area structure of the high-density MD type A. As is understood from the figure, the area structure of the high-density MD type A is the same as that of the recording and reproducing MD.

Files of audio, video, or other kinds of data recorded in a data area are managed by a FAT system, in addition to area management by P-TOC and U-TOC.

FIG. 22A shows an area structure of the high-density MD type B.

In this case, an innermost circumference side of the disk is a mirror area (BCA: Burst Cutting Area). In this area, a pattern in a form of bar code is formed in a radiating manner to record a predetermined ID and the like.

The BCA is followed by a lead-in area, in which P-TOC and U-TOC are recorded. A P-TOC area is a pit area with embossed pits. A U-TOC area, a data area, and a lead-out area are groove areas, where recording and reproduction is possible. Also in this case, data files recorded in the data area are managed by the FAT system, in addition to area management by the P-TOC and the U-TOC.

FIG. 22B shows the reproduction-only high-density MD. This is a reproduction-only type of the high-density MD type B. Therefore, a lead-in area includes only P-TOC. All areas excluding a mirror area are pit areas.

FIG. 22C shows an area structure of the high-density MD type C.

Also in this case, a mirror area (BCA) is formed on an innermost circumference side. A lead-in area has managing information referred to as P-TOP recorded therein rather than P-TOC and U-TOC.

The lead-in area, a data area, and a lead-out area are groove areas.

The area structures of the individual disks have been described above. On the basis of the description, disk type determination based on P-TOC and U-TOC will be described.

Determination based on P-TOC will first be described.

FIG. 23 shows a structure of a first sector (sector 0) of a P-TOC cluster.

The P-TOC sector has a 12-byte sync pattern at a head thereof, followed by an address (a cluster address and a sector address) of the sector itself. Incidentally, the sync pattern and the address are common to all sectors in a mini disk format.

A system ID of four bytes is recorded at a predetermined byte position.

Further, recorded are a disk type, recording power, a first track number, a last track number, a lead-out area start address, a power calibration area start address, a U-TOC start address, and a recordable user area start address. That is, information for managing area structure and disk properties is recorded.

Then, a pointer portion and a table portion are provided. The table portion is formed by a parts table in which a start address/end address of a part forming a track and track mode information are managed. The parts table is specified by pointers (P-TN01 to P-TN0255) in the pointer portion, whereby each track is managed.

The pointers P-TN01 to P-TN0255 correspond to a first track to a 255th track, respectively.

It is to be noted that tracks are managed by the P-TOC in the case of the reproduction-only MD. In the case of the recording and reproducing MD, each track is managed by a pointer portion and a table portion of U-TOC to be described later.

As described above, the system ID is recorded in the P-TOC. As the system ID, information "MINI" is recorded by an ASCII code in the case of the first-generation MDs (the reproduction-only MD and the recording and reproducing MD).

In the case of the high-density MD type B, on the other hand, a code indicating a high-density MD (for example "Hi-MD") is recorded as the system ID.

Hence, it is possible to determine a disk type as shown in FIG. 14 on the basis of whether the code "Hi-MD" indicating a high-density MD is present as the system ID of the P-TOC.

Specifically, when the code "Hi-MD" indicating a high-density MD is not present, the disk is a reproduction-only MD, a recording and reproducing MD, or a high-density MD type A.

When the code "Hi-MD" indicating a high-density MD is present, the disk is either a high-density MD type B or a reproduction-only high-density MD.

As shown in FIG. 22C, the high-density MD type C does not have P-TOC. Hence, when the P-TOC itself is not present, the disk is a high-density MD type C.

Determination based on U-TOC will next be described.

FIG. 24 shows a structure of a first sector (sector 0) of a U-TOC cluster.

The U-TOC sector has a 12-byte sync pattern at a head thereof, followed by an address (a cluster address and a sector address) of the sector itself.

In addition, a maker code, a model code, a first track number, a last track number, a used sector within the U-TOC, a disk serial number, and a system ID are recorded at a predetermined byte position.

Then, a pointer portion and a table portion are provided. The table portion is formed by a parts table in which a start address/end address of a part forming a track and track mode information are managed. The parts table is specified by pointers (P-DFA, P-EMPTY, P-FRA, and P-TN01 to P-TN0255) in the pointer portion, whereby each track is managed.

The pointers P-TN01 to P-TN0255 correspond to a first track to a 255th track, respectively.

The pointer P-DFA manages a defective area on the disk.

The pointer P-EMPTY manages an unused parts table.

The pointer P-FRA manages an unrecorded area (free area) in the data area.

The recording and reproducing MD allows tracks to be recorded, erased, and edited. For this, the U-TOC performs track management. Contents of the pointer portion and the parts table are rewritten in response to recording/erasure/editing.

As the maker code, a code number assigned to a maker is recorded. In the high-density MD type A/type B, in particular, an identifier indicating a disk of a high-density format (Hi-MD format: the format of the type A/type B in FIG. 2B) is recorded in the area of the maker code.

Thus, a type determination as shown in FIG. 14 can be made on the basis of this maker code information.

Specifically, when the code indicating the high-density MD format is not present in the U-TOC, the disk is a recording and reproducing MD.

When the code indicating the high-density MD format is present in the U-TOC, the disk is a high-density MD type A or a high-density MD type B.

As shown in FIG. 22C, the high-density MD type C does not have U-TOC recorded therein. As shown in FIG. 21A and FIG. 22B, the U-TOC itself is not present in the reproduction-only MD and the reproduction-only high-density MD. Thus, when the U-TOC is not present, the disk is either a high-density MD type C, a reproduction-only MD, or a reproduction-only high-density MD.

Incidentally, in the case of the high-density MD type A or the high-density MD type B, information indicating the high-density format is recorded in a part of each file (data track) recorded in the data area. Therefore, the information can be used for a similar determination.

<BCA>

As is understood from FIG. 21A to FIG. 22C, BCA is provided or not provided according to the disk type. Also, the disk type is presented as information recorded in the BCA. Thus, on the basis of presence or absence of the BCA and information recorded therein, the disk type can be determined as shown in FIG. 14.

FIG. 25A shows a disk without a BCA, and FIG. 25B shows a disk with a BCA.

As is understood from a comparison between FIGS. 25A and 25B, the BCA in FIG. 25B is a radial bar code pattern in an area corresponding to an inner circumference side of a radial position as a lead-in area in FIG. 25A.

The BCA is a bar code pattern radiating in a direction of a radius, so that bar code information can be read without particular tracking control.

The bar code is used to record a code indicating "Hi-MD 1.5" in the case of the high-density MD type B and record a code indicating "Hi-MD 3" in the case of the high-density MD type C.

The following determination can be made on the basis of presence or absence of the BCA and information contents of the BCA.

When the BCA is not present, the disk is a recording and reproducing MD, a reproduction-only MD, or a high-density MD type A.

When the BCA is present and information indicating "Hi-MD 1.5" is recorded therein, the disk is a high-density MD type B or a reproduction-only high-density MD.

When the BCA is present and information indicating "Hi-MD 3" is recorded therein, the disk is a high-density MD type C.

<ADIP Address Structure>

A disk type determination can also be made on the basis of address structure.

An ADIP address is represented by groove wobbling. Therefore, the reproduction-only MD and the reproduction-only high-density MD having no groove formed thereon have no ADIP address. The reproduction-only MD and the reproduction-only high-density MD only have addresses recorded on a subcode format within data.

On the other hand, disks with a groove area have an ADIP address recorded thereon. Of the disks having a groove area, the high-density MD type C has a different ADIP address format from that of the other disks.

FIG. 26A shows an ADIP address format of the recording and reproducing MD and the high-density MD type A/type B. FIG. 26B shows an ADIP address format of the high-density MD type C.

First, in the ADIP address format of FIG. 26A, one unit address is formed by 42 bits, and the address includes a sync of 4 bits, a cluster number of 16 bits, a sector number of 8 bits, and a CRC of 14 bits.

On the other hand, in the ADIP address format of FIG. 26B, one unit address is similarly formed by 42 bits, and the address includes a sync of 4 bits, a cluster number of 16 bits, a sector number of 4 bits, and an ECC of 18 bits.

That is, the error correction decode system is different. Thus, by performing ADIP decoding and determining whether an address can be extracted by ECC processing, for example, it is possible to make a type determination as shown in FIG. 14.

Thus, when an address can be obtained by ECC decoding after disk reproduction operation and ADIP decoding, the disk is a high-density MD type C.

When an address cannot be obtained by ECC decoding after disk reproduction operation and ADIP decoding, the disk is either a recording and reproducing MD or a high-density MD type A/type B.

When ADIP information cannot be obtained after disk reproduction operation, the disk is a reproduction-only MD or a reproduction-only high-density MD.

The determining elements for disk determination from signals based on reflected light information obtained by the optical head 20 have been described above. With combinations of these determining elements, it is possible to determine six disk types (the reproduction-only MD, the recording and reproducing MD, the high-density MD type A, the high-density MD type B, the reproduction-only high-density MD, and the high-density MD type C) in the category of mini disks.

Combinations of determining elements, which combinations make type determination possible as disk type determination methods <1> to <6>, are represented by ⊙ in the lower part of FIG. 14.

Disk type determination can be made by one of the disk type determination methods <1> to <6>.

Incidentally, Δ entered for reflectivity in the disk type determination methods <1> to <4> in FIG. 14 denotes that reflectivity is not necessarily needed in combinations for type determination. That is, theoretically, disk type determination can be made without reflectivity detection by using combinations of the other determining elements. However, the reflectivity detection can be advantageous when determination processing speed is taken into consideration, and thus some of flowcharts to be described below include reflectivity detection.

For reflectivity determination, the above-mentioned reflectivity determination from reflected light information is not necessarily required. For example, as described above, the detection hole H1 in the reproduction-only MD, the recording and reproducing MD, and the high-density MD type A indicates reflectivity. Therefore, reflectivity determination can be made by the detection hole H1 depending on combinations of determining elements.

Description will be made below of disk type determination processing shown as the disk type determination methods <1> to <6> in FIG. 14.

Incidentally, processing of each flowchart is control and determination processing performed by the storage controller 32.

[Disk Type Determination Method <1>]

The disk type determination method <1> is an example of combination of reflectivity detection, phase difference detection, and managing information detection (P-TOC detection and U-TOC detection).

Figure 27:
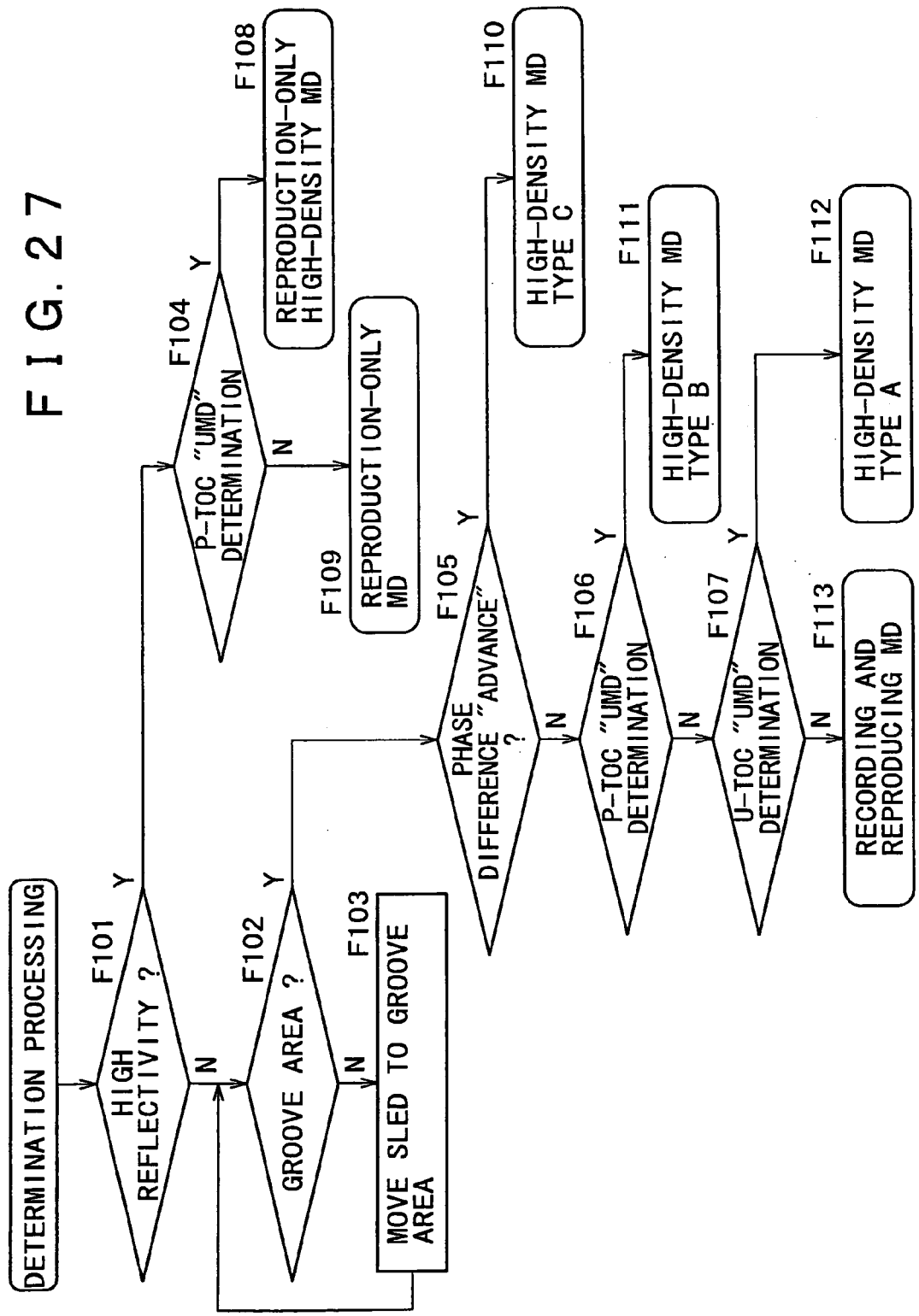
FIG. 27 is a flowchart of a disk type determination method <1> according to the embodiment.

FIG. 27 represents processing of the disk type determination method <1>.

In disk type determination processing of FIG. 27, reflectivity is first determined by the above-described method in step F101. When it is determined that the loaded disk is a high reflectivity disk, the processing proceeds to step F104 to reproduce a P-TOC area. Then whether the code "Hi-MD" indicating a high-density MD is recorded as a system ID of the P-TOC is determined.

When the code indicating a high-density MD is present, the processing proceeds to step F108 to determine that the disk is a reproduction-only high-density MD.

When the code indicating a high-density MD is not recorded, on the other hand, the processing proceeds to step F109 to determine that the disk is a reproduction-only MD.

When it is determined in step F101 that the loaded disk is a low reflectivity disk, the processing proceeds to step F102 to determine whether a position, which is now being traced by the optical head 20, on the disk is a groove area.

Physical area structures on disks have a pit area, a groove area, and a mirror area, as shown in FIGS. 21A to 21C and FIGS. 22A to 22C. Which of these areas the optical head 20 is now in can be determined from a sum signal (A+B+C+D) or an amplitude level of an RF signal. For example, the determination can be made by detecting a peak level/bottom level of amplitude of the RF signal, thereby determining an amplitude level, and comparing the amplitude level with a predetermined threshold level.

When it is determined in step F102 that the position, which is now being traced by the optical head 20, on the disk is not the groove area, the processing proceeds to step F103, where the sled mechanism is controlled to move the optical head 20 to the groove area. Then, the processing returns to step F102 to determine whether the position, which is now being traced by the optical head 20, on the disk is the groove area.

When the optical head 20 is in the groove area as a result of the process in steps F102 and F103, phase detection is performed by the above-described method in step F105.

When a phase advance of a pull-in signal PI with respect to a push-pull signal P/P is detected, the processing proceeds to step F110 to determine that the disk is a high-density MD type C.

When a phase delay is detected in step F105, P-TOC detection is performed in step F106. Specifically, a P-TOC area is reproduced to determine whether the code "Hi-MD" indicating a high-density MD is recorded as a system ID.

When the code indicating a high-density MD is present, the processing proceeds to step F111 to determine that the loaded disk is a high-density MD type B.

When the code indicating a high-density MD is not recorded, on the other hand, the processing proceeds to step F107 to next determine U-TOC contents. Then, presence or absence of an identifying code indicating the high-density format (Hi-MD) in a maker code of the U-TOC as described above is determined. When the identifying code indicating the high-density format is present, the processing proceeds to step F112 to determine that the loaded disk is a high-density MD type A.

When the identifying code indicating the high-density format is not present in the U-TOC, the processing proceeds to step F113 to determine that the loaded disk is a recording and reproducing MD.

By the above processing using a combination of reflectivity detection, phase difference detection, and managing information detection (P-TOC detection and U-TOC detection), it is possible to determine the type of the reproduction-only MD, the recording and reproducing MD, the high-density MD type A, the high-density MD type B, the reproduction-only high-density MD, or the high-density MD type C.

[Disk Type Determination Method <2>]

The disk type determination method <2> is an example of combination of reflectivity detection, managing information detection (P-TOC detection and U-TOC detection), and address structure detection.

Figure 28:
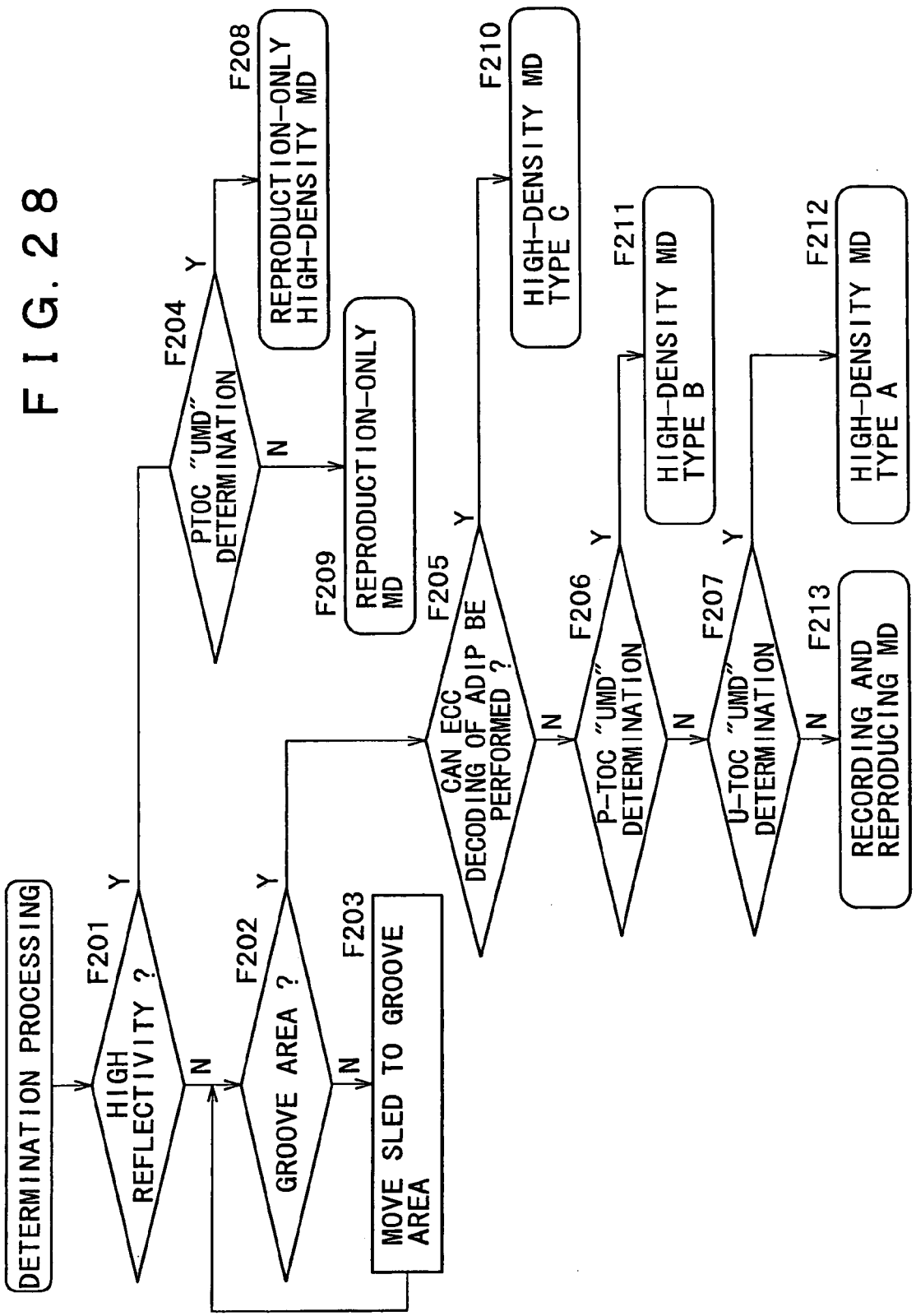
FIG. 28 is a flowchart of a disk type determination method <2> according to the embodiment.

FIG. 28 represents processing of the disk type determination method <2>.

In disk type determination processing of FIG. 28, reflectivity is first determined by the above-described method in step F201. When it is determined that the loaded disk is a high reflectivity disk, the processing proceeds to step F204 to reproduce a P-TOC area. Then whether the code "Hi-MD" indicating a high-density MD is recorded as a system ID of the P-TOC is determined.

When the code indicating a high-density MD is present, the processing proceeds to step F208 to determine that the loaded disk is a reproduction-only high-density MD.

When the code indicating a high-density MD is not recorded, on the other hand, the processing proceeds to step F209 to determine that the loaded disk is a reproduction-only MD.

When it is determined in step F201 that the loaded disk is a low reflectivity disk, the processing proceeds to step F202 to determine whether a position, which is now being traced by the optical head 20, on the disk is a groove area.

When it is determined in step F202 that the position is not the groove area, the processing proceeds to step F203, where the sled mechanism is controlled to move the optical head 20 to the groove area. Then, the processing returns to step F202 to determine whether the position is the groove area.

When the optical head 20 is in the groove area as a result of the process in steps F202 and F203, ADIP address format determination is made in step F205.

Specifically, in ADIP address decode processing, whether an ADIP address is obtained by ECC decoding is determined. When an ADIP address is obtained by ECC decoding, the processing proceeds to step F210 to determine that the disk is a high-density MD type C.

When an ADIP address is not obtained by ECC decoding in step F205, P-TOC detection is performed in step F206. Specifically, a P-TOC area is reproduced to determine whether the code "Hi-MD" indicating a high-density MD is recorded as a system ID.

When the code indicating a high-density MD is present, the processing proceeds to step F211 to determine that the loaded disk is a high-density MD type B.

When the code indicating a high-density MD is not recorded, on the other hand, the processing proceeds to step F207 to next determine U-TOC contents. Then, presence or absence of the identifying code indicating the high-density format in a maker code of the U-TOC is determined. When the identifying code indicating the high-density format is present, the processing proceeds to step F212 to determine that the loaded disk is a high-density MD type A.

When the identifying code indicating the high-density format is not present in the U-TOC, the processing proceeds to step F213 to determine that the loaded disk is a recording and reproducing MD.

By the above processing using a combination of reflectivity detection, address structure detection, and managing information detection (P-TOC detection and U-TOC detection), it is possible to determine the type of the reproduction-only MD, the recording and reproducing MD, the high-density MD type A, the high-density MD type B, the reproduction-only high-density MD, or the high-density MD type C.

[Disk Type Determination Method <3>]

The disk type determination method <3> determines a disk type by managing information detection (U-TOC detection), detecting a BCA as a specific area, and using a result of determination of whether the detection hole H1 of the cartridge 91 is opened or closed.

Figure 29:
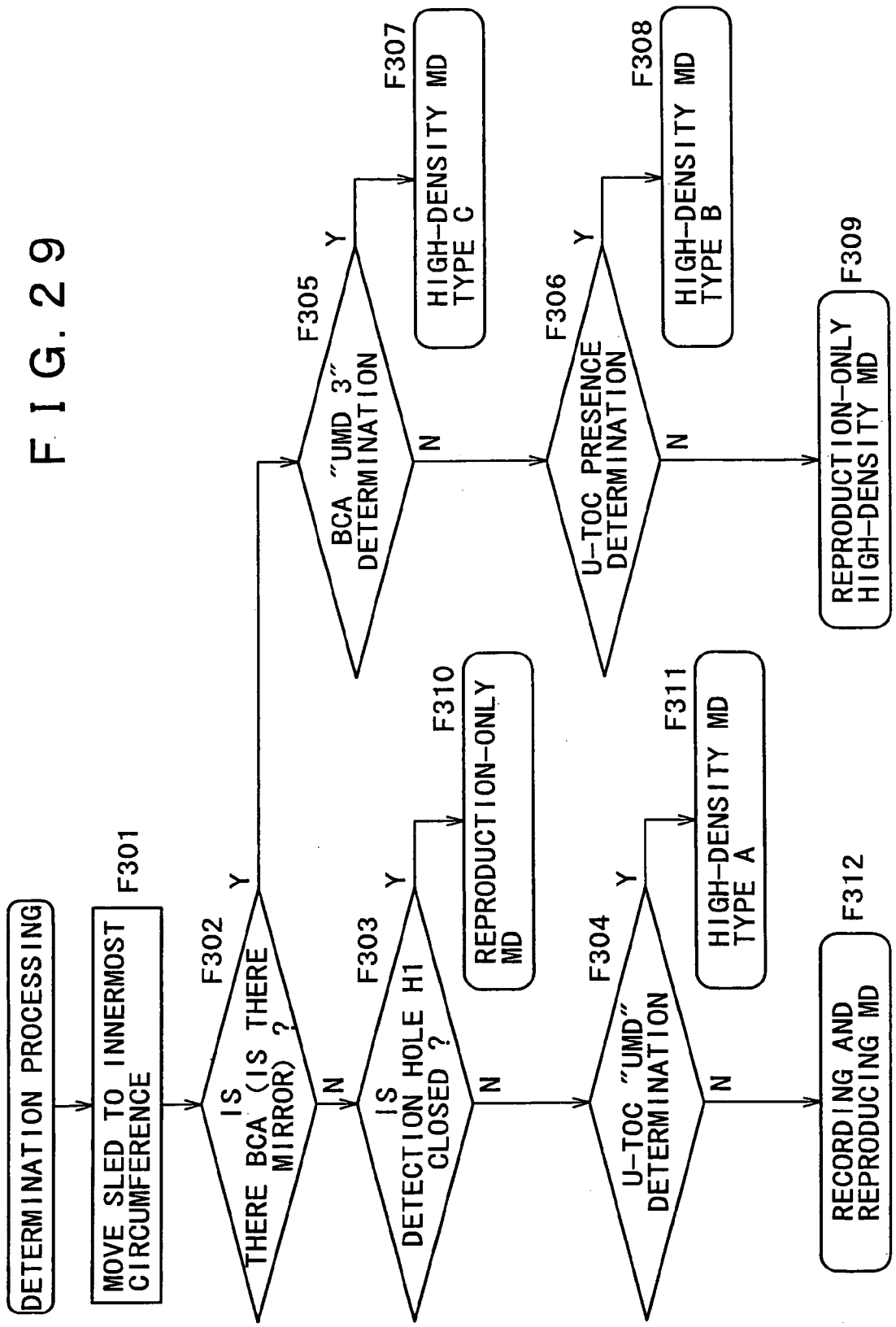
FIG. 29 is a flowchart of a disk type determination method <3> according to the embodiment.

FIG. 29 represents processing of the disk type determination method <3>.

In disk type determination processing of FIG. 29, the sled mechanism is controlled to move the optical head 20 to an innermost circumference side of the disk in first step F301.

Then, presence or absence of a BCA is determined in step F302. The presence or absence of a BCA can be determined on the basis of whether the innermost circumference side is judged to be a mirror area by an area determining method described in the description of step F102 in FIG. 27. That is, when the innermost circumference side of the disk is a mirror area, it can be determined that a BCA is present.

When a BCA is present, the processing proceeds to step F305 to reproduce information of a bar code pattern of the BCA. When the code indicating "Hi-MD 3" can be detected, the processing proceeds to step F307 to determine that the loaded disk is a high-density MD type C.

When the code indicating "Hi-MD 3" cannot be detected as the bar code pattern of the BCA (when the code indicates "Hi-MD 1.5"), the processing proceeds to step F306 to determine whether or not a U-TOC is present. Specifically, a U-TOC area is reproduced to determine whether or not U-TOC data is present.

When the U-TOC is present, the processing proceeds to step F308 to determine that the loaded disk is a high-density MD type B.

When the U-TOC is not present, the processing proceeds to step F309 to determine that the loaded disk is a reproduction-only high-density MD.

When it is determined in step F302 that no BCA is present, the open/closed state of the detection hole H1 is determined in step F303. Specifically, the on/off state of the switch SW1 of the detection hole determination unit 34 shown in FIG. 3 is determined.

When the detection hole H1 is in the closed state (the switch SW1 is on), the processing proceeds to step F310 to determine that the loaded disk is a reproduction-only MD.

When the detection hole H1 is in the open state (the switch SW1 is off), the processing proceeds to step F304 to determine U-TOC contents. That is, a U-TOC is reproduced to determine presence or absence of the identifying code (Hi-MD) indicating the high-density format in a maker code of the U-TOC. When the identifying code indicating the high-density format is present, the processing proceeds to step F311 to determine that the loaded disk is a high-density MD type A.

When the identifying code indicating the high-density format is not present in the U-TOC, the processing proceeds to step F312 to determine that the loaded disk is a recording and reproducing MD.

By the above processing using a combination of managing information detection (U-TOC detection), BCA detection, and detection of the open/closed state of the detection hole H1, it is possible to determine the type of the reproduction-only MD, the recording and reproducing MD, the high-density MD type A, the high-density MD type B, the reproduction-only high-density MD, or the high-density MD type C.

[Disk Type Determination Method <4>]

The disk type determination method <4> determines a disk type by reflectivity detection, managing information detection (P-TOC detection and U-TOC detection), and using a result of determination of the detection holes H0 and H1.

Figure 30:
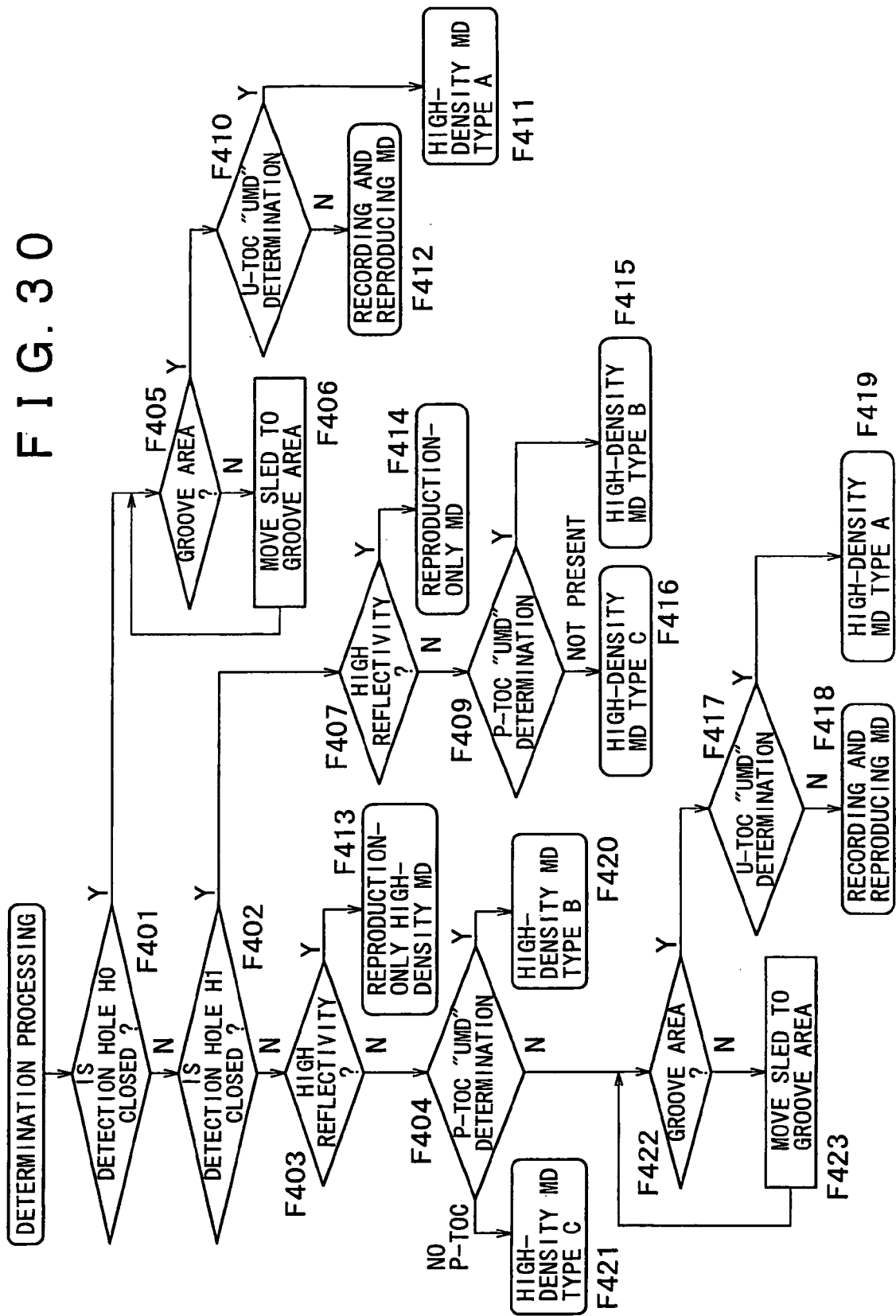
FIG. 30 is a flowchart of a disk type determination method <4> according to the embodiment.

FIG. 30 represents processing of the disk type determination method <4>.

In disk type determination processing of FIG. 30, the open/closed state of the detection hole H0 of the cartridge 91 is determined in first step F401. Specifically, the on/off state of the switch SW0 of the detection hole determination unit 34 is determined.

When the detection hole H0 is in the closed state (the switch SW0 is on), the processing proceeds to step F405 to determine whether a position, which is now being traced by the optical head 20, on the disk is a groove area. When it is determined in step F405 that the position is not the groove area, the processing proceeds to step F406, where the sled mechanism is controlled to move the optical head 20 to the groove area. Then, the processing returns to step F405 to determine whether the position is the groove area.

When the optical head 20 is in the groove area as a result of the process in steps F405 and F406, a U-TOC is reproduced in step F410 to determine presence or absence of the identifying code indicating the high-density format in a maker code of the U-TOC. When the identifying code indicating the high-density format is present, the processing proceeds to step F411 to determine that the loaded disk is a high-density MD type A.

When the identifying code indicating the high-density format is not present in the U-TOC, the processing proceeds to step F412 to determine that the loaded disk is a recording and reproducing MD.

When it is determined in step F401 that the detection hole H0 is in the open state (the switch SW0 is off), the open/closed state of the detection hole H1 is determined in step F402. Specifically, the on/off state of the switch SW1 of the detection hole determination unit 34 is determined.

When the detection hole H1 is in the closed state (the switch SW1 is on), the processing proceeds to step F407 to perform reflectivity detection. When it is determined that the loaded disk is a high reflectivity disk, the processing proceeds to step F414 to determine that the disk is a reproduction-only MD.

When it is determined in step F407 that the loaded disk is a low reflectivity disk, the processing proceeds to step F409, where a P-TOC area is reproduced to determine whether the code "Hi-MD" indicating a high-density MD is recorded as a system ID.

When the code indicating a high-density MD is present, the processing proceeds to step F415 to determine that the disk is a high-density MD type B.

When the P-TOC itself is not present, on the other hand, the processing proceeds to step F416 to determine that the loaded disk is a high-density MD type C.

When it is detected in step F402 that the detection hole H1 is in the open state (the switch SW1 is off), the processing proceeds to step F403 to perform reflectivity detection. When it is determined that the loaded disk is a high reflectivity disk, the processing proceeds to step F413 to determine that the disk is a reproduction-only high-density MD.

When the disk is a low reflectivity disk, the processing proceeds to step F404 to reproduce the P-TOC area. Then, whether the P-TOC is present is determined, or when the P-TOC is present, whether the code "Hi-MD" indicating a high-density MD is recorded as the system ID is determined.

When the P-TOC is not present, the processing proceeds to step F421 to determine that the loaded disk is a high-density MD type C.

When the P-TOC is present and the code indicating a high-density MD is present as the system ID, the processing proceeds to step F420 to determine that the disk is a high-density MD type B.

On the other hand, when the P-TOC is present and the code indicating a high-density MD is not recorded, the processing proceeds to step F422 to determine whether a position, which position is now being traced by the optical head 20, on the disk is a groove area. When it is determined that the position is not the groove area, the processing proceeds to step F423, where the sled mechanism is controlled to move the optical head 20 to the groove area. Then, the processing returns to step F422 to determine whether the position is the groove area.

When the optical head 20 is in the groove area as a result of the process in steps F422 and F423, the U-TOC is reproduced in step F417 to determine presence or absence of the identifying code indicating the high-density format. When the identifying code indicating the high-density format is present, the processing proceeds to step F419 to determine that the loaded disk is a high-density MD type A.

When the identifying code indicating the high-density format is not present in the U-TOC, the processing proceeds to step F418 to determine that the loaded disk is a recording and reproducing MD.

By the above processing using a combination of reflectivity detection, managing information detection (P-TOC detection and U-TOC detection), and detection of the open/closed state of the detection holes H0 and H1, it is possible to determine the type of the reproduction-only MD, the recording and reproducing MD, the high-density MD type A, the high-density MD type B, the reproduction-only high-density MD, or the high-density MD type C.

[Disk Type Determination Method <5>]

The disk type determination method <5> is an example of combination of reflectivity detection, managing information detection (U-TOC detection), and detection of a BCA as a specific area.

Figure 31:
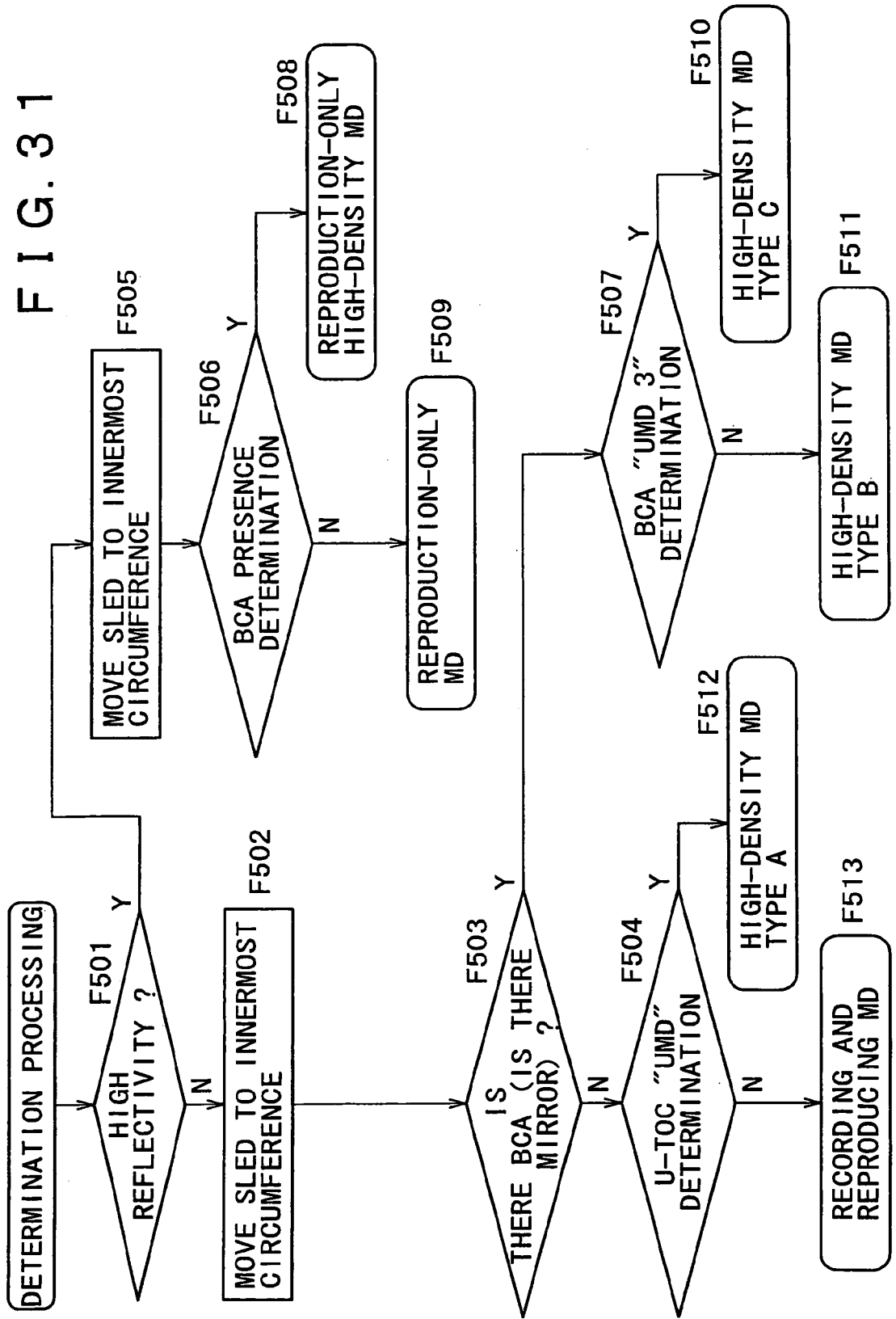
FIG. 31 is a flowchart of a disk type determination method <5> according to the embodiment.

FIG. 31 represents processing of the disk type determination method <5>.

In disk type determination processing of FIG. 31, reflectivity is first determined in step F501. When it is determined that the loaded disk is a high reflectivity disk, the processing proceeds to step F505, where the sled mechanism is controlled to move the optical head 20 to an innermost circumference side of the disk. Then, presence or absence of a BCA is determined in step F506.

When the BCA is present, the processing proceeds to step F508 to determine that the loaded disk is a reproduction-only high-density MD.

When the BCA is not present, the processing proceeds to step F509 to determine that the loaded disk is a reproduction-only MD.

When it is determined in step F501 that the loaded disk is a low reflectivity disk, the processing proceeds to step F502, where the sled mechanism is controlled to move the optical head 20 to the innermost circumference side of the disk. Then, presence or absence of the BCA is determined in step F503.

When the BCA is present, the processing proceeds to step F507 to reproduce information of a bar code pattern of the BCA. When the code indicating "Hi-MD 3" can be detected, the processing proceeds to step F510 to determine that the loaded disk is a high-density MD type C.

When the code indicating "Hi-MD 3" cannot be detected as the bar code pattern of the BCA (when the code indicates "Hi-MD 1.5"), the processing proceeds to step F511 to determine that the loaded disk is a high-density MD type B.

When it is determined in step F503 that the BCA is not present, a U-TOC is checked in step F504. That is, a U-TOC area is reproduced to determine presence or absence of an identifying code indicating the high-density format. When the identifying code indicating the high-density format is present, the processing proceeds to step F512 to determine that the loaded disk is a high-density MD type A.

When the identifying code indicating the high-density format is not present in the U-TOC, the processing proceeds to step F513 to determine that the loaded disk is a recording and reproducing MD.

By the above processing using a combination of reflectivity detection, managing information detection (U-TOC detection), and BCA detection, it is possible to determine the type of the reproduction-only MD, the recording and reproducing MD, the high-density MD type A, the high-density MD type B, the reproduction-only high-density MD, or the high-density MD type C.

[Disk Type Determination Method <6>]

The disk type determination method <6> is an example that performs managing information detection (P-TOC detection and U-TOC detection).

Figure 32:
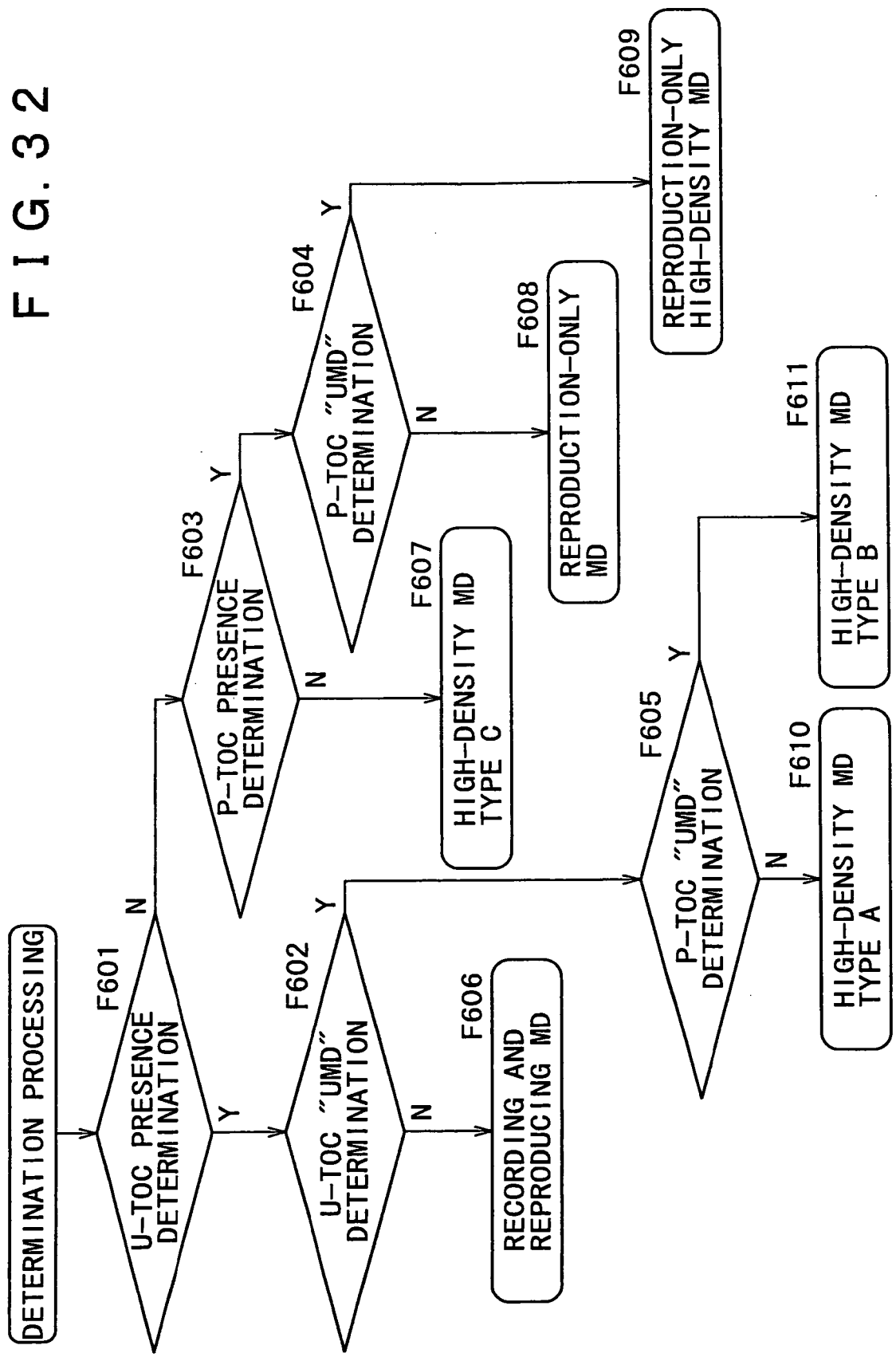
FIG. 32 is a flowchart of a disk type determination method <6> according to the embodiment.

FIG. 32 represents processing of the disk type determination method <6>.

In first step F601, presence of a U-TOC is determined.

When the U-TOC is present, the processing proceeds to step F602 to determine presence or absence of the identifying code indicating the high-density format in a maker code of the U-TOC.

When the identifying code indicating the high-density format is not present in the U-TOC, the processing proceeds to step F606 to determine that the loaded disk is a recording and reproducing MD.

When the identifying code indicating the high-density format is present in the U-TOC, the processing proceeds to step F605, where a P-TOC area is reproduced to determine whether the code "Hi-MD" indicating a high-density MD is recorded as a system ID.

When the code indicating a high-density MD is present, the processing proceeds to step F611 to determine that the disk is a high-density MD type B.

When the code indicating a high-density MD is not present in the P-TOC, on the other hand, the processing proceeds to step F610 to determine that the disk is a high-density MD type A.

When it is determined in step F601 that the U-TOC is not present, presence or absence of the P-TOC is determined in step F603.

When the P-TOC is not present, the processing proceeds to step F607 to determine that the disk is a high-density MD type C.

When the P-TOC is present, the processing proceeds to step F604 to determine whether the code "Hi-MD" indicating a high-density MD is recorded as the system ID of the P-TOC.

When the code indicating a high-density MD is present, the processing proceeds to step F609 to determine that the disk is a reproduction-only high-density MD.

When the code indicating a high-density MD is not present in the P-TOC, on the other hand, the processing proceeds to step F608 to determine that the loaded disk is a reproduction-only MD.

By the above processing using a combination of P-TOC detection and U-TOC detection as managing information detection, it is possible to determine the type of the reproduction-only MD, the recording and reproducing MD, the high-density MD type A, the high-density MD type B, the reproduction-only high-density MD, or the high-density MD type C.

6. Writing Possibility Determination Processing

Description will next be made of information presented by the detection holes H0 and H1 formed in the cartridge 91 of the disk 90, and particularly of processing for determining a state of writing possibility setting.

As described above, the reproduction-only MD, the recording and reproducing MD, and the high-density MD type A use the detection hole H0 for writing possibility setting, whereas the high-density MD type B, the reproduction-only high-density MD, and the high-density MD type C use the detection hole H1 for writing possibility setting.

Thus, when a disk 90 is loaded into the storage unit 2, a result of disk type determination and a result of determination of the open/closed states of the detection holes H0 and H1 are combined to determine whether the disk 90 is writable/non-writable.

FIGS. 33A and 33B show the open/closed states of the detection holes H0 and H1 as modes.

FIG. 33A shows the states of the holes as modes in the case of the reproduction-only MD, the recording and reproducing MD, and the high-density MD type A.

In this case, the detection hole H0 (the on/off state of the switch SW0) is used to detect writing possibility setting (write protect), and the detection hole H1 (the on/off state of the switch SW1) is used to detect reflectivity.

Modes 0 to 3 shown in FIG. 33A are conceivable as modes of the two switches SW0 and SW1.

In mode 0, the detection holes H0 and H1 are both in the open state, that is, the switches SW0 and SW1 are both off.

This indicates that writing is impossible in the recording and reproducing MD and the high-density MD type A.

In mode 1, the detection hole H0 is in the open state and the detection hole H1 is in the closed state, that is, the switch SW0 is off and the switch SW1 is on.

This indicates the reproduction-only MD (writing is impossible).

In mode 2, the detection hole H0 is in the closed state and the detection hole H1 is in the open state, that is, the switch SW0 is on and the switch SW1 is off.

This indicates that writing is possible in the recording and reproducing MD and the high-density MD type A.

In mode 3, the detection holes H0 and H1 are both in the closed state, that is, the switches SW0 and SW1 are both on. As is understood from the above description with reference to FIG. 4 and FIGS. 6A and 6B, this mode 3 is impossible.

FIG. 33B shows the states of the holes as modes in the case of the high-density MD type B, the reproduction-only high-density MD, and the high-density MD type C according to the present embodiment.

In this case, the detection hole H0 is in the open state at all times (the switch SW0 is off at all times). The detection hole H1 (the on/off state of the switch SW1) is used to detect writing possibility setting (write protect).

Also in this case, modes of the two switches SW0 and SW1 in the same states as in FIG. 33A are set as modes 0 to 3, which are described as follows.

Mode 0 in which the detection holes H0 and H1 are both in the open state, that is, the switches SW0 and SW1 are both off indicates that writing is impossible in the high-density MD type B and the high-density MD type C. Incidentally, the reproduction-only high-density MD is always in mode 0, which indicates that writing is impossible.

Mode 1 in which the detection hole H0 is in the open state and the detection hole H1 is in the closed state, that is, the switch SW0 is off and the switch SW1 is on indicates that writing is possible in the high-density MD type B and the high-density MD type C.

Mode 2 in which the detection hole H0 is in the closed state and the detection hole H1 is in the open state, that is, the switch SW0 is on and the switch SW1 is off, and mode 3 in which the detection holes H0 and H1 are both in the closed state, that is, the switches SW0 and SW1 are both on are both impossible.

As is understood from FIGS. 33A and 33B, the modes corresponding to the open/closed states of the detection holes H0 and H1 have different meanings depending on the disk type.

Figure 34:
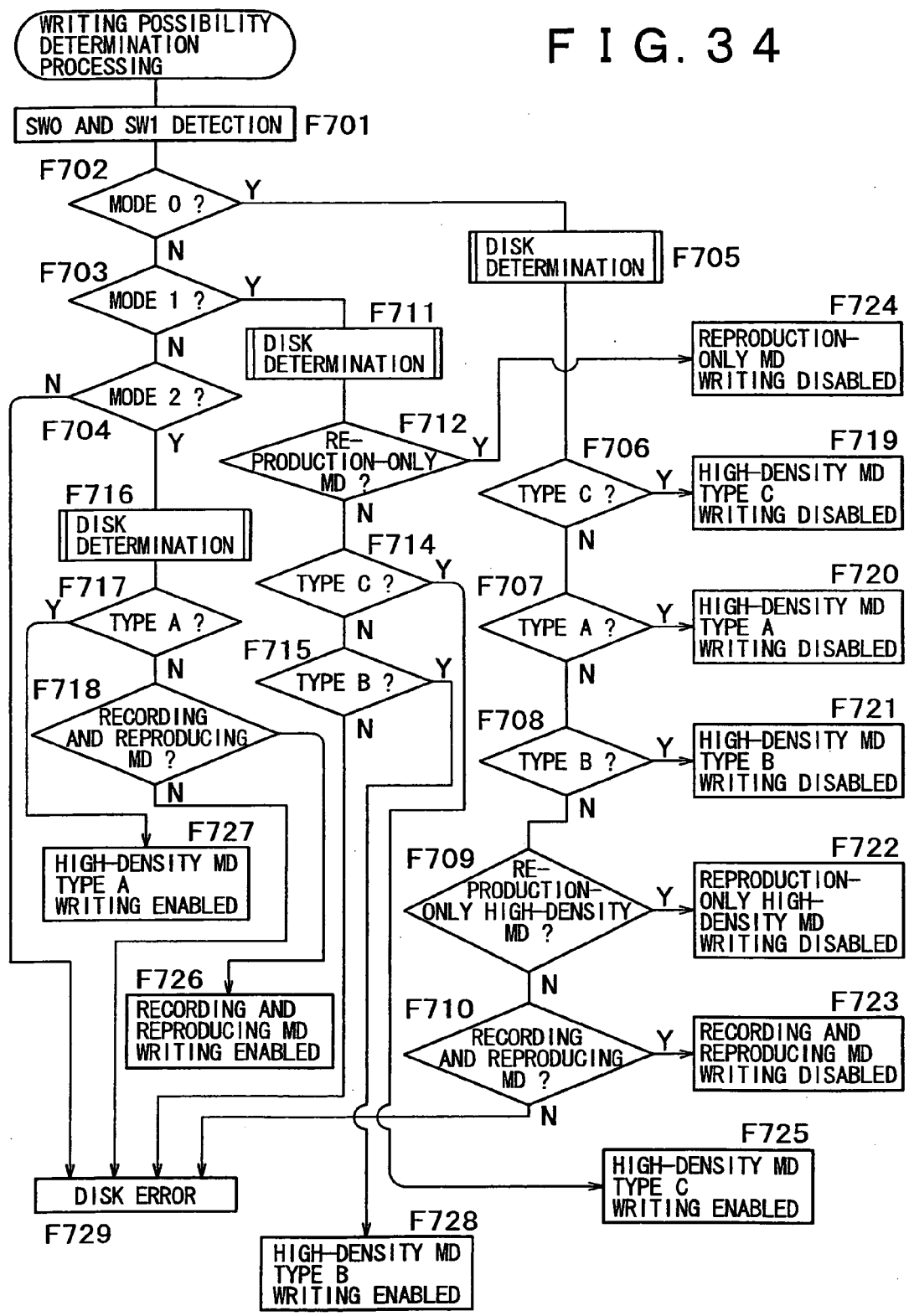
FIG. 34 is a flowchart of writing possibility determination processing according to the embodiment.
Figure 35:
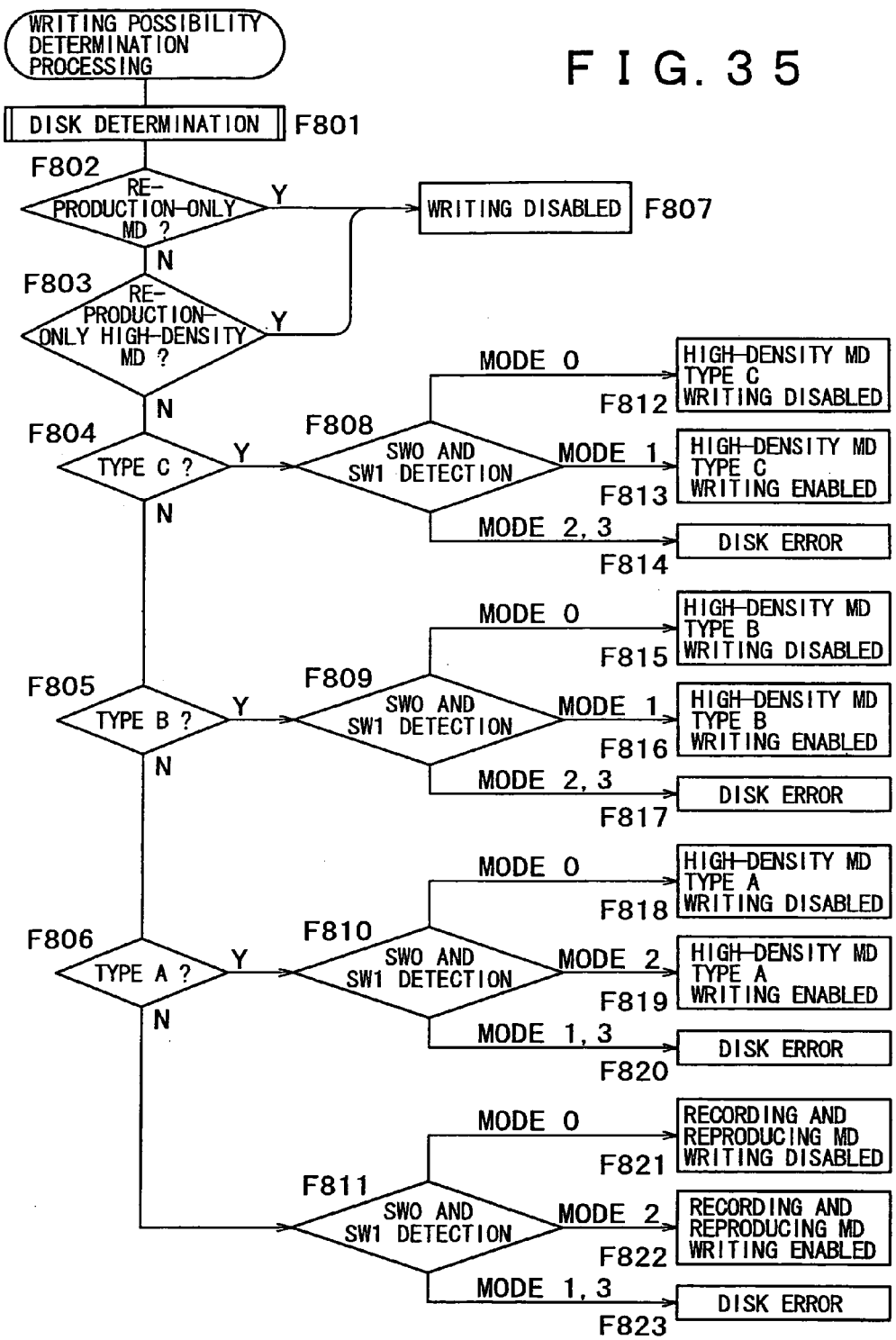
FIG. 35 is a flowchart of writing possibility determination processing according to the embodiment.

Accordingly, the storage controller 32 in the disk drive apparatus (storage unit 2) in this example performs processing of FIG. 34 or FIG. 35 to determine whether or not writing on the loaded disk 90 is possible.

The processing of FIG. 34 will first be described.

In the processing of FIG. 34, the storage controller 32 detects the on/off states of the switches SW0 and SW1 of the detection hole determination unit 34 in first step F701. The storage controller 32 thereby knows which of the modes 0 to 3 shown in FIG. 33A and FIG. 33B is a present state.

When the present state is mode 0, the processing proceeds from step F702 to step F705 to perform disk determination processing. It suffices to perform the processing of one of the above-described disk type determination methods <1> to <6> as this disk determination processing.

In the case of mode 0, the disk 90 is a recording and reproducing MD, a high-density MD type A/type B/type C, or a reproduction-only high-density MD.

When it is determined as a result of the disk determination processing in step F705 that the disk 90 is a high-density MD type C, the processing proceeds from step F706 to step F719 to determine that the disk 90 is a high-density MD type C and is set in a non-writable state.

When it is determined as a result of the disk determination processing in step F705 that the disk 90 is a high-density MD type A, the processing proceeds from step F707 to step F720 to determine that the disk 90 is a high-density MD type A and is set in a non-writable state.

When it is determined as a result of the disk determination processing in step F705 that the disk 90 is a high-density MD type B (excluding the case of the reproduction-only high-density MD), the processing proceeds from step F708 to step F721 to determine that the disk 90 is a high-density MD type B and is set in a non-writable state.

When it is determined as a result of the disk determination processing in step F705 that the disk 90 is a reproduction-only high-density MD, the processing proceeds from step F709 to step F722 to determine that the disk 90 is a reproduction-only high-density MD and is therefore not writable.

When it is determined as a result of the disk determination processing in step F705 that the disk 90 is a recording and reproducing MD, the processing proceeds from step F710 to step F723 to determine that the disk 90 is a recording and reproducing MD and is set in a non-writable state.

When it is determined in the disk determination processing in step F705 that the disk 90 is of a disk type other than the above types, that is, when it is determined that the disk 90 is a reproduction-only MD, which is impossible in mode 0, it is determined that a disk error has occurred in step F729.

When the state of the switches SW0 and SW1 is mode 1, the processing proceeds from step F703 to step F711 to perform disk determination processing (one of the disk type determination methods <1> to <6>).

In the case of mode 1, the disk 90 is either a reproduction-only MD or a high-density MD type B/type C.

When it is determined as a result of the disk determination processing in step F711 that the disk 90 is a reproduction-only MD, the processing proceeds from step F712 to step F724 to determine that the disk 90 is a reproduction-only MD and is therefore not writable.

When it is determined as a result of the disk determination processing in step F711 that the disk 90 is a high-density MD type C, the processing proceeds from step F714 to step F725 to determine that the disk 90 is a high-density MD type C and is set in a writable state.

When it is determined as a result of the disk determination processing in step F711 that the disk 90 is a high-density MD type B (excluding the case of the reproduction-only high-density MD), the processing proceeds from step F715 to step F728 to determine that the disk 90 is a high-density MD type B and is set in a writable state.

When it is determined in the disk determination processing in step F711 that the disk 90 is of a disk type other than the above types, that is, when it is determined that the disk 90 is a recording and reproducing MD or a high-density MD type A or a reproduction-only high-density MD, which is impossible in mode 1, it is determined that a disk error has occurred in step F729.

When the state of the switches SW0 and SW1 is mode 2, the processing proceeds from step F704 to step F716 to perform disk determination processing (one of the disk type determination methods <1> to <6>).

In the case of mode 2, the disk 90 is either a high-density MD type A or a recording and reproducing MD.

When it is determined as a result of the disk determination processing in step F716 that the disk 90 is a high-density MD type A, the processing proceeds from step F717 to step F727 to determine that the disk 90 is a high-density MD type. A and is set in a writable state.

When it is determined as a result of the disk determination processing in step F716 that the disk 90 is a recording and reproducing MD, the processing proceeds from step F718 to step F726 to determine that the disk 90 is a recording and reproducing MD and is set in a writable state.

When it is determined in the disk determination processing in step F716 that the disk 90 is of a disk type other than the above types, that is, when it is determined that the disk 90 is one of a reproduction-only MD, a high-density MD type B/type C, and a reproduction-only high-density MD, which are impossible in mode 2, it is determined that a disk error has occurred in step F729.

When the state of the switches SW0 and SW1 is mode 2, which is an impossible mode, the processing proceeds from step F704 to step F729 to determine that a disk error has occurred.

By such processing of FIG. 34, the storage controller 32 can correctly determine whether or not writing to the loaded disk 90 is possible.

FIG. 35 represents another example of similar writing possibility determination processing.

In this case, the storage controller 32 in first step F801 performs disk determination processing, that is, one of the above-described disk type determination methods <1> to <6> to determine a disk type.

When the disk 90 is a reproduction-only MD, the processing proceeds from step F802 to step F807 to determine that the disk 90 is a reproduction-only embossed pit disk and is therefore not writable.

When the disk 90 is a reproduction-only high-density MD in step F801, the processing proceeds from step F803 to step F807 to determine that also in this case, the disk 90 is a reproduction-only embossed pit disk and is therefore not writable.

When it is determined in step F801 that the disk 90 is a high-density MD type C, the processing proceeds from step F804 to F808, where the storage controller 32 detects the on/off states of the switches SW0 and SW1 of the detection hole determination unit 34. That is, the storage controller 32 determines which of the modes 0 to 3 shown in FIG. 33A and FIG. 33B is a present state.

When it is determined in step F808 that the present state is mode 0, the processing proceeds to step F812 to determine that the disk 90 is a high-density MD type C and is set in a non-writable state.

When it is determined in step F808 that the present state is mode 1, the processing proceeds to step F813 to determine that the disk 90 is a high-density MD type C and is set in a writable state.

When it is determined in step F808 that the present state is mode 2 or mode 3, this is an impossible state, and therefore the processing proceeds to step F814 to determine that a disk error has occurred.

When it is determined in step F801 that the disk 90 is a high-density MD type B (excluding the case of the reproduction-only high-density MD), the processing of the storage controller 32 proceeds from step F805 to F809, where the storage controller 32 determines the on/off states of the switches SW0 and SW1 of the detection hole determination unit 34, that is, which of the modes 0 to 3 is a present state.

When it is determined in step F809 that the present state is mode 0, the processing proceeds to step F815 to determine that the disk 90 is a high-density MD type B and is set in a non-writable state.

When it is determined in step F809 that the present state is mode 1, the processing proceeds to step F816 to determine that the disk 90 is a high-density MD type B and is set in a writable state.

When it is determined in step F809 that the present state is mode 2 or mode 3, this is an impossible state, and therefore the processing proceeds to step F817 to determine that a disk error has occurred.

When it is determined in step F801 that the disk 90 is a high-density MD type A, the processing of the storage controller 32 proceeds from step F806 to F810, where the storage controller 32 determines the on/off states of the switches SW0 and SW1 of the detection hole determination unit 34, that is, which of the modes 0 to 3 is a present state.

When it is determined in step F810 that the present state is mode 0, the processing proceeds to step F818 to determine that the disk 90 is a high-density MD type A and is set in a non-writable state.

When it is determined in step F810 that the present state is mode 2, the processing proceeds to step F819 to determine that the disk 90 is a high-density MD type A and is set in a writable state.

When it is determined in step F810 that the present state is mode 1 or mode 3, this is an impossible state, and therefore the processing proceeds to step F820 to determine that a disk error has occurred.

When it is determined in step F801 that the disk 90 is a recording and reproducing MD, the processing of the storage controller 32 proceeds to step F811, where the storage controller 32 determines the on/off states of the switches SW0 and SW1 of the detection hole determination unit 34, that is, which of the modes 0 to 3 is a present state.

When it is determined in step F811 that the present state is mode 0, the processing proceeds to step F821 to determine that the disk 90 is a recording and reproducing MD and is set in a non-writable state.

When it is determined in step F811 that the present state is mode 2, the processing proceeds to step F822 to determine that the disk 90 is a recording and reproducing MD and is set in a writable state.

When it is determined in step F811 that the present state is mode 1 or mode 3, this is an impossible state, and therefore the processing proceeds to step F823 to determine that a disk error has occurred.

Also by such processing of FIG. 35, the storage controller 32 can correctly determine whether or not writing to the loaded disk 90 is possible.

Incidentally, in the above examples, the mode 0 to 3 of the detection holes H0 and H1 (switches SW0 and SW1) is determined.

However, whether the disk is a reproduction-only pit disk (a reproduction-only MD or a reproduction-only high-density MD) or a magneto-optical recording and reproducing disk capable of recording and reproduction other than the reproduction-only pit disk can be determined by the above-described reflectivity detection. Also, the reproduction-only pit disk is always non-writable.

Further, the mode 3 is impossible in the case of any of the disks.

Then, when whether the mode is mode 0 or mode 1 or mode 2 can be determined, it is possible to determine whether or not writing is possible.

Specifically, in mode 0 in which both the switches SW0 and SW1 are off, it can be determined that "writing is impossible" in the case of any of the recording and reproducing MD and the high-density MD type A/type B/type C. In mode 1 or mode 2 in which either one of the switches SW0 and SW1 is on, it can be determined that "writing is possible" in the case of any of the recording and reproducing MD and the high-density MD type A/type B/type C.

This means that when whether the disk is a pit disk is determined by reflectivity detection from reflected light information as described above, an OR type configuration may be used for the detection of the switches SW0 and SW1.

The use of the OR type for the detection of the switches SW0 and SW1 makes it possible to simplify the structure of the switches SW0 and SW1.

While the embodiment has been described above, the present invention is not limited to the foregoing embodiment, and various modifications thereof are conceivable.

The various processing described above (disk type determination processing and writing possibility determination processing) is realized by a program executed by a control unit, which corresponds to the storage controller 32 or the system controller 8, of the recording and reproducing apparatus (disk drive apparatus). The program therefor can be stored in advance in the ROM 9 or the non-volatile RAM 12 of the recording and reproducing apparatus 1 in FIG. 1, or a ROM not shown, which is handled by the storage controller 32, for example.

Alternatively, the program can be stored (recorded) temporarily or permanently on a removable recording medium such as a flexible disk, a CD-ROM (Compact Disc Read Only Memory), an MO (Magnet Optical) disk, a DVD (Digital Versatile Disc), a magnetic disk, a semiconductor memory, or the like. Such a removable recording medium can be provided as so-called packaged software and also used for designing/manufacturing of the disk drive apparatus and the like.

Further, in the present embodiment, it is for example possible to record the program onto the disk 90 and provide the program as packaged software. Thereby the recording and reproducing apparatus 1 can install the program by reproducing the disk 90 to read the program and storing the program in the non-volatile RAM 12 or the like.

Incidentally, the program can be not only installed from a removable recording medium as described above but also downloaded from a server or the like storing the program via a network such as a LAN (Local Area Network), the Internet, or the like.

Further, while it is assumed herein that the recording and reproducing apparatus is compatible with disks of the mini disk (MD) system, the present invention is not limited to this, and is applicable to recording media in another category of cartridge disks and disk drive apparatus compatible with the recording media.

As is understood from the above description, the opening and closing means in the recording medium according to the present invention forms a plane substantially horizontal level with the reference plane of the cartridge at the position of the detection hole when the detection hole is in a closed state. Therefore, when the detection hole is in the closed state, the detection hole is in the same state as the cartridge plane of a conventional recording medium of a type having no detection hole at the same position. Thus, a corresponding detection switch may have the same stroke range corresponding to a recording medium of the type having no detection hole at the position. It is therefore not necessary to change the structure, for example the stroke range of the switch corresponding to the detection hole in order to support various types of recording media. Thus, the recording medium of the present invention prevents the increase in cost of the disk drive apparatus, the hindrance to reduce of size and thickness thereof, and the like.

It is further possible to reduce the possibility of damage to the switch and the like due to change in a load on the switch as various types of recording media are loaded.

Further, at least a first detection hole and a second detection hole are formed in the cartridge, and the second detection hole is opened and closed by the opening and closing means and the first detection hole is in an open state at all times. This means that the second detection hole is used for recording possibility setting, for example, and is in a closed state in a plane substantially horizontal level with the reference plane of the cartridge. Further, the first detection hole being in the open state at all times represents for example a state of writing being prohibited on a conventional type of recording medium that uses the first detection hole specifically for writing possibility setting. That is, a disk drive apparatus as a conventional model can determine that writing is prohibited.

A disk drive apparatus or a disk determining method according to the present invention determines, together with a disk type, determining information contents (for example writing possibility). The determination is based on one or a plurality of detection holes formed in a cartridge, on the basis of an open/closed state of the detection hole and a result of the disk type using a signal based on reflected light from a loaded recording medium.

It is thus possible to properly determine the set states of the first detection hole and the second detection hole according to the disk type. Therefore, it is not necessary to add a detection hole and a corresponding switch for writing possibility setting for a new disk of various types of disks.

Further, by performing a combination of some of detection of reflectivity of the disk, detection of phase difference of the signal, detection of managing information on the recording medium, detection of an address structure on the recording medium, and detection of a specific area on the recording medium from the signal based on reflected light from the disk for disk type determination, it is possible to make correct determination dealing with various types.

Thus, considering various recording media in a category including the recording medium according to the present invention and various disk drive apparatus ranging from the conventional model to a model corresponding to the disk drive apparatus according to the present invention, the present invention provides for example the following effects of:

enabling appropriate writing possibility setting in various combinations of recording media and disk drive apparatus by changing meanings of the first detection hole and the second detection hole according to the disk type, enabling proper disk type determination and hence correct determination of whether or not writing is possible on the basis of the detection holes, enabling the recording medium according to the present invention to be set in a non-writable state by the first detection hole (H0) for the conventional model and enabling the recording medium according to the present invention to be set in a writable/non-writable state by the second detection hole (H1) for the disk drive apparatus according to the present invention, preventing an operation error, data destruction, and other problems since the disk as the recording medium according to the present invention is set non-writable for the conventional model, providing ease of design and no disadvantages in terms of cost and apparatus size because it is not necessary to add or change a cartridge detection hole and a detection switch on the disk drive apparatus side, and switch stroke conditions for a conventional disk and a disk according to the present invention may be the same, and enabling the disk drive apparatus according to the present invention to properly determine whether or not writing to conventional types of disks is possible according to the states of the detection holes.

The invention claimed is:

1. A recording and reproducing apparatus for recording and reproducing a recording medium as one type of disk among a plurality of types of disks, said disk being housed in a cartridge of a predetermined form, said recording and reproducing apparatus comprising:
    at least one hole detection means for detecting an open state and a closed state of a plurality of detection holes disposed at predetermined positions of said cartridge;
    type determining means for irradiating said recording medium loaded in said recording and reproducing apparatus with a light signal, and determining the type of the disk housed in said cartridge loaded in said recording and reproducing apparatus on a basis of a reflectivity property of the disk; and
    hole type determining means for determining hole types of the detection holes disposed at the predetermined positions of said cartridge on a basis of the reflectivity property of the disk as determined by said type determining means.

2. The recording and reproducing apparatus as claimed in claim 1, wherein at least one of said determined hole types indicates prohibition of writing to said disk.

3. The recording and reproducing apparatus as claimed in claim 1, wherein a first detection hole is defined at a first predetermined position of said cartridge, and a second detection hole is defined at a second predetermined position of said cartridge;
    an open state of said second detection hole of a recording medium housing a first type of disk represents a state of writing to the disk being prohibited;
    an open state of said first detection hole of a recording medium housing a second type of disk represents a state of writing to the disk being prohibited, and said second detection hole of the recording medium housing the second type of disk represents the reflectivity property of the disk; and
    which of the open states of said detection holes indicating prohibition of disk writing is determined on the basis of the result of determination by said type determining means.

4. The recording and reproducing apparatus as claimed in claim 1, wherein on a basis of a signal detected from light reflected from said disk, said type determining means additionally determines the type of the disk by detection of a phase difference of said signal, detection of an address structure of the recording medium.

5. A recording and reproducing method for recording and reproducing a recording medium as one type of disk among a plurality of types of disks, said disk being housed in a cartridge of a predetermined form, said recording and reproducing method comprising:
    detecting an open state and a closed state of a plurality of detection holes disposed at predetermined positions of said cartridge;
    irradiating said recording medium loaded in said recording and reproducing apparatus with a light signal, and determining the type of the disk housed in said cartridge loaded in said recording and reproducing apparatus on a basis of a reflectivity property of the disk; and
    determining hole types of the detection holes disposed at the predetermined positions of said cartridge on a basis of the reflectivity property of the disk as determined.

6. The recording and reproducing method as claimed in claim 5, wherein said determined hole types indicate whether or not writing to said disk is possible.

7. The recording and reproducing method as claimed in claim 6, wherein a disposition of a first detection hole at a first predetermined position of said cartridge is defined, and a disposition of a second detection hole at a second predetermined position of said cartridge is defined;
    an open state of said first detection hole of a first type of disk represents prohibition of writing to the disk; and
    an open state of said second detection hole of a second type of disk represents prohibition of writing to the disk, and said first detection hole of the second type of disk represents the reflectivity property of said disk.

* * * * *

UNITED STATES PATENT AND TRADEMARK OFFICE
CERTIFICATE OF CORRECTION

PATENT NO. : 7,224,656 B2  Page 1 of 1
APPLICATION NO. : 11/246363
DATED : May 29, 2007
INVENTOR(S) : Mikinori Matsuda et al.

It is certified that error appears in the above-identified patent and that said Letters Patent is hereby corrected as shown below:

Column 11, line 27, change "Verocity" to --Velocity--.
Column 11, line 66, change "Verocity" to --Velocity--.
Column 11, line 67, change "Verocity" to --Velocity--.
Column 15, line 18, change "be a configured" to --be configured--.
Column 27, line 42, change "sector has" to --sector 0 has--.
Column 28, line 26, change "sector has" to --sector 0 has--.
Column 39, line 47, change "type. A" to --type A--.
Column 42, line 46, change "reduce of" to --the reduction of--.

Signed and Sealed this

Eleventh Day of December, 2007

JON W. DUDAS
*Director of the United States Patent and Trademark Office*